(12) United States Patent
Shoval et al.

(10) Patent No.: US 11,674,811 B2
(45) Date of Patent: Jun. 13, 2023

(54) ASSIGNING ON-DEMAND VEHICLES BASED ON ETA OF FIXED-LINE VEHICLES

(71) Applicant: VIA TRANSPORTATION, INC., New York, NY (US)

(72) Inventors: Oren Shoval, Jerusalem (IL); Daniel Ramot, New York, NY (US); Shmulik Marcovitch, Kfar Saba (IL); Yaron Rakah, Givatayim (IL); Avishai Shoham, New York, NY (US)

(73) Assignee: VIA TRANSPORTATION, INC., New York, NY (US)

( * ) Notice: Subject to any disclaimer, the term of this patent is extended or adjusted under 35 U.S.C. 154(b) by 200 days.

(21) Appl. No.: 16/920,012

(22) Filed: Jul. 2, 2020

(65) Prior Publication Data

US 2020/0333146 A1     Oct. 22, 2020

Related U.S. Application Data

(63) Continuation of application No. PCT/US2019/012477, filed on Jan. 7, 2019.
(Continued)

(51) Int. Cl.
*G01C 21/34* (2006.01)
*B60W 40/09* (2012.01)
(Continued)

(52) U.S. Cl.
CPC ......... *G01C 21/3423* (2013.01); *B60W 40/09* (2013.01); *G01C 21/3415* (2013.01);
(Continued)

(58) Field of Classification Search
CPC ............ G01C 21/3423; G01C 21/3438; G01C 21/3492; G01C 21/3605; B60W 40/09; G08G 1/202
See application file for complete search history.

(56) References Cited

U.S. PATENT DOCUMENTS

| 4,212,069 A | 7/1980 | Baumann |
| 4,502,123 A | 2/1985 | Minami et al. |

(Continued)

FOREIGN PATENT DOCUMENTS

| CN | 103198647 A | * 7/2013 |
| CN | 103279669 | 9/2013 |

(Continued)

OTHER PUBLICATIONS

English Translation of CN-103198647-A (Year: 2013).*
(Continued)

*Primary Examiner* — Anshul Sood
*Assistant Examiner* — Matthew Ho
(74) *Attorney, Agent, or Firm* — Pearl Cohen Zedek Latzer Baratz LLP

(57) ABSTRACT

Systems and methods related to ridesharing may involve receiving a ride request from a user including a desired destination and information associated with a current location of the user, and receive location information of on-demand and of fixed-line ridesharing vehicles and based on the received location information, identify a fixed-line ridesharing vehicle available to pick from a first pick-up location identify an on-demand ridesharing vehicle available to pick from a second pick-up location, both locations other than the current location of the user, determine a first value and a second value indicative of a time duration for the fixed-line and one demand ridesharing vehicles to arrive at the first and second pick-up locations, respectively, and when the first value is less than the second value, inform the user that the fixed-line ridesharing vehicle is enroute and direct the user to the first pick-up location.

25 Claims, 22 Drawing Sheets

Related U.S. Application Data

(60) Provisional application No. 62/654,818, filed on Apr. 9, 2018, provisional application No. 62/615,592, filed on Jan. 10, 2018, provisional application No. 62/614,558, filed on Jan. 8, 2018.

(51) Int. Cl.
| | |
|---|---|
| *G01C 21/36* | (2006.01) |
| *G08G 1/00* | (2006.01) |
| *H04W 4/40* | (2018.01) |
| *G06Q 10/02* | (2012.01) |
| *G06Q 50/30* | (2012.01) |
| *H04W 4/024* | (2018.01) |
| *G08G 1/123* | (2006.01) |

(52) U.S. Cl.
CPC ..... *G01C 21/3438* (2013.01); *G01C 21/3492* (2013.01); *G01C 21/3605* (2013.01); *G06Q 10/02* (2013.01); *G06Q 50/30* (2013.01); *G08G 1/123* (2013.01); *G08G 1/202* (2013.01); *H04W 4/024* (2018.02); *H04W 4/40* (2018.02)

(56) References Cited

U.S. PATENT DOCUMENTS

| | | | |
|---|---|---|---|
| 4,528,679 A | 7/1985 | Shahbaz | |
| 5,897,629 A | 4/1999 | Shinagawa | |
| 6,459,986 B1 | 10/2002 | Boyce | |
| 7,136,747 B2 * | 11/2006 | Raney | G01C 21/20 701/465 |
| 7,146,270 B2 | 12/2006 | Nozaki | |
| 8,082,095 B2 | 12/2011 | Sumcad et al. | |
| 8,520,695 B1 | 8/2013 | Rubin | |
| 8,688,532 B2 | 4/2014 | Khunger et al. | |
| 8,799,038 B2 | 8/2014 | Chen | |
| 8,868,529 B2 | 10/2014 | Lerenc | |
| 9,068,851 B2 | 6/2015 | Lerenc | |
| 9,074,904 B1 | 7/2015 | Huang et al. | |
| 9,094,824 B2 | 7/2015 | Jayanthi | |
| 9,293,048 B2 | 3/2016 | Fowler | |
| 9,304,009 B2 | 4/2016 | Beaurepaire et al. | |
| 9,322,661 B2 | 4/2016 | Wechsler | |
| 9,494,439 B1 | 11/2016 | Ross et al. | |
| 9,562,785 B1 | 2/2017 | Racah et al. | |
| 9,599,481 B2 | 3/2017 | Lord et al. | |
| 9,679,489 B2 | 6/2017 | Lambert | |
| 9,689,694 B2 * | 6/2017 | Lord | G01C 21/343 |
| 9,706,367 B2 | 7/2017 | Tao | |
| 9,720,415 B2 | 8/2017 | Levinson | |
| 9,903,721 B2 | 2/2018 | Choi | |
| 9,939,279 B2 | 4/2018 | Pan | |
| 10,156,848 B1 | 12/2018 | Konrardy et al. | |
| 10,648,822 B2 * | 5/2020 | Newlin | G01C 21/20 |
| 10,762,447 B2 * | 9/2020 | Kislovskiy | G06Q 10/02 |
| 2001/0037174 A1 | 11/2001 | Dickerson | |
| 2002/0011940 A1 | 1/2002 | Cappel | |
| 2003/0177020 A1 | 9/2003 | Okamura | |
| 2004/0076280 A1 | 4/2004 | Ando | |
| 2004/0088392 A1 | 5/2004 | Barrett | |
| 2004/0093280 A1 | 5/2004 | Yamaguchi | |
| 2004/0158483 A1 | 8/2004 | Lecouturier | |
| 2004/0215382 A1 | 10/2004 | Breed | |
| 2005/0021227 A1 | 1/2005 | Matsumoto | |
| 2006/0059023 A1 | 3/2006 | Mashinsky | |
| 2006/0106655 A1 | 5/2006 | Lettovsky et al. | |
| 2006/0178949 A1 | 8/2006 | McGrath | |
| 2006/0208169 A1 | 9/2006 | Breed | |
| 2006/0276960 A1 | 12/2006 | Adamczyk | |
| 2007/0164726 A1 | 7/2007 | de Marcken et al. | |
| 2007/0168239 A1 | 7/2007 | Marcken et al. | |
| 2007/0248220 A1 | 10/2007 | Crandell | |
| 2008/0015923 A1 | 1/2008 | Masaba | |
| 2008/0027772 A1 | 1/2008 | Gernega et al. | |
| 2008/0152036 A1 | 7/2008 | Breed | |
| 2008/0189207 A1 | 8/2008 | Wurster | |
| 2008/0195428 A1 | 8/2008 | O'Sullivan | |
| 2008/0270204 A1 | 10/2008 | Poykko | |
| 2008/0277183 A1 | 11/2008 | Huang et al. | |
| 2009/0005963 A1 | 1/2009 | Jarvinen | |
| 2009/0049044 A1 | 2/2009 | Mitchell | |
| 2009/0083111 A1 | 3/2009 | Carr | |
| 2009/0177502 A1 | 7/2009 | Doinoff | |
| 2009/0192851 A1 | 7/2009 | Bishop | |
| 2009/0210276 A1 | 8/2009 | Krumm et al. | |
| 2009/0216600 A1 | 8/2009 | Hill | |
| 2009/0248587 A1 | 10/2009 | Van Buskirk | |
| 2009/0271227 A1 | 10/2009 | Hayat | |
| 2009/0327011 A1 | 12/2009 | Petroff | |
| 2010/0030594 A1 | 2/2010 | Swart | |
| 2010/0052945 A1 | 3/2010 | Breed | |
| 2010/0280884 A1 | 11/2010 | Levine | |
| 2010/0299177 A1 | 11/2010 | Buczkowski et al. | |
| 2011/0099040 A1 | 4/2011 | Felt | |
| 2011/0130916 A1 | 6/2011 | Mayer | |
| 2011/0153629 A1 | 6/2011 | Lehmann | |
| 2011/0191017 A1 | 8/2011 | Certain | |
| 2011/0195699 A1 | 8/2011 | Tadayon | |
| 2011/0213629 A1 | 9/2011 | Clark | |
| 2011/0238457 A1 | 9/2011 | Mason | |
| 2011/0301985 A1 | 12/2011 | Camp et al. | |
| 2012/0010912 A1 | 1/2012 | Lele | |
| 2012/0041675 A1 | 2/2012 | Juliver | |
| 2012/0078672 A1 | 3/2012 | Mohebbi et al. | |
| 2012/0109721 A1 | 5/2012 | Cebon | |
| 2012/0232943 A1 | 9/2012 | Myr | |
| 2012/0239452 A1 | 9/2012 | Trivedi | |
| 2012/0290652 A1 | 11/2012 | Boskovic | |
| 2013/0006464 A1 | 1/2013 | Speiser | |
| 2013/0046586 A1 | 2/2013 | Lerner et al. | |
| 2013/0054281 A1 | 2/2013 | Thakkar et al. | |
| 2013/0060468 A1 | 3/2013 | Delling | |
| 2013/0060586 A1 | 3/2013 | Chen | |
| 2013/0073327 A1 | 3/2013 | Edelberg | |
| 2013/0096827 A1 | 4/2013 | McCall et al. | |
| 2013/0102333 A1 | 4/2013 | Dam | |
| 2013/0110385 A1 | 5/2013 | Heed et al. | |
| 2013/0132140 A1 | 5/2013 | Amin et al. | |
| 2013/0132369 A1 | 5/2013 | Delling et al. | |
| 2013/0159028 A1 | 6/2013 | Lerenc et al. | |
| 2013/0179205 A1 | 7/2013 | Slinin | |
| 2013/0218455 A1 | 8/2013 | Clark | |
| 2013/0231965 A1 | 9/2013 | Tokatly | |
| 2013/0238167 A1 | 9/2013 | Stanfield et al. | |
| 2014/0011522 A1 | 1/2014 | Lin et al. | |
| 2014/0052481 A1 | 2/2014 | Monteil | |
| 2014/0074757 A1 | 3/2014 | De Gennaro et al. | |
| 2014/0082069 A1 | 3/2014 | Varoglu | |
| 2014/0129302 A1 | 5/2014 | Amin | |
| 2014/0129951 A1 | 5/2014 | Amin | |
| 2014/0172727 A1 | 6/2014 | Abhyanker | |
| 2014/0173511 A1 | 6/2014 | Lehmann et al. | |
| 2014/0180773 A1 | 6/2014 | Zafiroglu et al. | |
| 2014/0188775 A1 | 7/2014 | Lehmann | |
| 2014/0214322 A1 | 7/2014 | Tsimhoni | |
| 2014/0229255 A1 | 8/2014 | Scofield | |
| 2014/0323167 A1 | 10/2014 | Spearritt | |
| 2014/0324505 A1 | 10/2014 | Lerenc et al. | |
| 2014/0365250 A1 * | 12/2014 | Ikeda | G06Q 10/02 705/5 |
| 2015/0006072 A1 | 1/2015 | Goldberg | |
| 2015/0095122 A1 | 4/2015 | Eramian | |
| 2015/0100238 A1 | 4/2015 | Cai et al. | |
| 2015/0112585 A1 | 4/2015 | Knepper | |
| 2015/0161554 A1 | 6/2015 | Sweeney et al. | |
| 2015/0161564 A1 | 6/2015 | Sweeney | |
| 2015/0204684 A1 | 7/2015 | Rostamian et al. | |
| 2015/0206437 A1 | 7/2015 | Fowler | |
| 2015/0219464 A1 | 8/2015 | Beaurepaire et al. | |
| 2015/0242944 A1 | 8/2015 | Willard | |
| 2015/0248689 A1 | 9/2015 | Paul | |
| 2015/0294430 A1 * | 10/2015 | Huang | G06Q 50/26 701/2 |

(56) References Cited

U.S. PATENT DOCUMENTS

| | | |
|---|---|---|
| 2015/0310378 A1 | 10/2015 | van der Berg |
| 2015/0310379 A1 | 10/2015 | Farrelly et al. |
| 2015/0324718 A1 | 11/2015 | Lord |
| 2015/0324945 A1 | 11/2015 | Lord et al. |
| 2015/0345951 A1 | 12/2015 | Dutta et al. |
| 2016/0021154 A1 | 1/2016 | Schoeffler |
| 2016/0027306 A1 | 1/2016 | Lambert |
| 2016/0027307 A1 | 1/2016 | Abhyanker |
| 2016/0034845 A1 | 2/2016 | Hiyama |
| 2016/0171574 A1 | 6/2016 | Paulucci |
| 2016/0209220 A1 | 7/2016 | Laetz |
| 2016/0210675 A1 | 7/2016 | Smart |
| 2016/0231128 A1* | 8/2016 | Marks .............. G01C 21/3484 |
| 2016/0253599 A1 | 9/2016 | Lang |
| 2016/0320194 A1 | 11/2016 | Liu et al. |
| 2016/0321771 A1 | 11/2016 | Liu et al. |
| 2016/0335576 A1 | 11/2016 | Peng |
| 2016/0356615 A1 | 12/2016 | Arata |
| 2016/0361970 A1 | 12/2016 | Pebbles |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0059334 A1 | 3/2017 | Mukherjee |
| 2017/0138749 A1 | 5/2017 | Pan et al. |
| 2017/0167882 A1 | 6/2017 | Ulloa Paredes et al. |
| 2017/0169366 A1 | 6/2017 | Klein |
| 2017/0185948 A1 | 6/2017 | Magazinik |
| 2017/0153714 A1 | 8/2017 | Gao et al. |
| 2017/0243492 A1 | 8/2017 | Lambert et al. |
| 2017/0248963 A1 | 8/2017 | Levinson et al. |
| 2017/0284819 A1 | 10/2017 | Donnelly |
| 2017/0300053 A1 | 10/2017 | Wengreen et al. |
| 2017/0301054 A1 | 10/2017 | Sangoi et al. |
| 2017/0313208 A1 | 11/2017 | Lindsay |
| 2017/0365030 A1 | 12/2017 | Shoham et al. |
| 2018/0046944 A1 | 2/2018 | Barbera |
| 2018/0073882 A1 | 3/2018 | North |
| 2018/0080263 A1 | 3/2018 | Rose |
| 2018/0087915 A1 | 3/2018 | Marco |
| 2018/0091604 A1 | 3/2018 | Yamashita |
| 2018/0121847 A1 | 5/2018 | Zhao |
| 2018/0189682 A1 | 7/2018 | Seacat |
| 2018/0191863 A1 | 7/2018 | Matthieson et al. |
| 2018/0197418 A1 | 7/2018 | Chu |
| 2018/0211228 A1 | 7/2018 | Narayan |
| 2018/0224866 A1 | 8/2018 | Alonso-mora |
| 2018/0231984 A1 | 8/2018 | Alonso-mora |
| 2018/0260787 A1 | 9/2018 | Xi |
| 2018/0290610 A1 | 10/2018 | Zych |
| 2018/0338225 A1 | 11/2018 | Shimizu |
| 2018/0340790 A1 | 11/2018 | Kislovskiy et al. |
| 2018/0342035 A1* | 11/2018 | Sweeney .......... G01C 21/3438 |
| 2018/0348772 A1 | 12/2018 | Stefan |
| 2018/0356239 A1 | 12/2018 | Marco |
| 2019/0086221 A1 | 3/2019 | Thiyagarajan |
| 2019/0114638 A1 | 4/2019 | Flores |
| 2019/0122561 A1 | 4/2019 | Shimizu |
| 2019/0171943 A1 | 6/2019 | Pao et al. |
| 2019/0205842 A1 | 7/2019 | Starns |
| 2019/0206258 A1 | 7/2019 | Chang et al. |
| 2019/0259182 A1 | 8/2019 | Sarukkai et al. |
| 2019/0271552 A1 | 9/2019 | Choi et al. |
| 2019/0311307 A1 | 10/2019 | Ramot |
| 2020/0104965 A1 | 4/2020 | Ramot |
| 2020/0160476 A1 | 5/2020 | Ramot |
| 2020/0160477 A1 | 5/2020 | Ramot |
| 2020/0160478 A1 | 5/2020 | Ramot |
| 2020/0160705 A1 | 5/2020 | Chase |
| 2020/0160709 A1 | 5/2020 | Ramot |
| 2020/0333146 A1 | 10/2020 | Shoval |
| 2020/0334987 A1 | 10/2020 | Shoval |
| 2020/0361406 A1 | 11/2020 | Zych |
| 2021/0073825 A1 | 3/2021 | Walling |

FOREIGN PATENT DOCUMENTS

| | | |
|---|---|---|
| CN | 103327440 | 9/2013 |
| CN | 104751625 | 7/2015 |
| EP | 2605149 | 6/2013 |
| EP | 2665050 | 11/2013 |
| EP | 2792538 | 10/2014 |
| EP | 3472563 | 4/2019 |
| EP | 3574459 | 12/2019 |
| EP | 3631707 | 4/2020 |
| EP | 3659078 | 6/2020 |
| EP | 3738085 | 11/2020 |
| EP | 3776395 | 2/2021 |
| GB | 2 397 683 | 7/2004 |
| JP | 2003006294 | 1/2003 |
| JP | 2003233656 | 8/2003 |
| JP | 2003271706 | 9/2003 |
| JP | 2003281422 | 10/2003 |
| JP | 2004062490 | 2/2004 |
| JP | 2004192366 | 7/2004 |
| JP | 2004362271 | 12/2004 |
| JP | 2010231258 | 10/2010 |
| JP | 2011214930 | 10/2011 |
| JP | 2019525299 | 9/2019 |
| JP | 2020522789 | 7/2020 |
| KR | 20090044693 A * | 5/2009 |
| KR | 20100053717 | 5/2010 |
| KR | 101752159 | 6/2017 |
| SG | 2012065264 | 4/2014 |
| WO | WO2006128946 | 12/2006 |
| WO | WO2012143300 | 10/2012 |
| WO | WO2014106617 | 7/2014 |
| WO | WO2016209595 | 12/2016 |
| WO | WO2017223031 | 12/2017 |
| WO | WO2018140505 | 8/2018 |
| WO | WO2018217640 | 11/2018 |
| WO | WO2019023324 | 1/2019 |
| WO | WO2019136341 | 7/2019 |
| WO | WO2019199766 | 10/2019 |

OTHER PUBLICATIONS

English Translation of KR 20090044693 A (Year: 2009).*
International Search Report and Written Opinion dated May 8, 2019, received in corresponding International Application No. PCT/US2019/012477 (15 pages).
Ma, Shuo et al. T-Share: A large scale dynamic taxi ridesharing service, 2013, IEEE, Proceedings of the 29th International Conference on Data Engineering (ICDCO, 2016, pp. 410-421 (year 2013).
Wen He; Kai Hwang; Deyi Li, Intelligent carpool routing for urban ridesharing by mining GPS trajectories, IEEE Transactions on intelligent transportation systems; year 2014, vol. 15, issue 5, pp. 2286-2296; DOI 10.1109/TITS.2014.2315521.
Dejan Dimitrijevic, Nemanja Nedjc, Vladimir Dimitrieski, Real-time carpooling and ride-sharing: Position paper design concepts, distribution and cloud computing strategies; Computer Science and Information Systems (FedCSIS) 2013 Federated Conference on year 2013, pp. 781-786; Referenced in IEEE Conference Publications.
Harini Sirisena, Ride Buddies—Multi agent system for ride sharing/carpooling; Advances in ICT for Emerging Regions (ICTer) 2014 International Conference year 2014; pp. 252-252, DOI:10.1109/ICTER.2014.7083910: Referenced IEEE Conference Publications.
Chung-Min Chen, David Shallcross, Yunng-Chien Shih. Yen-Ching Wu, Sheng-Po Kou, Yuan-Ying Hsi, Yuhsiang Holderby, William Chou, Smart ride share with flexible route matching: Chung-Min Chen, David Shallcross, Advanced Communication Technology (ICACT) 2011, 13th International Conference, pp. 1506-1510.
Nianbo Liu; Ming Liu; Jiannong Cao; Guihai Chen; Wei Lou, When transportation meets communication: V2P over VANETs; Distributed Computing Systems (ICDCS) 2010 IEEE 30th International Conference year 2010, pp. 567-576, DOI:10.1109/ICDCS.2010.83.
Li et al., A dynamic pricing method for carpooling service based on coalition at game analysis; 2016 IEEE 18th Intern Conf on High Performance Computing and Comm; IEEE 14th Intern Conf on

(56) References Cited

OTHER PUBLICATIONS

Smart City IEEE 2nd Intern Conf on Data Science and Systems (hpcc/SmartCity/dss 9HPCC/Smartcity/DSS) year 2016 pp. 78-85; DOI:10.1109/HPCC-Smart City-DSS) year 2016, pp. 78-85, DOI:10.1109/HPCC-SmartCity-DSS.2016.0022.
Lasse Korsholm Poulsen, Daan Dekkers, Nicolaas Wagenaar; Wesley Snijders; Ben Lewinsky; Raghava Rao Mukkamala; Ravi Valrapu; Green cabs vs. Uber in New York City, 2016 IEEE international Congress on Big Data (BigDataCongress) Year 2016:pp. 222-229, DOI: 10.1109/BigDataCongress.2016.35.
Hawkins, Andrew, Uberhop is Uber's Latest idea for killing mass transit, Dec. 8, 2015, The Verge, p. 1-4.
Alonso-Mora, Javier et al. "On-Demand High-Capacity Ride-Sharing via Dynamic Trip-Vehicle Assignment." Proceedings of the National Academy of Sciences 114, 3 (Jan. 2017): 462-467 © 2017 National Academy of Sciences.
Mora, Supplemental Material—On Demand high-capacity ridesharing via dynamic tripvehicle assignment, Jul. 20, 2016, p. 1-36.
Whitney, Alyse, I took Via to work every day for a month. Here's what I learned, May 10, 2016, p. 1-3.
Y. Hou, W. Zhong, L. Su, K. Hulme, A. W. Sadek and QIAO, "TASeT: Improving the Efficiency of Electric Taxis With Transfer—Allows Rideshare", in IEEE Transactions on Vehicular Technology, vol. 56., No. 12, pp. 9518-9528, Dec. 2016, doi:10.1109//TVT.2016.2592983. (Year 2016).
Agatz, Niels, et al. "Optimization for dynamic ride-sharing: A review." European Journal of Operational Research 223.2 (2012): 295-303 (year:2012).
Office Action for European Appl. No. 18731617.9 dated Jan. 25, 2022.
Office Action for U.S. Appl. No. 16/752,381 dated Apr. 14, 2022.
Office Action for European Appl. No. 19702319.5 dated Jan. 25, 2022.
Office Action for European Appl. No. 18758779.5 dated Nov. 8, 2021.
Office Action for European Appl. No. 19702319.5 dated Oct. 26, 2021.
Office Action for European Appl. No. 18703675.1 dated Oct. 8, 2021.
Office Action for Japanese Appl. No. 2019-564501 dated Jan. 27, 2021.
Office Action for U.S. Appl. No. 16/752,281 dated Apr. 14, 2022.
Office Action for U.S. Appl. No. 16/921,257 dated Mar. 31, 2022.
Notice of Allowance for U.S. Appl. No. 16/750,679 dated May 3, 2021.
Office Action for U.S. Appl. No. 15/916,373 dated Dec. 16, 2020.
Agatz, Niels, et al. "Sustainable passenger transportation: Dynamic ride-sharing." (2010) (Year: 2010).
Automobile Navigation: Where is it Going?, Robert L. French, IEEE Aerospace and Electronic Systems Magazine, vol. 2, Issue: 5, May 6-12, 1987.
TravTek Global Evaluation and Executive Summary, V.W. Imnan and J.I. Peters, U.S. Department of Transportation Federal Highway Administration, Pub. No. FHWA-RD-96-031, Mar. 1996.
TravTek System Architecture Evaluation, C. Blumentritt, K. Balke, E. Symour, and R. Sanchez, U.S. Department of Transportation Federal Highway Administration, Pub. No. FHWARD-94-141, Jul. 1995.
Historical overview of automobile navigation technology, Robert L. French, 36th IEEE Vehicular Technology Conference, 1986.
The Dynamic Traffic Information Collection and Processing Methods of ITS Common Information Platform Based on Floating Car Technology, Haowei Su and Wei Zhang, IEEE 2008 International Seminar on Future BioMedical Information Engineering, 156-159, 2008.
Furuhata, et al., Ridesharing: The state-of-the-art and future directions, Transportation Research Part B 57 (2013) 28-46.
A Qualitative and Quantitative Analysis of Real Time Traffic Information Providers, Tim Paul Bauer, Janick Edinger, and Christian Becker, Proceedings of the 4th IEEE International Workshop on Pervasive Context, 2019.
Ridesharing in North America: Past, Present, and Future, Nelson D. Chan and Susan Shaheen, published in Transport Reviews, vol. 32, No. 1, 93-112, Jan. 2012.
Los Angeles Smart Traveler Field Operational Test Evaluation, Genevieve Giuliano, Randolph W. Hall, and Jacqueline M. Golob, University of Southern California, California PATH Research Report UCB-ITS-PRR-95-41, Dec. 1995.
Seattle Smart Traveler, Daniel J. Dailey, Donald Loseff, David Meyers, Final Research Report, Washington State Transportation Center (TRAC), Oct. 1997, 1-32.
Dynamic Taxi-sharing Service Using Intelligent Transportation System Technologies, Chi-Chung Tao, IEEE, 3209-3212, 2007.
A Survey of Mobile Phone Sensing, Nicholas D. Lane, Emiliano Miluzzo, Hong Lu, Daniel Peebles, Tanzeem Choudhury, and Andrew T. Campbell, IEEE Communications Magazine, 140-150, Sep. 2010.
The Research and Implementation of GPS Intelligent Transmission Strategy Based on on-board Android Smartphones, Zhiqiang Wei, Yaqing Song, Hao Liu, Yanxiu Sheng, and Xi Wang, IEEE, 1230-1233, 2013.
Smarter transportation case study #10: Dynamic Ridesharing in Cork., Transportation for America, https://web.archive.org/web/20111007214904/http://t4america.or g/blog/2...ter-transportation-case-study-10-dynamic-ridesharing in-cork-ireland/, Crawled 2011, Retrieved Nov. 15, 2021.
Avego Real-Time Ridesharing, Avego Ltd., https://web.archive.org/web/20111021225957/http://www.avego.com:80/st/realtime.php , Crawled 2011, Retrieved Nov. 15, 2021.
Avego Introduction, Avego Ltd., https://web.archive.org/web/20111102165609/http://www.avego.com:80/st/index.php, Crawled 2011, Retrieved Nov. 15, 2021.
Understanding the Navstar Gps, GIS, and IVHS 2nd Edition, Tom Logsdon, Van Nostrand Reinhold, 1995.
Behind the Success of the CVCC Engine, Honda Worldwide, https://web.archive.org/web/20070219081359/http://world.honda.com/history/challenge/ 1981navigatIonsystem/text/01.hm, Crawled 2007, Retrieved Dec. 13, 2021.
The Final Test: From Suzuka to Tokyo, Honda Worldwide, HtEGs//web.8rchie.0r0/web/20070221131323/hto//wor.honda.com/history/challence/. 1981naviqationsystem/text"06.htrnl, Crawled 2007, Retrieved Dec. 13, 2021.
Creating a Progressive Strategy, Honda Worldwide, hitps://web.archive.org/web/20070221131445/http://world.honda.com/history/challenge/ 1981navigationsystem/text/02.html, Crawled 2007, Retrieved Dec. 13, 2021.
Map Navigation Software of the Electro-Multivision of the '91 Toyota Soarer, Kunihiro Ishikawa, Michima Ogawa, Shiegtoshi Azuma, and Tooru Ito, IEEE Vehicle Navigation and Information Systems Conference, 463-473, 1991.

* cited by examiner

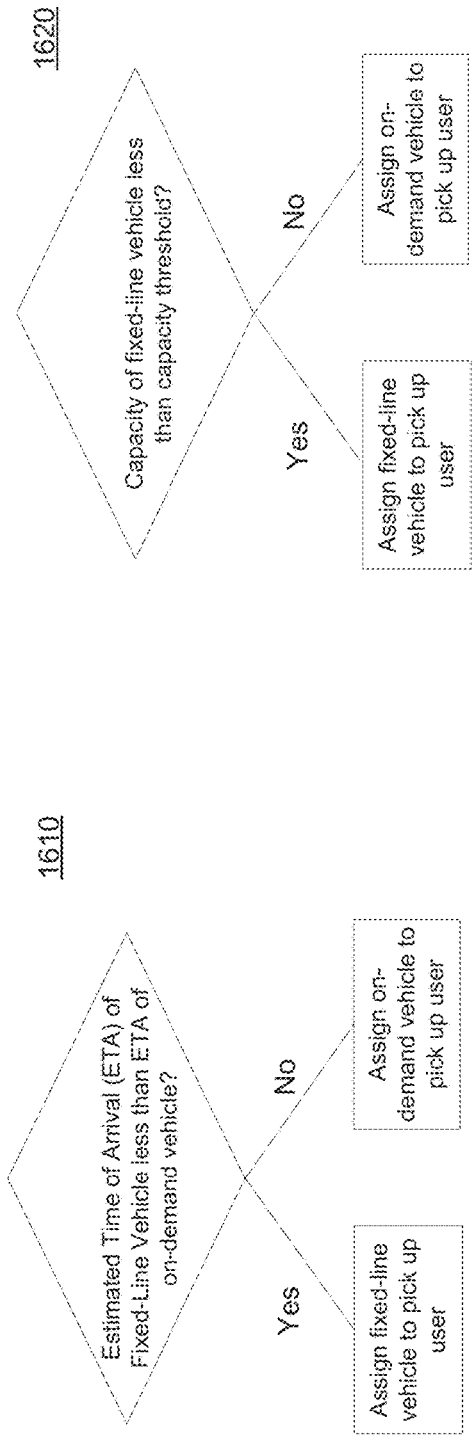
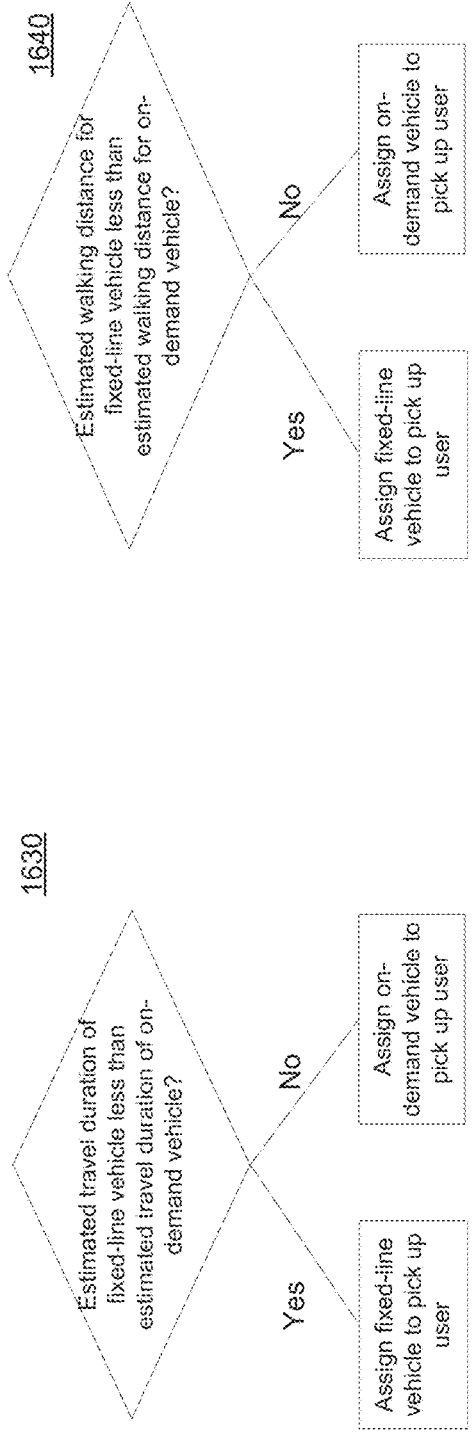

2000

```
┌─────────────────────────────────────────────────────────────┐
│ Receive information indicative of an event associated with  │── 2010
│ atypical demand for transportation                          │
└─────────────────────────────────────────────────────────────┘
                              │
                              ▼
┌─────────────────────────────────────────────────────────────┐
│ Receive location information from a plurality of            │── 2020
│ communication devices associated with a plurality of        │
│ fixed-line ridesharing vehicles                             │
└─────────────────────────────────────────────────────────────┘
                              │
                              ▼
┌─────────────────────────────────────────────────────────────┐
│ Determine an inability of one or more fixed-line ridesharing│── 2030
│ vehicles in the plurality of fixed-line ridesharing vehicles│
│ to address the atypical demand for transportation           │
└─────────────────────────────────────────────────────────────┘
                              │
                              ▼
┌─────────────────────────────────────────────────────────────┐
│ Access data identifying predetermined driving routes of the │── 2040
│ plurality of fixed-line ridesharing vehicles                │
└─────────────────────────────────────────────────────────────┘
                              │
                              ▼
┌─────────────────────────────────────────────────────────────┐
│ Select a fixed-line ridesharing vehicle to temporarily cease│── 2050
│ driving along its predetermined driving route               │
└─────────────────────────────────────────────────────────────┘
                              │
                              ▼
┌─────────────────────────────────────────────────────────────┐
│ Compensate for the inability of the one or more fixed-line  │
│ ridesharing vehicles to address the atypical demand for     │── 2060
│ transportation by directing the selected fixed-line         │
│ ridesharing vehicle along a new driving route that differs  │
│ from the predetermined driving route                        │
└─────────────────────────────────────────────────────────────┘
                              │
                              ▼
┌─────────────────────────────────────────────────────────────┐
│ Terminate travel of the selected fixed-line ridesharing     │
│ vehicle along the new driving route and direct the selected │── 2070
│ fixed-line ridesharing vehicle to return to traveling       │
│ according to its predetermined driving route                │
└─────────────────────────────────────────────────────────────┘
```

FIG. 20

ASSIGNING ON-DEMAND VEHICLES BASED ON ETA OF FIXED-LINE VEHICLES

CROSS REFERENCES TO RELATED APPLICATIONS

This application is a continuation of PCT International Application No. PCT/US2019/012477, filed Jan. 7, 2019, which claims the benefit of priority of U.S. Provisional Patent Application No. 62/614,558, filed Jan. 8, 2018; U.S. Provisional Patent Application No. 62/615,592, filed Jan. 10, 2018; and U.S. Provisional Patent Application No. 62/654,818, filed Apr. 9, 2018. All of the foregoing applications are incorporated herein by reference in their entirety.

BACKGROUND

I. Technical Field

The present disclosure generally relates to the field of vehicle ridesharing and systems and methods for ridesharing management and rideshare scheduling.

II. Background Information

Recent years have witnessed increasing interest and development in the field of vehicle sharing, where one or more riders may share the same vehicle for a portion of their rides. Ridesharing may save ride costs, increase vehicle utilization, and reduce air pollution. A rider may use a ridesharing service through a ridesharing service application accessed by the rider's mobile device.

SUMMARY

Embodiments consistent with the present disclosure provide systems and methods for vehicle ridesharing and for managing a fleet of ridesharing vehicles. For example, consistent with the disclosed embodiments, the fleet of ridesharing vehicles may include more than 10 ridesharing vehicles, more than 100 ridesharing vehicles, or more than 1000 ridesharing vehicles that pick up multiple users and drop them off at locations proximate but other than their desired destinations.

In an embodiment, a system for directing ridesharing vehicles may include a communications interface configured to receive ride requests from a first plurality of communication devices associated with a plurality of users, wherein each ride request includes a starting point and a desired destination corresponding to each of the plurality of users; and receive location information from a second plurality of communication devices associated with a plurality of ridesharing vehicles, wherein the location information includes global positioning system (GPS) data generated by GPS components associated with the second plurality of communication devices. The system may further include at least one processor configured to: assign a first ridesharing vehicle to pick up a first group of users from the plurality of users; determine, for each of the first group of users, a pick-up location other than the starting point and a drop-off location other than the desired destination; provide, to each of the first group of users, a description of the determined pick-up location and an estimated pick-up time; after picking up some of the first group of users and before dropping them off, receive an indication of an unanticipated ridesharing event; determine an inability of the first ridesharing vehicle to pick up a next user from the first group of users at a corresponding estimated pick-up time due to the unanticipated ridesharing event; reassign the next user to a second ridesharing vehicle transporting a second group of users; determine a new route for the first ridesharing vehicle that does not include the determined pick-up location of the next user and a new route for the second ridesharing vehicle that includes the determined pick-up location of the next user; and direct the first ridesharing vehicle and the second ridesharing vehicle according to their new routes.

In an embodiment, a method for directing ridesharing vehicles may include receiving ride requests from a first plurality of communication devices associated with a plurality of users, wherein each ride request includes a starting point and a desired destination corresponding to each of the plurality of users; receiving location information from a second plurality of communication devices associated with a plurality of ridesharing vehicles, wherein the location information includes global positioning system (GPS) data generated by GPS components associated with the second plurality of communication devices; assigning a first ridesharing vehicle to pick up a first group of users from the plurality of users; determining for each of the first group of users, a pick-up location other than the starting point and a drop-off location other than the desired destination; providing, to each of the first group of users, a description of the determined pick-up location and an estimated pick-up time; after picking up some of the first group of users and before dropping them off, receiving an indication of an unanticipated ridesharing event; determining an inability of the first ridesharing vehicle to pick up a next user from the first group of users at a corresponding estimated pick-up time due to the unanticipated ridesharing event; reassigning the next user to a second ridesharing vehicle transporting a second group of users; determining a new route for the first ridesharing vehicle that does not include the determined pick-up location of the next user and a new route for the second ridesharing vehicle that includes the determined pick-up location of the next use; and directing the first ridesharing vehicle and the second ridesharing vehicle according to their new routes.

In an embodiment, a non-transitory computer-readable storage medium may store instructions that, when executed by at least one processor, cause the at least one processor to perform a method for directing ridesharing vehicles. The method may include receiving ride requests from a first plurality of communication devices associated with a plurality of users, wherein each ride request includes a starting point and a desired destination corresponding to each of the plurality of users; receiving location information from a second plurality of communication devices associated with a plurality of ridesharing vehicles, wherein the location information includes global positioning system (GPS) data generated by GPS components associated with the second plurality of communication devices; assigning a first ridesharing vehicle to pick up a first group of users from the plurality of users; determining for each of the first group of users, a pick-up location other than the starting point and a drop-off location other than the desired destination; providing, to each of the first group of users, a description of the determined pick-up location and an estimated pick-up time; after picking up some of the first group of users and before dropping them off, receiving an indication of an unanticipated ridesharing event; determining an inability of the first ridesharing vehicle to pick up a next user from the first group of users at a corresponding estimated pick-up time due to the unanticipated ridesharing event; reassigning the next user to a second ridesharing vehicle transporting a second group of users; determining a new route for the first ridesharing vehicle that does not include the determined pick-up location of the next user and a new route for the second ridesharing vehicle that includes the determined pick-up location of the next use; and directing the first ridesharing vehicle and the second ridesharing vehicle according to their new routes.

In an embodiment, a system for directing a vehicle may include at least one processor configured to receive, from a wireless communication device, location data indicative of a current location of the vehicle; direct the vehicle to a desired destination using a first driving route; receive, at a first time, data indicating that a new route for the vehicle is requested; predict a location of the vehicle at a second time that will occur after the first time, the location being one where a driver of the vehicle can safely implement instructions associated with changing the first driving route; determine, based on the predicted location of the vehicle at the second time, a second driving route; and prior to the second time, send instructions associated with the second driving route to the wireless communication device.

In an embodiment, a method for directing a vehicle may include receiving global positioning system (GPS) data indicative of a current location of the vehicle, the GPS data have been generated by a GPS component associated with a wireless communication device; directing the vehicle to a desired destination using a first driving route; receiving, at a first time, data indicating that a new route for the vehicle is requested; predicting a location of the vehicle at a second time that will occur after the first time, the location being one where a driver of the vehicle can safely implement instructions associated with changing the first driving route; and prior to the second time, directing the vehicle to the desired destination using a second driving route associated with the predicted location of the vehicle.

In an embodiment, a system for directing ridesharing vehicles may include a communications interface for receiving shared-ride requests from a plurality of users; and at least one processor configured to receive, via the communications interface, a first request for a shared-ride from a first user, the first request including information for a first starting point and a first desired destination; receive current vehicle location data for a fleet of ridesharing vehicles, wherein the current vehicle location data includes global positioning system (GPS) data generated by at least one GPS component associated with each ridesharing vehicle; electronically assign a ridesharing vehicle to pick up the first user and determine a driving route for transporting the first user, wherein the driving route includes a first pick-up location and a first drop-off location for the first user; determine a target arrival time at the first drop-off location; receive, via the communications interface, a second request for a shared-ride from a second user, the second request including information related to a second starting point and a second desired destination of the second user; calculate an estimated delay that would be caused to the first user by picking up of the second user; determine whether the delay would cause the first user to arrive at the first drop-off location after the target arrival time; determine that picking up the second user will not cause the first user to arrive at the first drop-off location after the target arrival time and electronically assign the ridesharing vehicle to pick up the second user; and direct the ridesharing vehicle according to an updated driving route that includes a second pick-up location and a second drop-off location for the second user.

In an embodiment, a method for directing ridesharing vehicles may include receiving a first request for a shared-ride from a first user, the first request including information for a first starting point and a first desired destination; receiving current vehicle location data for a fleet of ridesharing vehicles, wherein the current vehicle location data includes global positioning system (GPS) data generated by at least one GPS component associated with each ridesharing vehicle; electronically assigning a ridesharing vehicle to pick up the first user and determine a driving route for transporting the first user, wherein the driving route includes a first pick-up location and a first drop-off location for the first user; determining for the first user a target arrival time at the first drop-off location; receiving a second request for a shared-ride from a second user, the second request including information related to a second starting point and a second desired destination of the second user; calculating an estimated delay that would be caused to the first user by picking up of the second user; determining whether the delay would cause the first user to arrive at the first drop-off location after the target arrival time; when picking up the second user is determined not to cause the first user to arrive at the first drop-off location after the target arrival time, electronically assigning the ridesharing vehicle to pick up the second user; and directing the ridesharing vehicle according to an updated driving route that includes a second pick-up location and a second drop-off location for the second user.

In an embodiment, a system for directing ridesharing vehicles may include a communications interface configured to receive a ride request from a user, wherein the ride request includes a desired destination and information associated with a current location of the user; and receive location information of a first group of on-demand ridesharing vehicles and a second group of fixed-line ridesharing vehicles. The system may further include at least one processor configured to, based on the received location information, identify a fixed-line ridesharing vehicle available to pick-up the user from a first pick-up location other than the current location of the user; based on the received location information, identify an on-demand ridesharing vehicle available to pick-up the user from a second pick-up location other than the current location of the user; determine a first value indicative of a time duration for the fixed-line ridesharing vehicle to arrive at the first pick-up location; determine a second value indicative of a time duration for the on-demand ridesharing vehicle to arrive at the second pick-up location; and when the first value is less than the second value, inform the user that the fixed-line ridesharing vehicle is enroute and direct the user to the first pick-up location.

In an embodiment, a method for directing ridesharing vehicles may include receiving a ride request from a user, wherein the ride request includes a desired destination and information associated with a current location of the user; receiving location information of a first group of on-demand ridesharing vehicles and a second group of fixed-lines ridesharing vehicles; based on the received location information, identifying a fixed-line ridesharing vehicle available to pick-up the user from a first pick-up location other than the current location of the user; based on the received location information, identifying an on-demand ridesharing vehicle available to pick-up the user from a second pick-up location other than the current location of the user; determining a first value indicative of a time duration for the fixed-line ridesharing vehicle to arrive at the first pick-up location; determining a second value indicative of a time duration for the on-demand ridesharing vehicle to arrive at the second pick-up location; and when the first value is less than the second value, informing the user that the fixed-line ridesharing vehicle is enroute and directing the user to the first pick-up location.

In an embodiment, a non-transitory computer-readable storage medium may store instructions that, when executed by at least one processor, cause the at least one processor to perform a method for directing ridesharing vehicles. The method may include receiving a ride request from a user, wherein the ride request includes a desired destination and information associated with a current location of the user; receiving location information of a first group of on-demand ridesharing vehicles and a second group of fixed-lines ridesharing vehicles; based on the received location information, identifying a fixed-line ridesharing vehicle available to pick-up the user from a first pick-up location other than the current location of the user; based on the received location information, identifying an on-demand ridesharing vehicle available to pick-up the user from a second pick-up location other than the current location of the user; determining a first value indicative of a time duration for the fixed-line ridesharing vehicle to arrive at the first pick-up location; determining a second value indicative of a time duration for the on-demand ridesharing vehicle to arrive at the second pick-up location; and when the first value is less than the second value, informing the user that the fixed-line ridesharing vehicle is enroute and directing the user to the first pick-up location.

In an embodiment, a system for directing ridesharing vehicles may include a communications interface configured to receive information indicative of an event associated with atypical demand for transportation; and receive location information from a plurality of communication devices associated with a plurality of fixed-line ridesharing vehicles. The system may further include at least one processor configured to determine an inability of one or more fixed-line ridesharing vehicles in the plurality of fixed-line ridesharing vehicles to address the atypical demand for transportation; access data identifying predetermined driving routes of the plurality of fixed-line ridesharing vehicles; based on the accessed data, select a fixed-line ridesharing vehicle to temporarily cease driving along its predetermined driving route; compensate for the inability of the one or more fixed-line ridesharing vehicles in the plurality of fixed-line ridesharing vehicles to address the atypical demand for transportation by directing the selected fixed-line ridesharing vehicle along a new driving route that differs from the predetermined driving route; and after abatement of the inability, terminate travel of the selected fixed-line ridesharing vehicle along the new driving route and direct the selected fixed-line ridesharing vehicle to return to traveling according to its predetermined driving route.

In an embodiment, a method for directing ridesharing vehicles may include receiving information indicative of an event associated with atypical demand for transportation; receiving location information from a plurality of communication devices associated with a plurality of fixed-line ridesharing vehicles; determining an inability of one or more fixed-line ridesharing vehicles in the plurality of fixed-line ridesharing vehicles to address the atypical demand for transportation; accessing data identifying predetermined driving routes of the plurality of fixed-line ridesharing vehicles; based on the accessed data, selecting a fixed-line ridesharing vehicle to temporarily cease driving along its predetermined driving route; compensating for the inability of the one or more fixed-line ridesharing vehicles in the plurality of fixed-line ridesharing vehicles to address the atypical demand for transportation by directing the selected fixed-line ridesharing vehicle along a new driving route that differs from the predetermined driving route; and after abatement of the inability, terminating travel of the selected fixed-line ridesharing vehicle along the new driving route and direct the selected fixed-line ridesharing vehicle to return to traveling according to its predetermined driving route.

In an embodiment, a non-transitory computer-readable storage medium may store instructions that, when executed by at least one processor, cause the at least one processor to perform a method for directing ridesharing vehicles. The method may include receiving location information from a plurality of communication devices associated with a plurality of fixed-line ridesharing vehicles; determining an inability of one or more fixed-line ridesharing vehicles in the plurality of fixed-line ridesharing vehicles to address the atypical demand for transportation; accessing data identifying predetermined driving routes of the plurality of fixed-line ridesharing vehicles; based on the accessed data, selecting a fixed-line ridesharing vehicle to temporarily cease driving along its predetermined driving route; compensating for the inability of the one or more fixed-line ridesharing vehicles in the plurality of fixed-line ridesharing vehicles to address the atypical demand for transportation by directing the selected fixed-line ridesharing vehicle along a new driving route that differs from the predetermined driving route; and after abatement of the inability, terminating travel of the selected fixed-line ridesharing vehicle along the new driving route and direct the selected fixed-line ridesharing vehicle to return to traveling according to its predetermined driving route.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, illustrate various example embodiments. In the drawings:

FIG. 16A is a flowchart showing exemplary process for assigning a ridesharing vehicle to pick-up a user based on a waiting time, according to the present disclosure.

FIG. 16B is a flowchart showing exemplary process for assigning a ridesharing vehicle to pick-up a user based on a utilized capacity, according to the present disclosure.

FIG. 16C is a flowchart showing exemplary process for assigning a ridesharing vehicle to pick-up a user based on a travel duration to reach a desired destination, according to the present disclosure FIG. 16D is a flowchart showing exemplary process for assigning a ridesharing vehicle to pick-up a user based on an estimated walking distance, according to the present disclosure.

FIG. 20 is a flowchart showing an exemplary process for directing a ridesharing vehicle consistent with the present disclosure.

DETAILED DESCRIPTION

Figure 1:
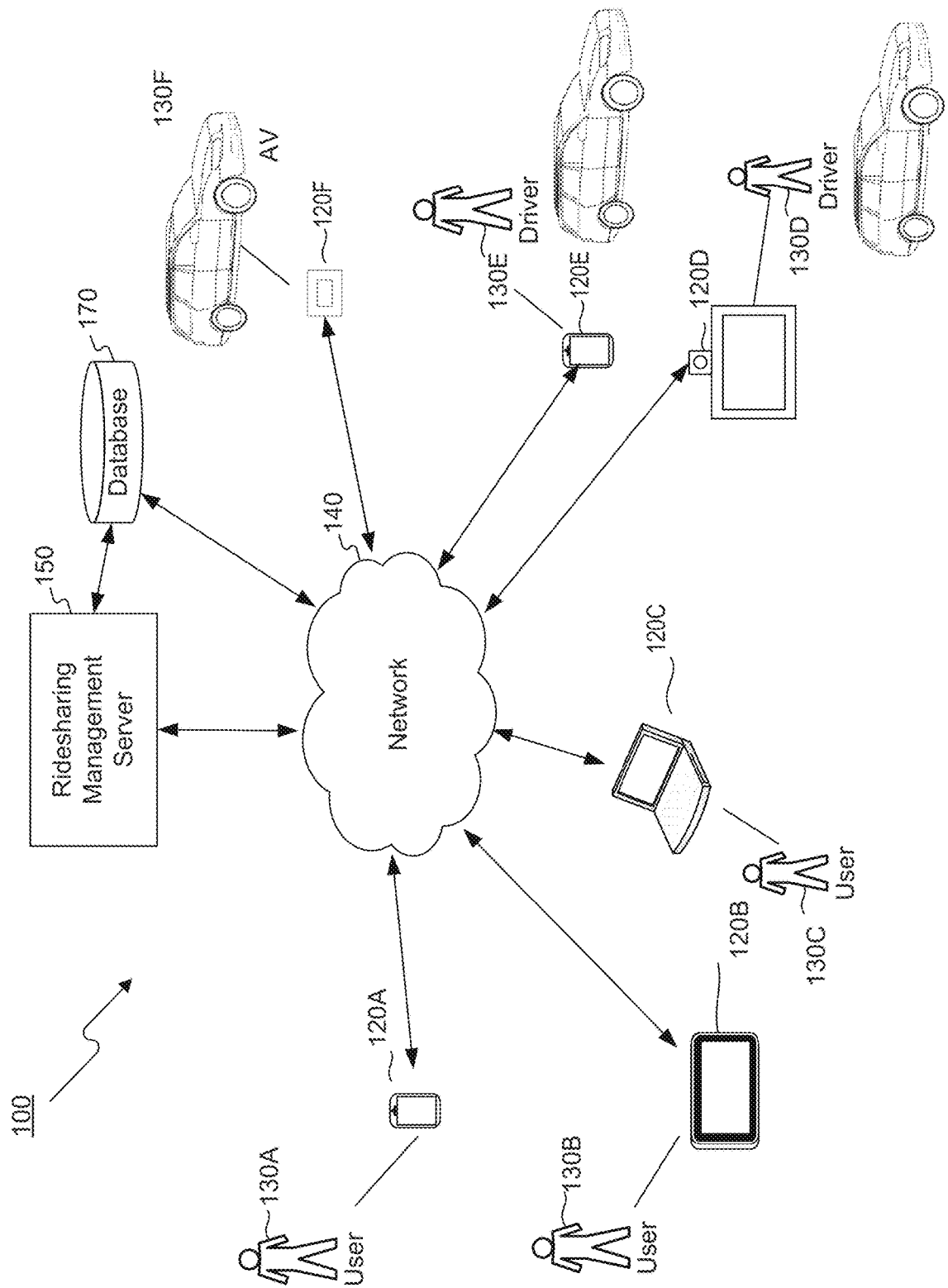
FIG. 1 is a diagram illustrating an example ridesharing management system, in accordance with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments of the present disclosure provide methods and systems for vehicle ridesharing and vehicle ridesharing management. The term "vehicle" or "ridesharing vehicle" as used herein refers to any kind of vehicle (e.g., car, van, SUV, truck, bus, etc.) suitable for human transportation, such as providing ride services. In some embodiments, a vehicle may be a taxi. In some embodiments, a vehicle may include an autonomous vehicle, wherein a control device integrated with the vehicle or a management system separate from the vehicle may send operational instructions and guide the vehicle to designated pick-up locations and drop-off locations. For the ease and conciseness of description, some embodiments disclosed herein may simply refer to a vehicle or a taxi as an example, which does not limit the scope of the disclosed embodiments.

Consistent with some embodiments of the present disclosure, a ridesharing management system may receive a first ride request from a first user. The first ride request may include a starting point and a desired destination. The ridesharing management system may calculate a first estimated pick-up time based on a current location of a vehicle that is in the surrounding areas. After sending a confirmation with the estimated pick-up time, the ridesharing management system may then guide the vehicle to a pick-up location for picking up the first rider. The pick-up location may be a different location from the starting point included in the first ride request. The system may also guide the first user to the pick-up location.

In some embodiments, the system may subsequently receive a second ride request from a second user, for example, while the first user is still in the vehicle. The second ride request may include a second starting point and a second desired destination. The system may calculate a second estimated pick-up time, provide a second confirmation to the second rider, and guide the second rider to a second pick-up location. In some embodiments, the second pick-up location may be a different location from the second starting point included in the second ride request.

In some embodiments, the system may calculate the fares for each user, based on the solo ride portion for a corresponding user, and the shared portion of the ride. For example, the system may offer a discount for the shared portion of the ride. In some embodiments, the system may also calculate the fare amount for a particular user based on various service-related parameters such as user input regarding whether to use toll roads, the walking distance between the starting point and the pick-up location, and the walking distance between the desired destination and the drop-off location.

The embodiments herein further include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a "non-transitory computer-readable storage medium" refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be used in implementing a computer-implemented method. The term "computer-readable storage medium" should be understood to include tangible items and exclude carrier waves and transient signals.

FIG. 1 is a diagram illustrating an example ridesharing management system, in which various implementations as described herein may be practiced, according to some embodiments of the present disclosure. As shown in FIG. 1, ridesharing management system 100 includes one or more mobile communications devices 120A-120F (collectively referred to as mobile communications devices 120), a network 140, a ridesharing management server 150, and a database 170. The plurality of mobile communications devices 120A-120F may further include a plurality of user devices 120A-120C associated with users 130A-130C respectively, a plurality of driver devices 120D and 120E associated with drivers 130D and 130E, and a driving-control device 120F associated with an autonomous vehicle 130F. Consistent with some embodiments of the present disclosure, ridesharing management server 150 may communicate with driving-control device 120F to direct autonomous vehicle 130F to pick up and drop off users 130A-130C. In one example, autonomous vehicles capable of detecting objects on the road and navigate to designated locations may be utilized for providing ridesharing services.

The components and arrangements shown in FIG. 1 are not intended to limit the disclosed embodiments, as the system components used to implement the disclosed processes and features can vary. For example, ridesharing management system 100 may include multiple ridesharing management servers 150, and each ridesharing management server 150 may handle a certain category of ridesharing services, ridesharing services associated with a certain category of service vehicles, or ridesharing services in a specific geographical region, such that a plurality of ridesharing management servers 150 may collectively provide a dynamic and integrated ridesharing service system.

Network 140 may facilitate communications between user devices 120 and ridesharing management server 150, for example, receiving ride requests and other ride server related input from or sending confirmations to user devices, and sending ride service assignments to driver devices and driving-control devices. Network 140 may be any type of networks that provides communications, exchanges information, and/or facilitates the exchange of information between ridesharing management server 150 and user devices 120. For example, network 140 may be the Internet, a Local Area Network, a cellular network, a public switched telephone network ("PSTN"), or other suitable connection(s) that enables ridesharing management system 100 to send and receive information between the components of ridesharing management system 100. Network 140 may support a variety of messaging formats, and may further support a variety of services and applications for user devices 120. For example, network 140 may support navigation services for mobile communications devices 120, such as directing the users and service vehicles to pick-up or drop-off locations.

Ridesharing management server 150 may be a system associated with a communication service provider which provides a variety of data or services, such as voice, messaging, real-time audio/video, to users, such as users 130A-130E. Ridesharing management server 150 may be a computer-based system including computer system components, desktop computers, workstations, tablets, handheld mobile communications devices, memory devices, and/or internal network(s) connecting the components. Ridesharing management server 150 may be configured to receive information from mobile communications devices 120 over network 140, process the information, store the information, and/or transmit information to mobile communications devices 120 over network 140.

For example, in some embodiments, ridesharing management server 150 may be configured to: receive ride requests from user devices 120A-120C, send ride confirmation and ride fare information to user devices 120A-120C, and send ride service assignments (for example, including pick-up and drop-off location information) to driver devices 120D and 120E, and driving-control device 120F. Further, ridesharing management server 150 may further be configured to receive user input from user devices 120A-120C as to various ride service parameters, such as walking distance to a pick-up location, maximum delay of arrival/detour, and maximum number of subsequent pick-ups, etc. In some embodiments, ridesharing management server 150 may be further configured to: calculate ride fares based on a solo portion of a user's ride and a shared portion of the ride. Further, the ride fare calculation may further be based on various ride service parameters set by the user, such as the walking distance involved in the ride, and user selection regarding toll road usage, etc.

Database 170 may include one or more physical or virtual storages coupled with ridesharing management server 150. Database 170 may be configured to store user account information (including registered user accounts and driver accounts), corresponding user profiles such as contact information, profile photos, and associated mobile communications device information. With respect to users, user account information may further include ride history, service feedbacks, complaints, or comments. With respect to drivers, user account information may further include number of ride service assignments completed, ratings, and ride service history information. Database 170 may further be configured to store various ride requests received from user devices 120A-120C and corresponding starting point and desired destination information, user input regarding various service parameters, pick-up and drop-off locations, time of pick-up and drop-off, ride fares, and user feedbacks, etc.

Database 170 may further include traffic data, maps, and toll road information, which may be used for ridesharing service management. Traffic data may include historical traffic data and real-time traffic data regarding a certain geographical region, and may be used to, for example, calculate estimate pick-up and drop-off times, and determine an optimal route for a particular ride. Real-time traffic data may be received from a real-time traffic monitoring system, which may be integrated in or independent from ridesharing management system 100. Maps may include map information used for navigation purposes, for example, for calculating potential routes and guiding the users to a pick-off or drop-off location. Toll road information may include toll charges regarding certain roads, and any change or updates thereof. Toll road information may be used to calculate ride fares, for example, in cases where the user permits use of toll roads.

The data stored in database 170 may be transmitted to ridesharing management server 150 for accommodating ride requests. In some embodiments, database 170 may be stored in a cloud-based server (not shown) that is accessible by ridesharing management server 150 and/or mobile communications devices 120 through network 140. While database 170 is illustrated as an external device connected to ridesharing management server 150, database 170 may also reside within ridesharing management server 150 as an internal component of ridesharing management server 150.

As shown in FIG. 1, users 130A-130E may include a plurality of users 130A-130C, and a plurality of drivers 130D and 130E, who may communicate with one another, and with ridesharing management server 150 using various types of mobile communications devices 120. As an example, a mobile communications device 120 may include a display such as a television, tablet, computer monitor, video conferencing console, or laptop computer screen. A mobile communications device 120 may further include video/audio input devices such as a microphone, video camera, keyboard, web camera, or the like. For example, a mobile communications device 120 may include mobile devices such as a tablet or a smartphone having display and video/audio capture capabilities. A mobile communications device 120 may also include one or more software applications that facilitate the mobile communications devices to engage in communications, such as IM, VoIP, video conferences. For example, user devices 130A-130C may send requests to ridesharing management server 150, and receive confirmations therefrom. Drivers 130D and 130E may use their respective devices to receive ride service assignments and navigation information from ridesharing management server 150, and may contact the users with their respective devices 120D and 120E.

In some embodiments, a user may directly hail a vehicle by hand gesture or verbal communication, such as traditional street vehicle hailing In such embodiments, once a driver accepts the request, the driver may then use his device to input the ride request information. Ridesharing management server 150 may receive such request information, and accordingly assign one or more additional ride service assignments to the same vehicle, for example, subsequent e-hail ride requests received from other mobile communications devices 120 through network 140.

In some embodiments, driver devices 120D and 120E, and driving-control device 120F may be embodied in a vehicle control panel, as a part of the vehicle control system associated with a particular vehicle. For example, a traditional taxi company may install a drive device in all taxi vehicles managed by the taxi company. In some embodiments, driver devices 120D and 120E, and driving-control device 120F, may be further coupled with a payment device, such as a card reader installed as a part of the vehicle control panel or as a separate device associated with the vehicle. A user may then use the payment device as an alternative payment mechanism. For example, a user who hails the taxi on the street may pay through the payment device, without using a user device providing ridesharing service.

Figure 2:
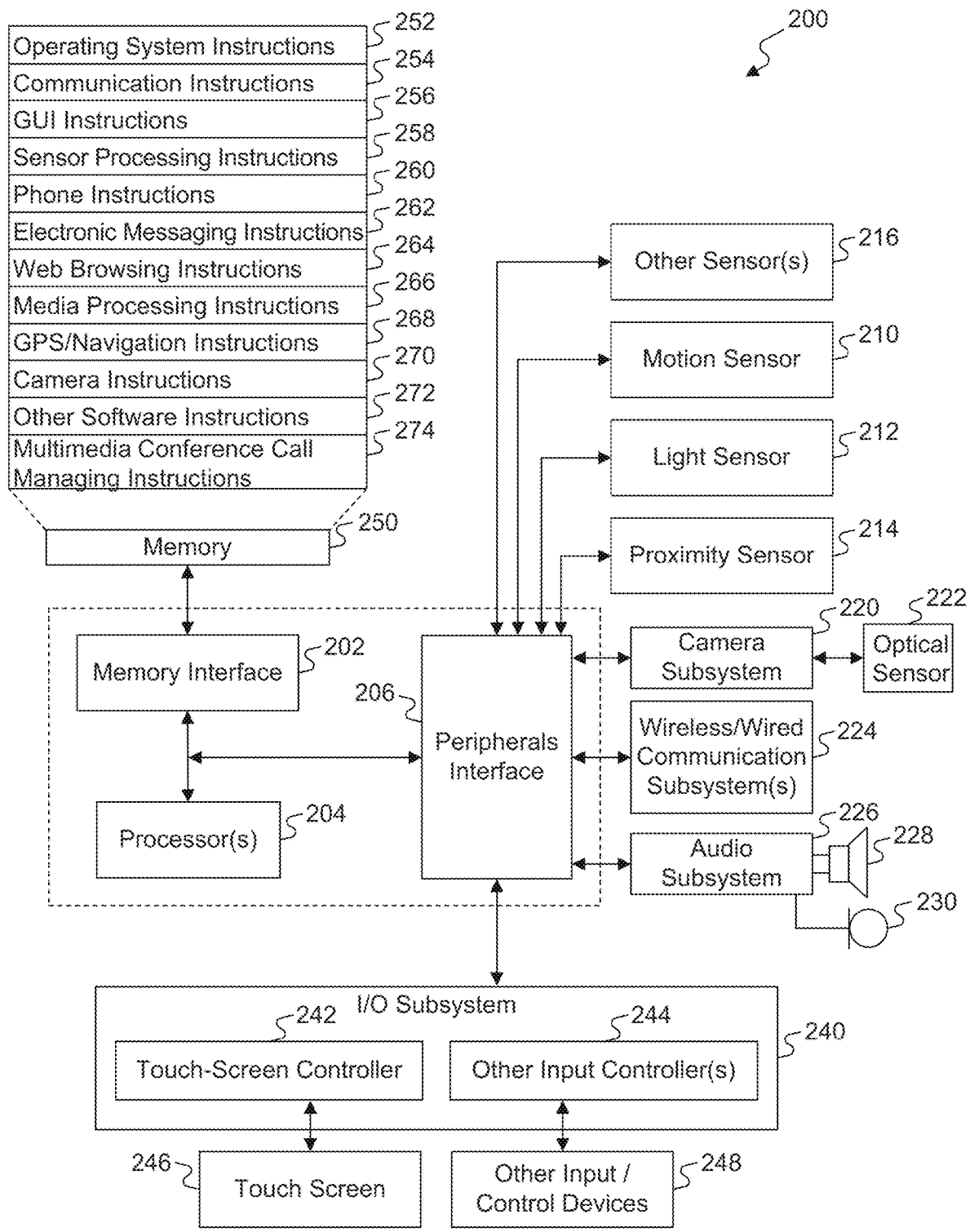
FIG. 2 is a diagram illustrating the components of an example mobile communications device associated with a ridesharing management system, in accordance with some embodiments of the present disclosure.

FIG. 2 is a diagram illustrating the components of an example mobile communications device 200 associated with a ridesharing management system, such as system 100 as shown in FIG. 1, in accordance with some embodiments of the present disclosure. Mobile communications device 200 may be used to implement computer programs, applications, methods, processes, or other software to perform embodiments described in the present disclosure, such as mobile communications devices 120A-120F. For example, user devices 120A-120C, driver devices 120D and 120E, and driving-control device 120F may respectively be installed with a user side ridesharing application, and a corresponding driver side ridesharing application.

Mobile communications device 200 includes a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in mobile communications device 200 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and proximity functions. Other sensors 216 may also be connected to peripherals interface 206, such as a positioning system (e.g., GPS receiver), a temperature sensor, a biometric sensor, or other sensing device, to facilitate related functionalities. A GPS receiver may be integrated with, or connected to, mobile communications device 200. For example, a GPS receiver may be included in mobile telephones, such as smartphone devices. GPS software may allow mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be used to facilitate camera functions, such as recording photographs and video clips.

Communication functions may be facilitated through one or more wireless/wired communication subsystems 224, which includes a Ethernet port, radio frequency receivers and transmitters and/or optical (e.g., infrared) receivers and transmitters. The specific design and implementation of wireless/wired communication subsystem 224 may depend on the communication network(s) over which mobile communications device 200 is intended to operate. For example, in some embodiments, mobile communications device 200 may include wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 may include touch screen controller 242 and/or other input controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 includes high-speed random access memory and/or non-volatile memory, such as one or more magnetic disk storage devices, one or more optical storage devices, and/or flash memory (e.g., NAND, NOR). Memory 250 may store an operating system 252, such as DRAWIN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with ridesharing management server 150 that handles vehicle ridesharing requests. Graphical user interface instructions 256 may include a software program that facilitates a user associated with the mobile communications device to receive messages from ridesharing management server 150, provide user input, and so on. For example, a user may send ride requests and ride service parameters to ridesharing management server 150 and receive ridesharing proposals and confirmation messages. A driver may receive ride service assignments from ridesharing management server 150, and provide ride service status updates.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of mobile communications device 200 may be implemented in hardware and/or in software, including in one or more signal processing and/or application specific integrated circuits.

Figure 3:
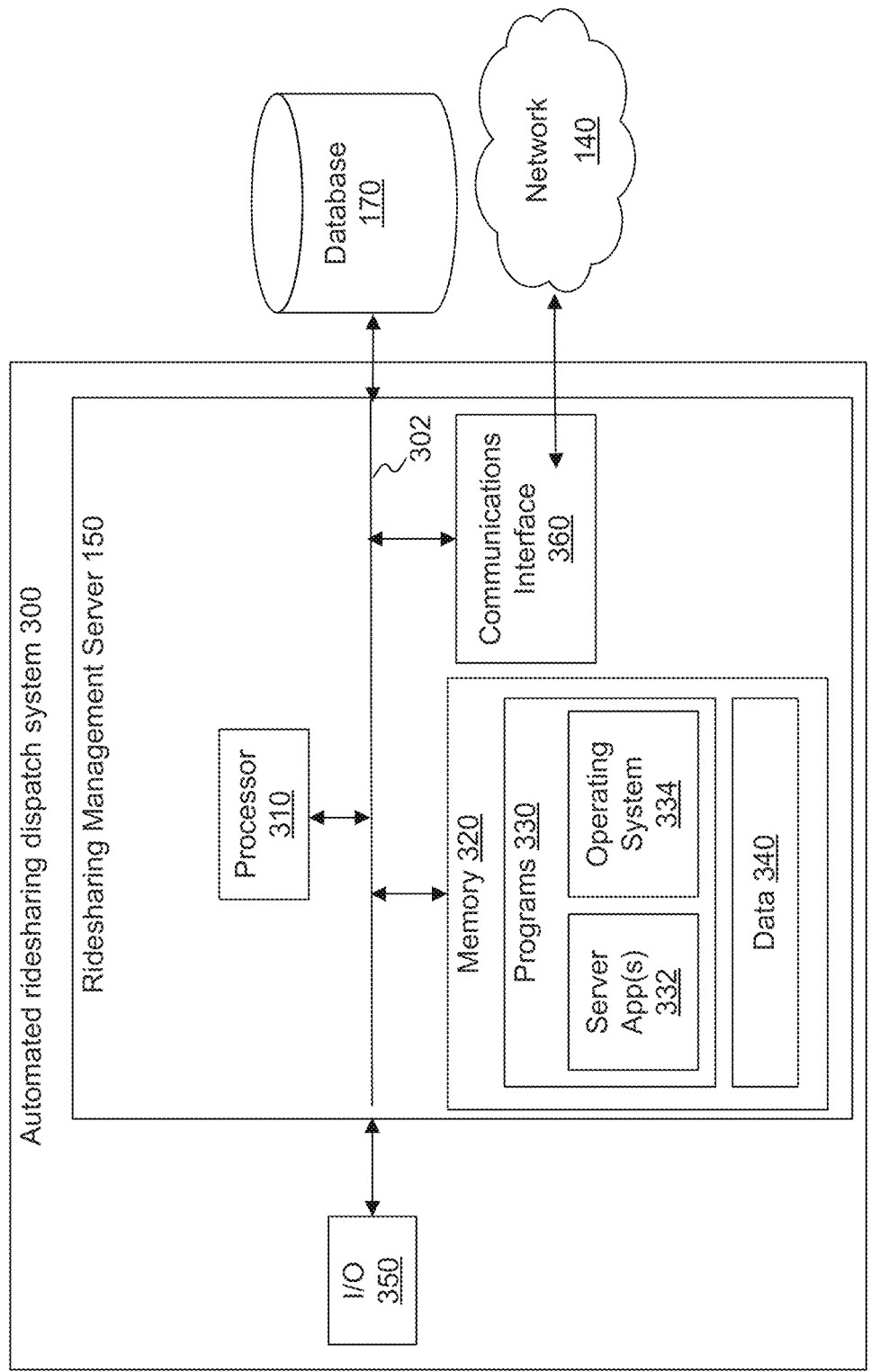
FIG. 3 is a diagram illustrating the components of an example ridesharing management server associated with a ridesharing management system, in accordance with some embodiments of the present disclosure.

FIG. 3 is a diagram illustrating the components of an example an automated ridesharing dispatch system 300 that includes ridesharing management server 150 associated with a ridesharing management system 100, in accordance with some embodiments of the present disclosure. Ridesharing management server 150 may include a bus 302 (or other communication mechanism), which interconnects subsystems and components for transferring information within ridesharing management server 150.

As shown in FIG. 3, automated ridesharing dispatch system 300 may include one or more processors 310, one or more memories 320 storing programs 330 including, for example, server app(s) 332, operating system 334, and data 340, and a communications interface 360 (e.g., a modem, Ethernet card, or any other interface configured to exchange data with a network, such as network 140 in FIG. 1). Automated ridesharing dispatch system 300 may communicate with an external database 170 (which, for some embodiments, may be included within ridesharing management server 150). Automated ridesharing dispatch system 300 may include a single server (e.g., ridesharing management server 150) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When ridesharing management server 150 is a cloud server it may use virtual machines that may not correspond to individual hardware. Specifically, computational and/or storage capabilities may be implemented by allocating appropriate portions of desirable computation/storage power from a scalable repository, such as a data center or a distributed computing environment.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, etc. In some embodiments, processor 310 may include a multiple-core processor arrangement (e.g., dual, quad core, etc.) configured to provide parallel processing functionalities to allow ridesharing management server 150 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Ridesharing management server 150 may include one or more storage devices configured to store information used by processor 310 (or other components) to perform certain functions related to the disclosed embodiments. For example, ridesharing management server 150 may include memory 320 that includes instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to ridesharing management server 150) or external storage communicatively coupled with ridesharing management server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, ridesharing management server 150 may be communicatively connected to one or more remote memory devices (e.g., remote databases (not shown)) through network 140 or a different network. The remote memory devices can be configured to store information that ridesharing management server 150 can access and/or manage. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 may include one or more software modules causing processor 310 to perform one or more functions of the disclosed embodiments. Moreover, processor 310 may execute one or more programs located remotely from one or more components of the ridesharing management system 100. For example, ridesharing management server 150 may access one or more remote programs that, when executed, perform functions related to disclosed embodiments.

In the presently described embodiment, server app(s) 332 may cause processor 310 to perform one or more functions of the disclosed methods. For example, devices associated with users, drivers and autonomous vehicles may respectively be installed with user applications for vehicle ridesharing services, and driver applications for vehicle ridesharing services. Further, a mobile communications device may be installed with both the driver applications and the user applications, for uses in corresponding situations.

In some embodiments, other components of ridesharing management system 100 may be configured to perform one or more functions of the disclosed methods. For example, mobile communications devices 120 may be configured to calculate estimate pick-up and drop-off times based on a certain ride request, and may be configured to calculate estimate ride fares. As another example, mobile communications devices 120 may further be configured to provide navigation service, and location service, such as directing the user to a particular pick-up or drop-off location, and providing information about a current location of the respective user or vehicle to ridesharing management server 150.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating system 334. Ridesharing management server 150 may also include software that, when executed by a processor, provides communications with network 140 through communications interface 360 and/or a direct connection to one or more mobile communications devices 120. Specifically, communications interface 360 may be configured to receive ride requests (e.g., from user devices 120A-120C) headed to differing destinations, and receive indications of the current locations of the ridesharing vehicles (e.g., from driver devices 120D and 120E or driving-control device 120F). In one example, communications interface 360 may be configured to continuously or periodically receive current vehicle location data for the plurality of ridesharing vehicles that are part of ridesharing management system 100. The current vehicle location data may include global positioning system (GPS) data generated by at least one GPS component of a mobile communications device 120 associated with each ridesharing vehicle.

In some embodiments, data 340 may include, for example, profiles of users, such as user profiles or driver profiles. Data 340 may further include ride requests from a plurality of users, user ride history and driver service record, and communications between a driver and a user regarding a particular ride request. In some embodiments, data 340 may further include traffic data, toll road information, and navigation information, which may be used for handling and accommodating ride requests.

Automated ridesharing dispatch system 300 may also include one or more I/O devices 350 having one or more interfaces for receiving signals or input from devices and providing signals or output to one or more devices that allow data to be received and/or transmitted by automated ridesharing dispatch system 300. For example, automated ridesharing dispatch system 300 may include interface components for interfacing with one or more input devices, such as one or more keyboards, mouse devices, and the like, that enable automated ridesharing dispatch system 300 to receive input from an operator or administrator (not shown).

Figure 4A:
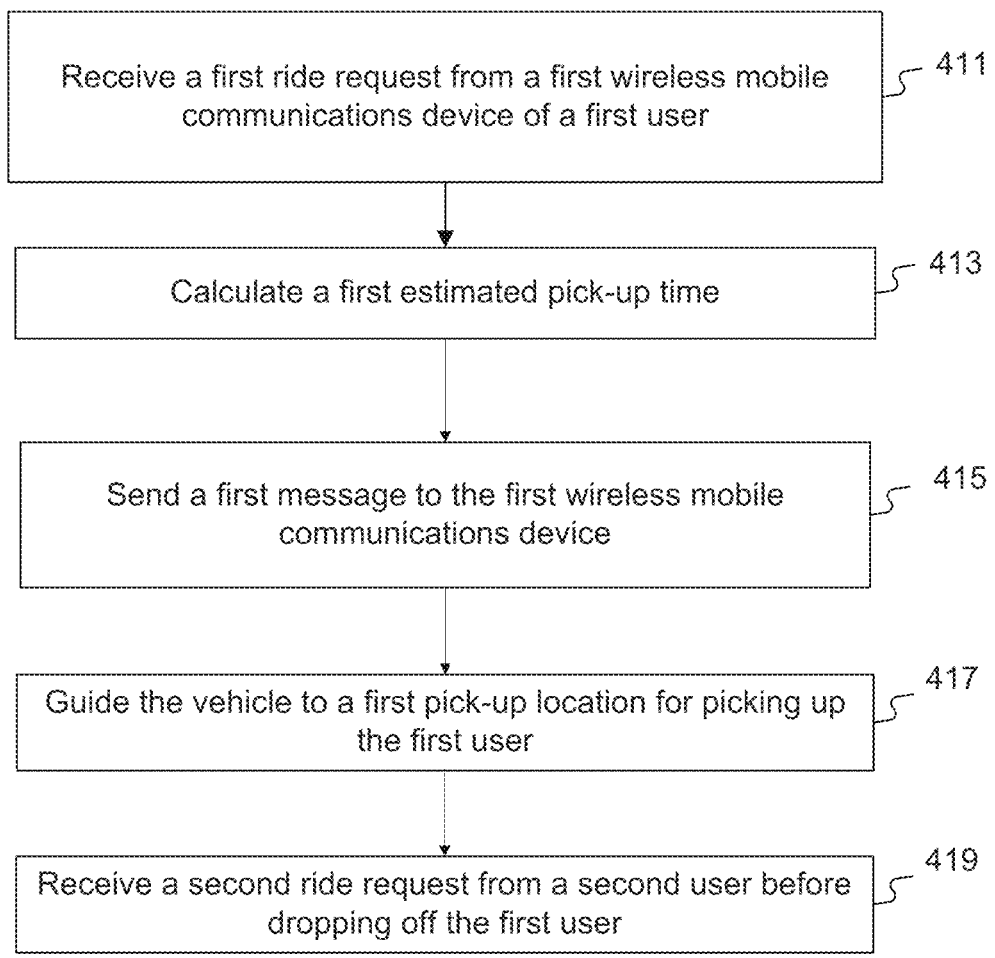
FIGS. 4A and 4B are flowcharts of example processes for vehicle ridesharing management, in accordance with some embodiments of the present disclosure.
Figure 4B:
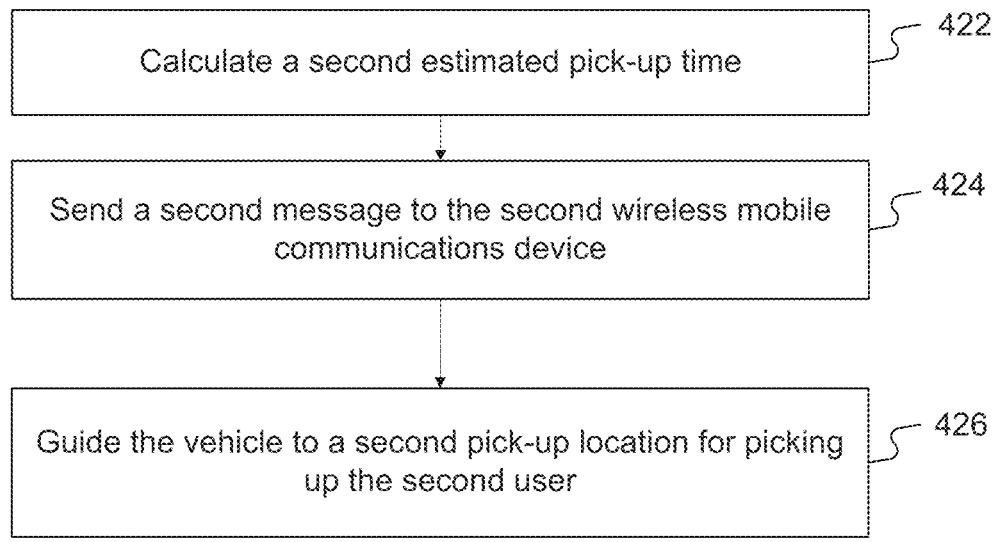

FIGS. 4A and 4B are flowcharts of example processes 410 and 420 for vehicle ridesharing management, in accordance with some embodiments of the present disclosure. In one embodiment, all of the steps of process 400 may be performed by a ridesharing management server, such as ridesharing management server 150 described above with reference to FIGS. 1 and 3. Alternatively, at least some of the steps of process 400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 411, ridesharing management server 150 may receive a first ride request from a first wireless communication of a first user, for example, a request from user 130A sent through user device 120A. The first ride request may include a first starting point and a first desired destination. A ride request may refer to a request from a user needing transportation service from a certain location to another. A starting point may refer to a current location of the user, as input by the user through an input device of an associated user device, or as determined by a location service application installed on the user device. In some embodiments, the starting point may be a location different from the current location of the user, for example, a location where the user will subsequently arrive at (e.g., entrance of a building). A desired destination may refer to a location where the user requests to be taken to.

In some embodiments, the actual pick-up location and the actual drop-off location may be different from the starting point and the desired destination. For example, the pick-up location may be of a certain distance from the starting point, where the user may be directed to for pick-up. By encouraging the user to walk to a pick-up location nearby, consistent with some embodiments, the vehicle may more easily and quickly locate the user without excessive detour, or causing excessive delay for users who are in the vehicle. Similarly, by encouraging the user to walk from a drop-off location different from but within a certain distance from the desired destination, the vehicle may be able to accommodate subsequent pick-ups, or arrive at the subsequent pick-up locations more quickly. The vehicle ridesharing service management system may provide incentives or rewards for the user who are willing to walk a certain distance. For example, the ridesharing management system may offer certain discounts based on the number and distances of the walks involved in a particular ride. Alternatively, the ridesharing management system may offer ride credits corresponding to the number and distance of the walks undertaken by the user during his rides. The user may use the credits for subsequent ride payment, or redeem the credit for money, free rides, or other rewards. Further, advantages of such embodiments may include more efficient vehicle use and management, more user flexibility, and less air pollution associated with vehicle use.

In some embodiments, prior to or after the user sends a ride request to ridesharing management server 150, the user may further input ride service parameters through, for example, a settings component provided on a user interface. Ride service parameters refer to user preference parameters regarding a vehicle ridesharing service, for example, a maximum walking distance from the starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc.

Ride service parameters may be transmitted to ridesharing management server 150 for processing the request and assignment of an available vehicle based on the ride service parameters. For example, a ride request may be associated with a maximum walking distance of 300 meters from a starting point to a pick-up location. When assigning an available vehicle to pick up the user, ridesharing management server 150 may include in the assignment an assigned pick-up location within 300 meters or less of the starting point. Similarly, a ride request may be associated with a maximum walking distance of 0.5 mile from a drop-off location to a desired destination. When assigning an available vehicle to pick up the user, ridesharing management server 150 may include in the assignment an assigned drop-off location within 0.5 mile or less from the desired destination.

For requests associated with a maximum total walking distance of one mile during the ride, when assigning an available vehicle to pick up the user, ridesharing management server 150 may include in the assignment an assigned pick-up location and an assigned drop-off location, a total of a distance from the starting point to the assigned pick-up location and a distance from the assigned drop-off location to a desired destination may be equal to or less than one mile.

In the above examples, the values regarding the walking distances are only exemplary. Other embodiments consistent with the present disclosure may use different options of the distances and may provide a list of options. The distances may further be measured in different units, for example, miles, meters, kilometers, blocks, and feet, etc., which are not limited by the disclosed embodiments herein. In some embodiments, the distance may further be represented by an average walking time from a certain location to another, based on average walking speed, for example, ten minutes, five minutes, etc.

With respect to parameters regarding subsequent pick-ups, such as a maximum number of subsequent pick-ups, and maximum delay of arrival incurred by subsequent pick-ups, ridesharing management server 150 may assign subsequent pick-ups accordingly, without exceeding the parameters set by the user. For example, a ride request may be associated with a maximum number of two subsequent pick-ups during the ride. Ridesharing management server 150 may monitor the service status of the vehicle assigned to pick up the user, and refrain from assigning a third subsequent pick-up before the vehicle arrives at the a drop-off location for dropping off the user. As another example, for a ride request associated with a maximum delay of arrival of ten minutes, when assigning subsequent ride requests, ridesharing management server 150 may calculate an estimated delay that may occur to the user if the same vehicle was to undertake the subsequent ride request. If the estimated delay that may occur to the user is more than ten minutes, ridesharing management server 150 may assign the subsequent ride request to other available vehicles.

In some embodiments, the user may also input selection of toll road usage through the associated user device, to allow or disallow use of toll roads. Ridesharing management server 150 may then take the user's selection into account when assigning an available vehicle for accommodating the ride request, determining travel route, and calculating ride fare for the user. For example, ridesharing management server 150 may adjust the ride fare amount for a corresponding user based on the toll roads selection input and toll charges involved. For another example, if a first user does not permit toll road usage, before any subsequent pick-ups during the ride, ridesharing management server 150 may send a route to an assigned vehicle that does not include toll roads. For another example, if a subsequent user sharing the ride permits usage of toll road, ridesharing management server 150 may not charge the first user for any overlap portion of the ride where toll roads are used, change the route to include toll roads after the first user is dropped off, or assign the second user to a ridesharing vehicle with users that permit toll road usage.

In some embodiments, the ride request information may also be input from the driver device, for example, driver device 120D, or from a device associated with the vehicle. In the case of street hailing, where the user hails a vehicle on the street without using a vehicle ridesharing service application on a mobile communications device, the driver, for example, driver 130D, may input information such as the starting point/pick-up information and destination information through driver device 120D, which may then be transmitted to ridesharing management server 150.

At step 413, ridesharing management server 150 may calculate an estimated pick-up time, for example, based on a current location of an assigned vehicle and the first starting point included in the first ride request. An estimated pick-up time may refer to a time period before an assigned vehicle arrives at a pick-up location for picking up the user.

The assigned vehicle may refer to the vehicle that is assigned to undertake the first ride request, for example, a taxi in a taxi fleet, one of a plurality of vehicles managed by a transportation service system, or a plurality of vehicles owned by a plurality of owners and used to provide ridesharing services. The pick-up location may be the same as the starting point, or an assigned pick-up location associated with the starting point.

The estimated pick-up time may be determined based on a distance between a current location of the assigned vehicle and the pick-up location, and an estimate speed of traveling along the route between the two locations. The current location of the assigned vehicle may be determined by a location service application installed on a driver device, a driving-control device, or by a location determination component in the ridesharing management system 100, which may be a part of or separate from ridesharing management server 150. In some embodiments, the estimated pick-up time may further be determined based on historical or real-time traffic data, and a route currently followed by the vehicle.

In some embodiments, process 410 may further include locating one or a plurality of potential available vehicles, and selecting an assigned vehicle therefrom. For example, potential available vehicles may include vacant vehicles in the surrounding areas of the first starting point, and vehicles heading to a location close to the first starting point for assigned pick-ups or drop-offs. Ridesharing management server 150 may filter potential available vehicles by ride service parameters set by the users who are inside the vehicle, for example, removing occupied vehicles where a user inside the vehicle does not permit subsequent pick-ups, or occupied vehicles where the user requires a minimal delay. In some embodiments, ridesharing management server 150 may filter potential assignment vehicles by choosing a vehicle that would involve minimal walking of the user, or walking without the need of crossing the street. In some embodiments, ridesharing management server 150 may further filter potential assignment vehicles by choosing a vehicle that would involve minimal detour for the vehicle to arrive at the pick-up location. In some embodiments, the assigned vehicle may be selected by applying multiple filter criteria, or by applying multiple filter criteria in a certain order.

In some embodiments, the pick-up location may be an assigned pick-up location different from the first starting point, for example, half a block or further away from the first starting point. Ridesharing management server 150 may assign a pick-up location based on ride service parameters set by the first user, as described above at step 411. Ridesharing management server 150 may further assign a pick-up location which is along a main street where an assigned vehicle can easily locate, or a location which would not require an assign vehicle to take a U-turn. In cases where there are one or more other users in the vehicle, ridesharing management server 150 may assign a pick-up location close to the vehicle's next assigned drop-off, or on the side of a street where the vehicle will soon go through. In some embodiments, ridesharing management server 150 may adjust selection of the pick-up location based on filtering results of potential assignment vehicles, or vice versa. The two selection processes may complement each other to reach one or more optimal combinations.

In some embodiments, where there are multiple potential assignment vehicles, each with a corresponding potential pick-up location, an estimated pick-up time may be respectively calculated corresponding to each of the potential assignment vehicles. Ridesharing management server 150 may then choose the vehicle with the shortest estimated pick-up time to be the assigned vehicle.

At step 415, ridesharing management server 150 may send a first message to a user device associated with the first user, which is, in this example, user device 120A. The first message may be configured to cause an indication of the calculated first estimated pick-up time to appear on a display of user device 120A. The message may appear in different formats, for example, a text message including the estimated pick-up time, an audio message, or an image, the specific implementation of which are not limited by the disclosed embodiments herein.

In one embodiment, the message includes a confirmation that the ridesharing request is accepted. If ridesharing management server 150 assigns a pick-up location different from the starting point, the message may further cause the display of an indication of the assigned pick-up location. Ridesharing management server 150 may further provide a navigation option which may be displayed on a user interface. A selection of the navigation option may then provide walking directions the user to the assigned pick-up location for pick-up. The message may further cause a display of an indication of an estimated walking distance from the starting point to the assigned pick-up location. In addition, the message may include an estimated walking distance from the assigned drop-off location to the desired destination. The assigned drop-off location may be a location close to the desired destination, within the maximum walking distance parameters set by the first user. For example, the drop-off location may be at a location half a block away or further from the desired destination, and may be along a main street where the vehicle may easily locate and access. For another example, the drop-off location may be determined based on a route towards the next pick-up location, such that the vehicle may easily drop off the first user on its way to the next pick-up location, thereby avoiding an extra detour.

In another embodiment, the message may include one or more proposals associated with different vehicles. Each proposal may include information about the proposed pick-up location. The information about the proposed pick-up location may include the distance from the user to the proposed pick-up location. Each proposal may include a price of the ride associated with the type of the ride, and an estimation of a pick-up time. The estimate may be presented as a range. In one example, each proposal may include different pick-up locations, different prices, and/or different estimations of a pick-up time. According to this embodiment, step 415 may also include receiving a proposal selection reflective of a selected pick-up vehicle and sending an addition message that includes information about the selected vehicle, and the driver associated with the vehicle. For example, the vehicle information may include the license plate number, brand, color, and/or model of the vehicle. The driver information may include a name, nickname, profile photo, ratings, number of previous rides, and/or contact information of the driver. The message may further include a contact option allowing the user to contact the driver, for example, a "contact the driver" button, which the user may select to initiate a communication session with the driver.

At step 417, ridesharing management server 150 may guide the assigned vehicle to the first pick-up location for picking up the first user. For example, ridesharing management server 150 may transmit direction information to the driver device associated with the assigned vehicle, for example, driver device 120D or driving-control device 120F. In some embodiments, a navigation component of the driver device, or the driving-control device may perform the step of guiding the vehicle to the first pick-up location. Correspondingly, ridesharing management server 150, or a navigation component of the user device 120A, may guide the user to the first pick-up location, in cases where the pick-up location is an assigned pick-location different from the first starting point. For example, for autonomous vehicles used for ridesharing services, such as autonomous vehicle 130F as shown in FIG. 1, the vehicle itself may be capable of using a variety of techniques to detect its surroundings, identify feasible paths, and navigate without direct human input.

In some embodiments, once the vehicle is assigned to pick up the user, ridesharing management server 150 may assign a communication channel for the driver associated with the assigned vehicle to communicate with the user, for example, a masked phone number. In some embodiments, a user interface of a driver device, such as driver device 120D, may include an option to send notification messages to the user, for example, a pre-defined message button of "I'm here." Once the vehicle arrives at the pick-up location, the driver may click the message button to send the message to the user. This way, the driver may not need to dial out or type a message in order to notify the user of the vehicle's arrival, reducing driver distraction and associated safety hazards.

At step 419, ridesharing management server 150 may receive a second ride request from a second user. In some embodiments, the second user request may be a street hailing request received directly by the vehicle while the first user is still inside, namely, before dropping off the first user. The vehicle may then undertake the second ride request, if the first user permits subsequent pick-ups. In some embodiments, the driver of the vehicle may input the second ride request information through a driver device, for example, driver device 120D associated with driver 130D. The input may inform ridesharing management server 150 that the vehicle has undertaken a second ride request, or may further include the pick-up location and destination information of the second user. Ridesharing management server 150 may then accordingly determine whether to assign additional pick-ups to the same vehicle, and may further send direction information guiding the vehicle to the second user's destination.

In some embodiments, the second ride request may be received by ridesharing management server 150 from a second wireless mobile communications device, for example, user device 120B associated with user 130B as shown in FIG. 1. The second ride request may further include a second starting point, and a second desired destination. Ridesharing management server 150 may then assign a corresponding ride service to an available vehicle, which may be the vehicle that has picked up the first user, before dropping off the first user. In processing the second ride request, the example process 420 as shown in FIG. 4B may be performed.

At step 422, ridesharing management server 150 may calculate a second estimated pick-up time, for example, based on a second current location of the vehicle and the second starting point. The second estimated pick-up time may refer to an estimated time period before the vehicle arrives at a second pick-up location for picking up the second user. The second pick-up location may be an assigned pick-up location different from, but associated with, the second starting point. Assignment of the second pick-up location may include similar steps as described above with reference to FIG. 4A, details of which are not repeated herein.

At step 424, ridesharing management server 150 may send a second message to the second wireless mobile communication device, which is user device 120B in this example. The second message may be configured to cause an indication of the calculated second estimated pick-up time to appear on a display of the second wireless mobile communication device. As described above with reference to FIG. 4A, the message may appear in different formats, and may further cause a display of multiple proposals with multiple options for the second pick-up location, walking distance, walking directions from the second starting point to the second pick-up location, etc., the details of which are not repeated herein.

In some embodiments, ridesharing management server 150 may set the second pick-up location at substantially the same location as the first pick-up location, for example, half a block away, or 100 meters away from the first pick-up location. This way, the vehicle may pick up both users at about the same time at substantially the same location, further improving service efficiency. In some embodiments, ridesharing management server 150 may set the second pick-up location at a substantially the same location as the first drop-off location, wherein the vehicle may drop off the first user, and pick up the second user at about the same time, without extra travelling. Further, in some embodiments, the second drop-off location may be set at substantially the same location as the first drop off location, such that the vehicle may drop off multiple users at the same time.

In some embodiments, ridesharing management server 150 may set the first pick-up location to substantially differ from the first starting point, and the second pick-up location to substantially differ from the second starting point, for example, to ensure both pick-up locations are along the same side of the same street where the vehicle may go through. Ridesharing management server 150 may then send respective directions to the first user device and the second user device, to guide the users to the respective pick-up locations.

In some embodiments, ridesharing management server 150 may set the first pick-up location at substantially the same as the first starting point, and set the second pick-up location to substantially differ from the second starting point. For example, the selection of the pick-up locations may be made such that the first pick-up location and the second pick-up location are close to one another, both pick-up locations are along the same street, or the second pick-up location is close to the first drop-off location. Ridesharing management server 150 may then send respective directions to the first user device and the second user device, to guide the users to the respective pick-up locations.

At step 426, ridesharing management server 150 may guide the vehicle to a second pick-up location for picking up the second user. As described above with reference to FIG. 4A, this step may also be performed by a navigation component of the driver's device (e.g., driver device 120D or driving-control device 120F associated with autonomous vehicle 130F).

In some embodiments, ridesharing management server 150 may change the first drop-off location after receiving the second ride request, and the change may be made without pre-approval of the first user. The first drop-off location refers to a location for dropping off the first user. As described above with reference to FIG. 4A, the first drop-off location may be the same as the first desired destination, or at a location different from the first desired destination.

For example, the second pick-up location may be set at a location close to the first desired destination, included in the first ride request. When assigning the second ride request to the vehicle, ridesharing management server 150 may change the first drop-off location to a location closer to or at the first desired destination, thus reducing the walking distance for the first user to arrive at his desired destination. For another example, the first drop-off location may be changed to a location where the first user does not need to cross the street to arrive at his desired destination, without causing or increasing detour for the vehicle to arrive at the second pick-up location.

In some embodiments, ridesharing management system 100 may subsequently receive a plurality of subsequent ride requests. These additional ride requests may either be received by ridesharing management server 150 and assigned to the vehicles, or received by the vehicles in the form of street hailing Steps described above with reference to FIGS. 4A and 4B may similarly be used to process the third ride request.

For example, ridesharing management server 150 may receive a third ride request from a third user device, for example, user device 120C associated with user 130C, as shown in FIG. 1. Ridesharing management server 150 may process the request and assign the request to the vehicle while at least one of a first user and a second user is still in the vehicle. The third ride request may further include a third starting point and a third desired destination. Ridesharing management server 150 may calculate a third estimated pick-up time, and send a confirmation to a user's device (e.g., user device 120C). Ridesharing management server 150 may transmit direction and route information to the driver's device associated with the vehicle (e.g., driver device 120D as shown in FIG. 1), to guide the vehicle to pick up and drop off user 130C.

As described above with reference to FIGS. 4A and 4B, processing of subsequent ride requests may take into account of the ride service parameters set by the users whose requests have previously been received and assigned. For example, if both the first user and the second user are still in the vehicle, and one of them has set a maximum delay of arrival, ridesharing management server 150 may not assign the third request to the same vehicle if such assignment would cause a delay longer than the set value. For example, if the first user has set a maximum delay of arrival of 10 minutes, ridesharing management server 150 may calculate an estimated time period it takes for the vehicle to pick up (and/or drop off) the third user before dropping off the first user. If the estimated time would cause a total delay of arrival for the first user to exceed 10 minutes, ridesharing management server 150 may therefore assign the third ride request to another vehicle. For another example, if the second user has set a maximum number of one co-rider and the second user will be dropped off earlier than the first user, ridesharing management server 150 may not assign to the same vehicle, as such assignment may cause violation of the parameter (maximum number of one co-rider) set by the second user.

Figure 5:
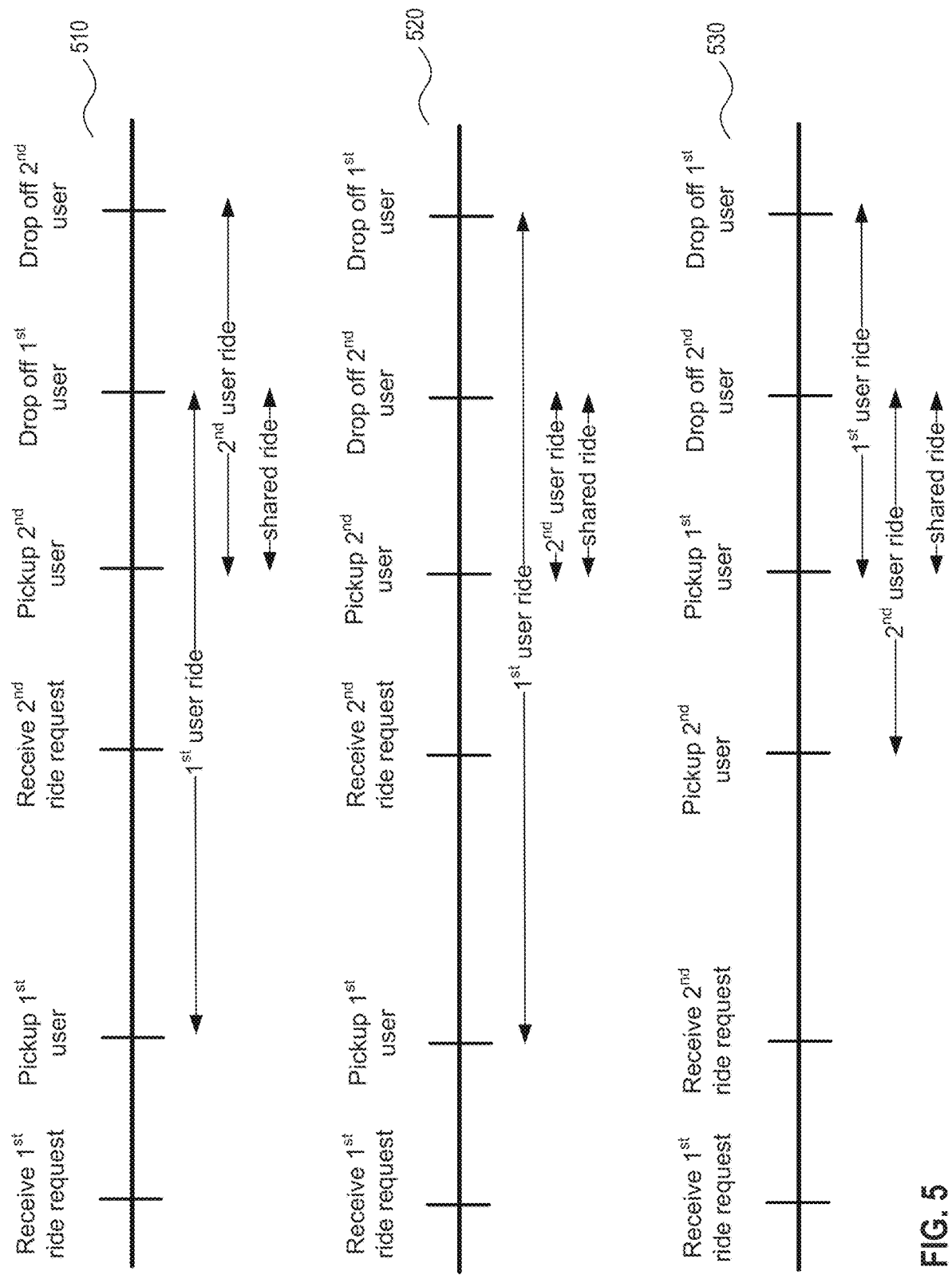
FIG. 5 is a diagram of example timelines showing ridesharing arrangements, in accordance with some embodiments of the present disclosure.

FIG. 5 is a diagram of three example timelines showing ridesharing arrangements, in accordance with some embodiments of the present disclosure. As shown in example timelines 510, 520, and 530, for a particular assigned vehicle undertaking a first ride request from a first user and a second ride request from a second user, the order of pick-ups and drop-offs for the second user may vary. For example, ridesharing management server 150 may receive a plurality of ride requests, design an optimal path and pick-up/drop-off order for a particular assigned vehicle undertaking multiple requests, and assign additional pick-ups as the vehicle completes a part of or all of the ride requests. For example, as shown in example timeline 510, a vehicle may receive a second ride request after picking up the first user, and drop off the first user before dropping off the second user. A corresponding shared ride portion may be the portion of ride between the pick-up of the second user and drop-off of the first user. As shown in example timeline 520, the vehicle may receive a second ride request after picking up the first user, and drop off the second user before dropping off the first user. A corresponding shared ride portion may be the portion of ride between the pick-up of the second user and drop-off the second user. As another example, as shown in example timeline 530, the vehicle may receive the first ride request and the second ride request before any pick-up. The vehicle may then pick up the second user before picking up the first user, and drop off the second user before dropping off the first user. A corresponding shared ride portion may be the portion of ride between pick-up of the first user and drop-off of the second user. Depending on the order of pick-ups and drop-offs, the ridesharing management server may then determine a corresponding shared ride portion, and calculate ride fare for each user based on, for example, the shared portion, solo portion of each user, and/or other factors such as the ride service parameters set by each user.

Real-Time Ridesharing Solutions for Unanticipated Changes During a Ride

Embodiments of the present disclosure may allow for a vehicle management system to manage a fleet of vehicles for hire. For example, the vehicle management system may receive a plurality of requests for a ride from a plurality of users and assign a first ridesharing vehicle to a group of users selected from the fleet of vehicles based on the information relating to ride requests. The vehicle management system may also detect an unanticipated ridesharing event and determine whether the first ridesharing vehicle is able to pick up a next user from the group of the users by the estimated pick-up time. The vehicle management system may further assign a second ridesharing vehicle to the next user if the first ridesharing vehicle may not be able to pick up the next user. The vehicle management system may also update (or generate) a route for the first and second ridesharing vehicle and direct the vehicles according to the routes.

Figure 6:
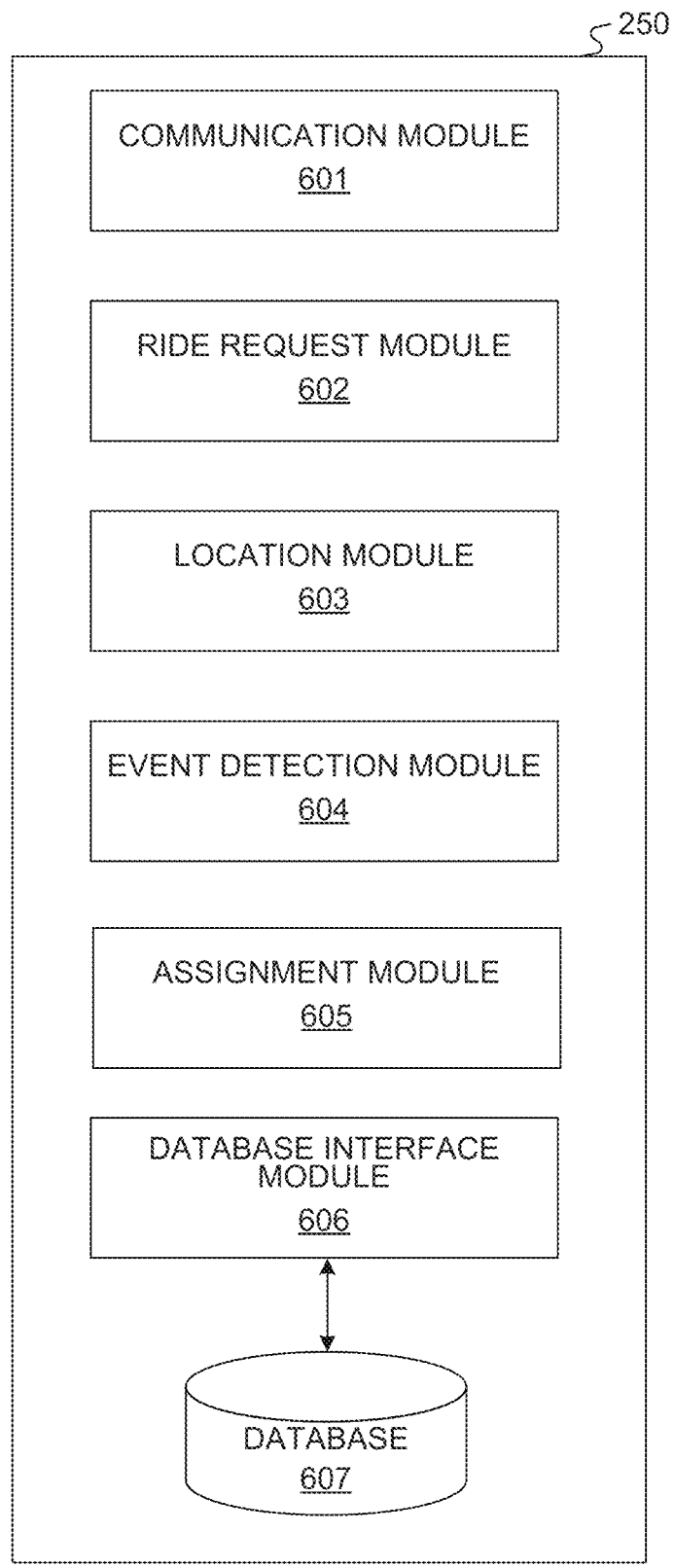
FIG. 6 depicts an embodiment of a memory module for managing a fleet of ridesharing vehicles consistent with the present disclosure.

FIG. 6 depicts an embodiment of memory module 250 for managing a fleet of ridesharing vehicles consistent with the present disclosure. Memory 250 may store a plurality of modules, and may be executable by at least one processor to perform various methods and processes disclosed herein. Further, it should be noted that memory 250 may store more or fewer modules than those shown in FIG. 6, depending on implementation-specific considerations.

As illustrated in FIG. 6, memory 250 may store software instructions to execute a communication module 601, a ride request module 602, a location module 603, an event detection module 604, an assignment module 605, and a database interface module 606. Memory 250 may further store a database 607.

Communication module 601 may include software instruction for communicating with other components of ridesharing management system 100 (e.g., one or more user devices 120A-120C, driver devices 120D and 120E, driving-control device 120F). Ride request module 602 may include software instruction for receiving ride requests from a plurality of users. Location module 603 may include software instruction for receiving locations of ridesharing vehicles from one or more sources. Event detection module 604 may include software instruction for detecting an unanticipated event based on updated information associated with one or more users and/or one or more vehicles. Assignment module 605 may include software instruction for electronically assigning a ride request to a ridesharing vehicle. Database interface module 606 may include software instruction executable to interact with database 607 and to store and/or receive information (e.g., geographical maps associated with a geographical area in which one or more vehicles are operating, current traffic information of a geographical area, historical data for efficient routes).

Communication module 601 may include software instructions for facilitating communications between the device on which it is implemented (e.g., ridesharing management server 150) and another component of ridesharing management system 100 (e.g., mobile communications devices 120A-120F, one or more vehicles, database 170). For example, ridesharing management server 150 may receive a plurality of requests for a ride from a plurality of users (via, e.g., mobile communications devices associated with the users) via communication module 601. As another example, ridesharing management server 150 may electronically assign a specific user to a specific vehicle via communication module 601.

Ride request module 602 may include software instructions for receiving a plurality of requests for a ride from a plurality of users. Each ride request may include a starting point and a desired destination within the geographic area. In some embodiments, ride request module 602 may determine a pick-up location and a drop-off location. The determined pick-up location may be a location other than but in proximity to the starting point, and the determined drop-off location may be a location other than but in proximity to the desired destination. Additionally or alternatively, ride request module 602 may determine the drop-off location for a user based on the status of a vehicle to be assigned to this user, the desired destination of the ride request, and/or other factors. For example, in one embodiment, a ride request may include information indicating that the desired destination is a building at the corner of an intersection of two cross streets. Ride request module 602 may determine that dropping the user off at the intersection would result in the vehicle entering a one-way street, impeding a more efficient route to a charging station. Thus, ride request module 602 may instead, for example, drop the user off at a location proximal to the desired destination, and avoid entering the one-way street. Ride request module 602 may also electronically assign ride requests to one or more vehicles.

Location module 603 may include software instructions for receiving current vehicle location data for a ridesharing vehicle. In some embodiments, the current vehicle location data may include global positioning system (GPS) data generated by at least one GPS component associated with the ridesharing vehicle. Alternatively or additionally, the location data may include data of other types of global positioning technologies (e.g., Galileo or global navigation satellite system (GNSS)) generated by a corresponding positioning component. Additionally or alternatively, location module 603 may receive other location information, such as cell tower triangulation data, Wi-Fi or other signal strength data, or any other combination of location information. In one example, location module 603 may receive the location data, for example, from a mobile communication device (e.g., a smartphone, tablet, wearable device, etc.) associated (e.g., located in the passenger cabin) with the ridesharing vehicle.

Assignment module 605 may electronically assign a first ridesharing vehicle to a first group of users based on the ride requests. Assignment module 605 may also determine a route for the first ridesharing vehicle to pick up and drop off the users and direct the first ridesharing vehicle according to the determined route.

Event detection module 604 may receive (or detect) an unanticipated ridesharing event after the first ridesharing vehicle picked up one or more users of the first group of users. An unanticipated ridesharing event refers to an event that was not anticipated or did not occur when assignment module 605 electronically assigned the users to the first ridesharing vehicle. For example, after the first ridesharing vehicle 701 picks up the first user and is on its way to the pick-up location of the second user, second user 712 transmits a request to communication module 601 to modify the pick-up time because second user 712 will arrive at the pick-up location late. Event detection module 604 may consider (or detect) this event as an unanticipated ridesharing event. Assignment module 605 may determine the ability of the first ridesharing vehicle to pick up a next user from the first group of users at a corresponding estimated pick-up time due to the unanticipated ridesharing event. Assignment module 605 may also assign a second ridesharing vehicle to the next user if the first ridesharing vehicle may not be able to pick up the next user (or cause a delay in estimated time of arrival (ETA) to other users to exceed a threshold). Assignment module 605 may further update the route for the first and second ridesharing vehicles. Assignment module 605 may also direct the first and second ridesharing vehicles according to the updated routes.

Database interface module 606 may include software instructions for interacting with database 607, to store and/or receive information. Database 607 may be configured to store any type of information associated with modules 601-606, depending on implementation-specific considerations.

Modules 601-606 may be implemented in software, hardware, firmware, or any combination of software, hardware or firmware. For example, if the modules are implemented in software, they may be stored in memory 250. However, in some embodiments, any one or more of modules 601-606 and data associated with database 607 may, for example, be stored in processor 204 and/or executed on a device associated with ridesharing management system 100. Modules 601-606 may be configured to interact with each other and/or other modules of memory 250 to perform functions consistent with disclosed embodiments.

Figure 7:
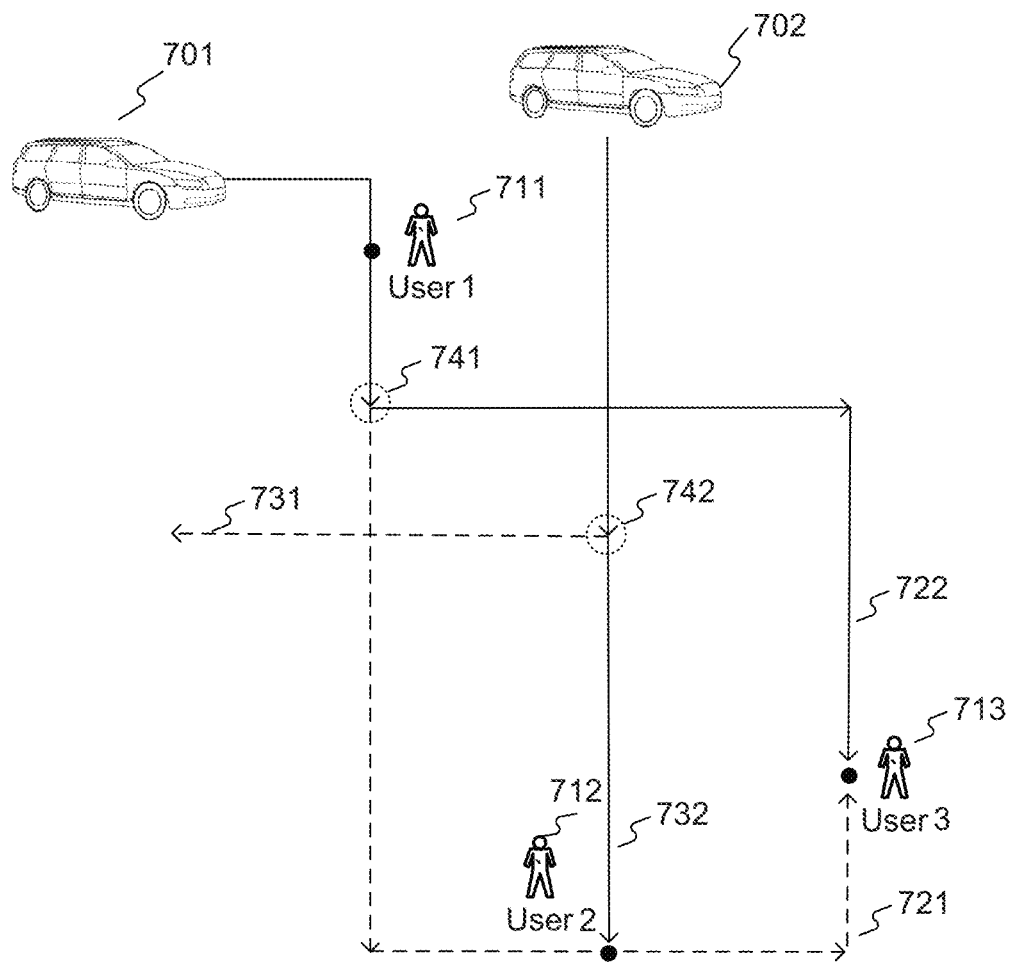
FIG. 7 is a schematic illustration of an exemplary process for directing ridesharing vehicles.

FIG. 7 is a schematic illustration of an exemplary process for directing ridesharing vehicles. As illustrated in FIG. 7, a first user 711 transmits a first request for a rider to ridesharing management server 150 via a first user device 120. The first request includes a first desired pick-up location and a first desired destination (not shown). A second user 712 transmits a second request for a ride to ridesharing management server 150 via a second user device 120. The second request includes a second desired pick-up location and a second desired destination (not shown). A third user 713 transmits a third request for a ride to ridesharing management server 150 via a third user device 120. The third request includes a third desired pick-up location and a second desired destination (not shown).

Ride request module 602 may determine a first pick-up location to pick up first user 711, a second pick-up location to pick up second user 712, and a third pick-up location to pick up third user 713 based on the first, second, and third ride requests. Assignment module 605 may electronically assign first user 711, second user 712, and third user 713 to first ridesharing vehicle 701. Assignment module 605 may also provide, to each of the users, the description of the determined pick-up location and an estimated pick-up time. Assignment module 605 may further direct first ridesharing vehicle 701 to drive along route 721 (i.e., dashed line 721 shown in FIG. 7) to pick up first user 711, second user 712, and third user 713.

Event detection module 604 may detect an unanticipated ridesharing event after first ridesharing vehicle 701 picks up some of the users and before picking up the last users. An unanticipated ridesharing event refers to an event that was not anticipated or did not occur before assignment module 605 electronically assigned the users to first ridesharing vehicle 701. For example, after first ridesharing vehicle 701 picks up first user 711 and is on its way to the pick-up location of second user 712, second user 712 transmits a request to communication module 601 to modify the pick-up time because second user 712 will arrive at the pick-up location late. Event detection module 604 may consider (or detect) this event as an unanticipated ridesharing event. Event detection module 604 may also determine the inability of first ridesharing vehicle 701 to pick up a next user (i.e., third user 713) at a corresponding estimated pick-up time due to the unanticipated ridesharing event. Assignment module 605 may further reassign second user 712 to another ridesharing vehicle (e.g., second ridesharing vehicle 702). Assignment module 605 may determine a new route for first ridesharing vehicle 701 that does not include the determined pick-up location of second user 712 and a new route for second ridesharing vehicle 702 that includes the determined pick-up location of second user 712. For example, assignment module 605 may determine a new route 722 for first ridesharing vehicle 701 (solid line 722 shown in FIG. 7) and direct first ridesharing vehicle 701 to change its original route (dashed route 721) at point 741 to pick up third user 713, skipping second user 712. Assignment module 605 may also determine a new route for second ridesharing vehicle 702 (solid line 732 shown in FIG. 7) and direct second ridesharing vehicle 702 to change its original route (dashed route 731) at point 742 to pick up second user 712.

Alternatively, instead of reassigning second user 712, assignment module 605 may reassign third user 713 to second ridesharing vehicle 702. Assignment module 605 may also determine a new route for first ridesharing vehicle 701 skipping the pick-up location of third user 713. Accordingly, first ridesharing vehicle 701 may pick up second user 712 at the corresponding pick-up location as scheduled. Assignment module 605 may further determine a new route for second ridesharing vehicle 702 to pick up third user 713.

Figure 8:
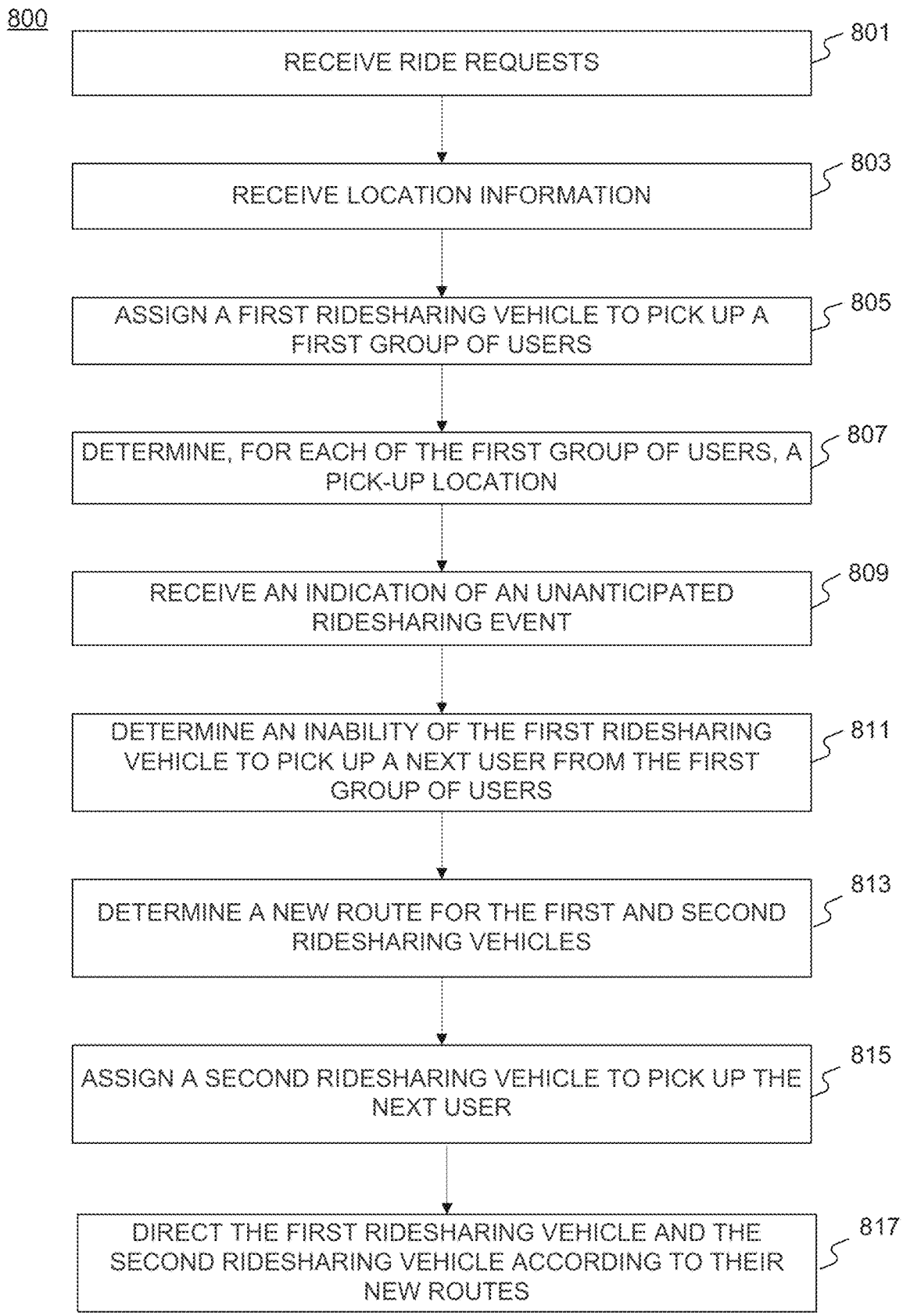
FIG. 8 is a flowchart showing an exemplary process for directing a plurality of ridesharing vehicles according to updated information in accordance with the present disclosure.

FIG. 8 is a flowchart showing an exemplary process 800 for directing a plurality of ridesharing vehicles according to updated information in accordance with some embodiments of the present disclosure. In one embodiment, the steps of process 800 may be performed by a vehicle management server, such as ridesharing management server 150 described above with reference to FIGS. 1 and 3. Alternatively, at least some of the steps of process 800 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may implement the example methods disclosed herein.

At step 801, ride request module 602 may receive, via a communications interface, ride requests from a first plurality of communication devices associated with a plurality of users. The communications interface may be communications interface 360, communication module 601, or the like, or a combination thereof. For example, the user may include a first user, a second user, and third user (e.g., first user 711, second user 712, and third user 713 shown in FIG. 7). The first user may generate a first request for a ride via a first user device 120 associated with the first user (e.g., an application installed in first user device 120). The second user may generate a second request for a ride via a second user device 120 associated with the second user (e.g., an application installed in second user device 120). The third user may generate a third request for a ride via a second user device 120 associated with the second user (e.g., an application installed in second user device 120). First user device 120 (and second user device 120) may transmit the first request (and the second request) to ridesharing management server 150, which may receive the first request (and second request) via communication module 601.

A request (e.g., the first request, the second request, the third request) may include information related to a starting point and a desired destination of a user (e.g., the first starting point and the first desired destination of the first user, the second starting point and the second desired destination of the second user, the third starting point and the third desired destination of the third user).

At step 803, location module 603 may receive location information from a second plurality of communication devices associated with a plurality of ridesharing vehicles. For example, location module 603 may include software instructions for receiving current vehicle location data for a ridesharing vehicle via a communication device associated with the vehicle (e.g., a user device 120). In some embodiments, the current vehicle location data may include global positioning system (GPS) data generated by at least one GPS component associated with the electrically-powered ridesharing vehicle. Alternatively or additionally, the location data may include data of other types of global positioning technologies (e.g., Galileo or global navigation satellite system (GNSS)) generated by a corresponding positioning component. Additionally or alternatively, location module 603 may receive other location information, such as cell tower triangulation data, Wi-Fi or other signal strength data, or any other combination of location information. In one example, location module 603 may receive the location data, for example, from a mobile communication device (e.g., a smartphone, tablet, wearable device, etc.) associated (e.g., located in the passenger cabin) with the electrically-powered ridesharing vehicle.

At step 805, assignment module 605 may electronically assign a first ridesharing vehicle to pick up a first group of users from the plurality of users. For example, assignment module 605 may electronically assign first ridesharing vehicle 701 to pick up the first group of users including first user 711, second user 712, and third user 713. The assignment of first ridesharing vehicle 701 may be determined based on the location of first ridesharing vehicle 701 and the ride requests received from the users (e.g., the starting points and desired destinations included in the ride requests).

At step 807, assignment module 605 may determine, for each of the first group of users, a pick-up location and a drop-off location. In some embodiments, assignment module 605 may determine, for each of the first group of users, a pick-up location other than the starting point specified in the ride request received from the corresponding user and a drop-off location other than the desired destination specified in the ride request received from the corresponding user. For example, assignment module 605 may determine the pick-up location (or the drop-off location) for first user 711 that is one block away from the starting point (or the desired destination) specified in the first ride request because the starting point is not suitable for picking a passenger (e.g., close to a crossroad).

In some embodiments, the pick-up location of a user may be determined according to a current location of the user. For example, user device 120 associated with the user may determine its current location according to GPS signals received by a GPS component of user device 120. Assignment module 605 may determine a pick-up location based on the current location (which can be the current location or a location close to the current location). Alternatively, assignment module 605 may determine a location that is close to the current location and is suitable for the user to wait for a vehicle (e.g., within walking distance, avoiding busy streets, avoiding non-stopping regions) as the pick-up location. Alternatively, assignment module 605 may recommend multiple candidate pick-up locations for the user to choose from. For example, user device 120 may display a user interface showing a map in which a plurality of candidate pick-up locations are shown along the current location of the user. The user may select one of the candidate pick-up locations as the pick-up location via the user interface. User device 120 may include the information relating to the pick-up location into the request to be transmitted to ridesharing management server 150.

In some embodiments, assignment module 605 may also determine, for each of the first group of users, an estimated pick-up time at the determined pick-up location. For example, assignment module 605 may determine an estimated pick-up time for first user 711 at a pick-up location based on the pick-up location, current location of first ridesharing vehicle 701, and/or traffic conditions. In some embodiments, assignment module 605 may take other factors into account. For example, assignment module 605 may take waiting time periods for other users into account when determining an estimated pick-up time for a user. By way of example, first ridesharing vehicle 701 may be assigned to the first group of users including first user 711, second user 712, and third user 713. Assignment module 605 may also determine that first ridesharing vehicle 701 will first pick up first user 711 at the first pick-up location, then pick up second user 712 at the second pick-up location, and finally pick up third user 713 at the third pick-up location. Assignment module 605 may determine an estimated pick-up time for the first user based on the location of first ridesharing vehicle 701, the first pick-up location, and traffic conditions. Assignment module 605 may also determine an estimated pick-up time for second user 712 based on the first pick-up location, the second pick-up location, traffic conditions, an estimated waiting period, or a combination thereof. Assignment module 605 may further determine an estimated pick-up time for third user 713 based on the second pick-up location, the third pick-up location, traffic conditions, estimated waiting periods for the first and second users, or a combination thereof.

In some embodiments, the estimated waiting period may be in a range of 1 second to 1 hour. In some embodiments, an estimated waiting period may be restricted in subranges of 1-10 seconds, 10-60 seconds, 1-5 minutes, 5-10 minutes, or 10-60 minutes. In some embodiments, the estimated waiting period may be determined according to the traffic conditions and/or road conditions near a pick-up location.

In some embodiments, assignment module 605 may transmit the description of the determined pick-up location and estimated pick-up time to each of the first group of users via communication module 601. For example, assignment module 605 may transmit instructions to user device 120 associated with first user 711 to display the pick-up location and estimated pick-up time in a user interface of the user device. In some embodiments, assignment module 605 may also transmit the information relating to the assigned vehicle to the first group of users. The information may include information relating to the driver, vehicle (e.g., color, maker, model, license plate, etc.), driving route, current location of the vehicle (in real time or updated periodically), other passengers assigned to the same vehicle, or the like, or a combination thereof.

In some embodiments, assignment module 605 may also transmit the pick-up locations and pick-up times to a user device associated with the vehicle assigned to the first group of users via communication module 601. Assignment module 605 may further transmit other types of information. For example, assignment module 605 may determine and transmit the directions of the route to pick up the first group of users. Assignment module 605 may also transmit information relating to the users (e.g., age, gender, etc.).

At step 809, event detection module 604 may receive (or detect) an unanticipated ridesharing event after the first ridesharing vehicle picked up one or more users of the first group of users. An unanticipated ridesharing event refers to an event that was not anticipated or did not occur when assignment module 605 electronically assigned the users to the first ridesharing vehicle. For example, as illustrated in FIG. 7, after first ridesharing vehicle 701 picks up first user 711 and is on its way to the pick-up location of second user 712, second user 712 transmits a request to communication module 601 to modify the pick-up time because second user 712 will arrive at the pick-up location late. The late arrival of second user 712 at the pick-up location for second user 712 may affect the schedules of other users (e.g., first user 711 and third user 713). Event detection module 604 may consider (or detect) this event as an unanticipated ridesharing event.

In some embodiments, event detection module 604 may receive an indication of an unanticipated event from a communication device (e.g., a user device 120) associated with the first ridesharing vehicle. Alternatively or additionally, event detection module 604 may receive an indication of an unanticipated event from a communication device (e.g., a user device 120) associated with one or more users of the first group of users (e.g., a user who is riding the first ridesharing vehicle or has not been picked up). For example, event detection module 604 may receive an indication from user device 120 associated with the first ridesharing vehicle indicating that first user 711 came on board with an unannounced additional passenger who had not been included in the ride request. As another example, event detection module 604 may receive an indication indicating that first user 711 brought an object that may affect passenger occupancy of the vehicle (e.g., oversized luggage or a cello case, which may have to be placed on a passenger seat). Ridesharing management server 150 may also be configured to charge the user for the unannounced additional passenger or oversized object. As still another example, event detection module 604 may receive an indication from user device 120 associated with first user 711 (who has already been picked up by the first ridesharing vehicle 701) indicating that first user 711 wants to change the desired destination (or cancel the trip). Assignment module 605 may determine a new drop-off location based on this new desired destination (e.g., the new drop-off location may be farther away from the new desired destination than the original drop-off location was from the original desired destination). Assignment module 605 may also transmit the new drop-off location to first user 711 and/or first ridesharing vehicle 701. Assignment module 605 may further determine an updated route for first ridesharing vehicle 701 that passes the new drop-off location, and direct first ridesharing vehicle 701 along the updated route. In some embodiments, the updated route may skip the determined pick-up location(s) of one or more next users (e.g., second user 712 and/or third user 713). In some embodiments, ridesharing management server 150 may also update the fees charged to first user 711 based on the new drop-off location and transmit the information of the updated fees to first user 711.

In some embodiments, event detection module 604 may determine an indication of an unanticipated event based on location information received from a communication device (e.g., user device 120) associated with the first ridesharing vehicle. For example, location module 603 may receive information relating to the location of the first ridesharing vehicle (in real time or periodically) and determine that the first ridesharing vehicle deviates from the route (e.g., having missed a highway exit, a turn, a pick-up location, or the like, or a combination thereof). Event detection module 604 may determine such deviation is an indication of an unanticipated event.

In some embodiments, event detection module 604 may determine an indication of an unanticipated event based on a navigational mistake of the first ridesharing vehicle. For example, the first ridesharing vehicle may have missed an exit of a highway. Event detection module 604 may determine that this navigational mistake was caused by the driver of the first ridesharing vehicle. Ridesharing management server 150 may also update a record associated with the driver according to the navigational mistake. For instance, ridesharing management server 150 may adjust the ranking of the driver based on the updated record (e.g., downgrade the status of the driver if the number of the mistakes made by the driver exceeds a threshold). Ridesharing management server 150 may also determine future assignments based on the updated record (e.g., decreasing the probability of assigning a ride request to the driver). Alternatively or additionally, ridesharing management server 150 may adjust the way driving instructions are provided to the driver based on the updated record. For example, assignment module 605 may give instructions to the driver (via, e.g., user device 120) more frequently before an exit of the highway if the driver has made the same type of navigation mistakes multiple times over a period of time.

In some embodiments, event detection module 604 may determine an indication of an unanticipated event based on real-time traffic conditions. For example, event detection module 604 may receive real-time traffic data and determine an indication of an unanticipated event based on the received real-time traffic data indicative of atypical congestion along a driving route of the first ridesharing vehicle. By way of example, event detection module 604 may receive real-time traffic data indicating that an accident has occurred along (or close to) a driving route of the first ridesharing vehicle. Event detection module 604 may determine that the atypical congestion is an indication of an unanticipated event. In some embodiments, assignment module 605 may update a drop-off location of a user riding another ridesharing vehicle (e.g., second ridesharing vehicle 702) to avoid the congested road (e.g., a street blockage due to a car accident or event). Alternatively or additionally, assignment module 605 may update the route of that ridesharing vehicle to avoid the congested road.

In some embodiments, event detection module 604 may determine (or receive) an indication of an unanticipated event based on the condition of a ridesharing vehicle. For instance, the first ridesharing vehicle 701 may malfunction (e.g., due to mechanical problems or an accident), which prevent the vehicle from continuing driving. Assignment module 605 may electronically assign two ridesharing vehicles to transport the users who are originally assigned to the first ridesharing vehicle—one vehicle to pick up the users who are with the malfunction first ridesharing vehicle (e.g., at the breakdown location of the vehicle) and another vehicle to pick up the user who is scheduled to be picked up by the first ridesharing vehicle. The vehicles may transport the users under directions of assignment module 605 to corresponding drop-off locations as originally planned. In some embodiments, assignment module 605 may update the drop-off location of one or more users based on the new assignments.

At step 811, assignment module 605 may determine an ability of the first ridesharing vehicle to pick up a next user from the first group of users at a corresponding estimated pick-up time due to the unanticipated ridesharing event. For example, as illustrated in FIG. 7, assignment module 605 may determine that first ridesharing vehicle 701 will not be able to reach second user 712 at the corresponding estimated pick-up time for second user 712 due to an unanticipated traffic jam caused by a car accident along the route to the pick-up location of second user 712 (i.e., an unanticipated ridesharing event). Assignment module 605 may also determine that by skipping second user 712, first ridesharing vehicle 701 can pick up third user 713 at the corresponding estimated pick-up time for third user 713. As another example, assignment module 605 may determine that the first ridesharing vehicle may not be able to pick up the remaining users of the first group of users to be picked up due to an unanticipated ridesharing event (e.g., the first ridesharing vehicle will be late for all remaining users due to a roadblock caused by a car accident).

In some embodiments, assignment module 605 may determine the inability of the first ridesharing vehicle to pick up the next user at the estimated pick-up time by calculating a delay in the estimated time of arrival (ETA) to the next user caused by the unanticipated ridesharing event and compare the calculated delay with a predefined threshold prior to reassign the next user to another ridesharing vehicle. For example, assignment module 605 may determine that the first ridesharing vehicle may be late for two minutes (i.e., a two-minute delay in the ETA) arriving at the pick-up location of second user 712 due to an unanticipated event. Assignment module 605 may compare the delay with a threshold (e.g., five minutes). Assignment module 605 may determine that the delay, which is shorter than the threshold, is acceptable, and determine that the first ridesharing vehicle will be able to reach the second user on time. As another example, assignment module 605 may determine that the first ridesharing vehicle will be late for 10 minutes, which is longer than the threshold. Assignment module 605 may determine that the first ridesharing vehicle will not reach the second user on time.

In some embodiments, assignment module 605 may calculate a delay in ETA to each user of the first group users scheduled to be picked up (and/or has already been on board) if the next user is not reassigned. Assignment module 605 may also determine an updated delay (if any) in ETA to each of users if the next user is reassigned. Assignment module 605 may further compare the updated delay with a predefined threshold and determine that the updated delay would be within the threshold if the next user is reassigned to the second ridesharing vehicle. Alternatively or additionally, assignment module 605 may calculate a delay in ETA for each user of the second group users scheduled to be picked up (and/or has already been on board) if the next user is reassigned to the second ridesharing vehicle. Assignment module 605 may also compare the delay with a predefined threshold and determine that the delay would be within the threshold if the next user is reassigned to the second ridesharing vehicle.

At step 813, assignment module 605 may electronically assign a second ridesharing vehicle to the next user based on the determination that the first ridesharing vehicle may not be able to pick up the next user. In some embodiments, the second ridesharing vehicle may have been assigned to one or more users before the new assignment. For example, the second ridesharing vehicle may have been already assigned to a second group of users (e.g., currently transporting and/or being the way to pick up the user(s)) before being assigned to the next user of the first group of users. By way of example, as illustrated in FIG. 7, assignment module 605 may determine that first ridesharing vehicle 701 may not be able to pick up second user 712 due to an unanticipated event as described elsewhere in this disclosure. Assignment module 605 may electronically assign second ridesharing vehicle 702 to second user 712, which may already have one or more users on board and/or be on the way to pick up the user(s). The assignment may be determined based on the location of the ridesharing vehicle to be assigned, location of the next user, pick-up location of the next user, pick-up location(s) and/or drop-off location(s) of the second group of users, traffic conditions, or the like, or a combination thereof.

In some embodiments, assignment module 605 may electronically assign a second ridesharing vehicle to two or more next users based on the determination that the first ridesharing vehicle may not be able to pick up the next users. Alternatively, assignment module 605 may electronically assign two or more ridesharing vehicles to the next users. For instance, assignment module 605 may determine that the first ridesharing vehicle may not be able to pick up two next users (e.g., second user 712 and third user 713). Assignment module 605 may electronically assign a ridesharing vehicle to each of the two users. The assignment may be determined by the locations of the ridesharing vehicles, locations of the users, pick-up locations of the users, traffic conditions, or the like, or a combination thereof.

In some embodiments, assignment module 605 may transmit an update regarding the reassignment to the next user. For example, assignment module 605 may transmit a notification to a user device associated with the next user, indicating that the user has been reassigned to the second ridesharing vehicle. Assignment module 605 may also transmit to the next user the information relating to the second ridesharing vehicle. The information may include that the status of the second ridesharing vehicle (e.g., the vehicle is in enroute), information relating to the driver, vehicle (e.g., color, maker, model, license plate, etc.), driving route, current location of the vehicle (in real time or updated periodically), other passengers being assigned to the second ridesharing vehicle, or the like, or a combination thereof. Assignment module 605 may also transmit to the second ridesharing vehicle the information relating to the next user (e.g., the pick-up location, drop-off location).

At step 815, assignment module 605 may determine a new route for the first ridesharing vehicle. Assignment module 605 may also determine a new route for the second ridesharing vehicle. The determination of a new route for a ridesharing vehicle may be based on the location of the vehicle, pick-up location(s) of the users to be picked up, drop-off location(s) of the users on board, traffic conditions, or the like, or a combination thereof. For example, assignment module 605 may determine a new route for the first ridesharing vehicle 701 (e.g., route 722) based on the location of first ridesharing vehicle 701 and pick-up location of third user 713. Assignment module 605 may also determine a new route for second ridesharing vehicle 702 (e.g., route 732) based on the location of second ridesharing vehicle 702 and pick-up location of second user 712.

In some embodiments, the new route for the first ridesharing vehicle (and/or the second ridesharing vehicle) may include at least one change in a drop-off location for one user from the first group of users (and/or the second group of users). For example, assignment module 605 may determine an updated drop-off location of first user 711 according to new route 722 (e.g., a drop-off location along with new route 722 instead of previous route 721). Assignment module 605 may also direct first ridesharing vehicle 701 to drop first user 711 off at the updated drop-off location. In some embodiments, assignment module 605 may automatically update the drop-off location for one or more users of the first group of users and/or the second group users based on the new route(s).

At step 817, assignment module 605 may direct the first and second ridesharing vehicles according to their new routes. For example, assignment module 605 may direct first ridesharing vehicle 701 to make a turn at point 741 along route 722. Assignment module 605 may also direct second ridesharing vehicle 702 to go straight along route 732 instead of making a turn at point 742 along old route 731.

Accounting for Driver Reaction Time when Providing Driving Instructions

Embodiments of the present disclosure may allow for a vehicle management system to provide navigational directions to a vehicle. The vehicle management system may receive location data indicative of a current location of the vehicle from a wireless communication device associated with the vehicle. The vehicle management system may determine a first driving route for the vehicle and direct the vehicle to a desired destination using the first driving route. The vehicle management system may also receive data indicating that a new route for the vehicle is requested at a first time. The vehicle management system may further predict a location of the vehicle where the driver of the vehicle can safely implement instructions associated with changing the first driving route at a second time that will occur after the first time. The vehicle management system may also determine a second driving route based on the predicted location of the vehicle at the second time. The vehicle management system may further send instructions associated with the second driving route to the wireless communication device prior to the second time.

In some embodiments, the vehicle management system may be implemented in a device associated with a vehicle (e.g., user device 120 associated with the vehicle, or a processing unit of a semi-autonomous or fully autonomous vehicle). The vehicle management system may receive GPS data indicative of a current location of the vehicle. The GPS data may have been generated by a GPS component associated with a wireless communication device. The vehicle management system may also direct the vehicle to a desired destination using a first driving route. The vehicle management system may further receive data indicating that a new route for the vehicle is requested at a first time, and predict a location of the vehicle where the vehicle can safely implement instructions associated with changing the first driving route (e.g., by the driver or a processing unit of autonomous vehicle) at a second time that will occur after the first time. The vehicle management system may also direct the vehicle to the desired destination using a second driving route associated with the predicted location of the vehicle prior to the second time.

Figure 9:
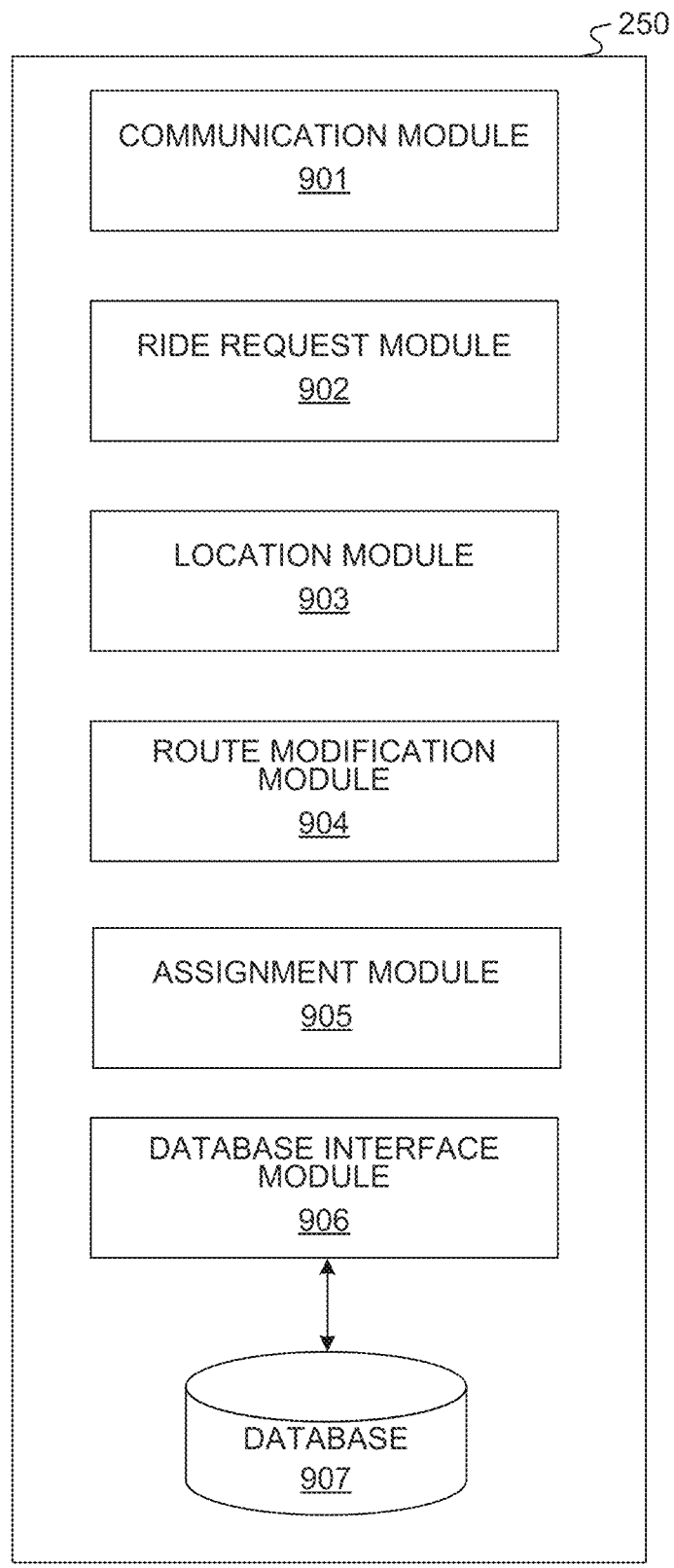
FIG. 9 depicts an embodiment of a memory module for providing instructions to a vehicle consistent with the present disclosure.

FIG. 9 depicts an embodiment of memory module 250 for providing instructions to a vehicle consistent with the present disclosure. Memory 250 may store a plurality of modules, and may be executable by at least one processor to perform various methods and processes disclosed herein. Further, it should be noted that memory 250 may store more or fewer modules than those shown in FIG. 9, depending on implementation-specific considerations.

As illustrated in FIG. 9, memory 250 may store software instructions to execute a communication module 901, a ride request module 902, a location module 903, a route modification module 904, an assignment module 905, and a database interface module 906. Memory 250 may further store a database 907.

Communication module 901 may include software instruction for communicating with other components of ridesharing management system 100 (e.g., one or more user devices 120A-120C, driver devices 120D and 120E, driving-control device 120F). Ride request module 902 may include software instruction for receiving ride requests from one or more users. Location module 903 may include software instruction for receiving the location of a vehicle from one or more sources. Route modification module 904 may include software instruction for modifying a route for a vehicle. Assignment module 905 may include software instruction for electronically assigning a ride request to a vehicle. Database interface module 906 may include software instruction executable to interact with database 907 to store and/or receive information (e.g., geographical maps associated with a geographical area in which one or more vehicles are operating, current traffic information of a geographical area, historical data for efficient routes).

Communication module 901 may include software instructions for facilitating communications between the device on which it is implemented (e.g., ridesharing management server 150) and another component of ridesharing management system 100 (e.g., mobile communications devices 120A-120F, one or more vehicles, database 170). For example, ridesharing management server 150 may receive location data indicative of a current location of the vehicle from a device (e.g., a wireless communication device) associated with the vehicle via communication module 901. The vehicle management system may also receive data indicating that a new route for the vehicle is requested at a first time via communication module 901. As another example, ridesharing management server 150 may electronically assign a specific user to a specific vehicle via communication module 901.

Ride request module 902 may include software instructions for receiving a plurality of requests for a ride from a plurality of users. Each ride request may include a starting point and a desired destination within the geographic area. In some embodiments, ride request module 902 may determine a pick-up location and a drop-off location. The determined pick-up location may be a location other than but in proximity to the starting point, and the determined drop-off location may be a location other than but in proximity to the desired destination. Additionally or alternatively, ride request module 902 may determine the drop-off location for a user based on the status of a vehicle to be assigned to this user, the desired destination of the ride request, and/or other factors. For example, in one embodiment, a ride request may include information that the desired destination is a building at the corner of an intersection of two cross streets. Ride request module 902 may determine that dropping the user off at the intersection would result in the vehicle entering a one-way street, impeding a more efficient route to a charging station. Thus, ride request module 902 may instead, for example, determine a drop-off location at a location proximal to the desired destination, and avoid entering the one-way street.

Location module 903 may include software instructions for receiving current vehicle location data for a vehicle in real time or periodically. In some embodiments, the current vehicle location data may include global positioning system (GPS) data generated by at least one GPS component associated with the vehicle. Alternatively or additionally, the location data may include data of other types of global positioning technologies (e.g., Galileo or global navigation satellite system (GNSS)) generated by a corresponding positioning component. Additionally or alternatively, location module 903 may receive other location information, such as cell tower triangulation data, Wi-Fi or other signal strength data, or any other combination of location information. In one example, location module 903 may receive the location data from, for example, a mobile communication device (e.g., a smartphone, tablet, wearable device, etc.) associated (e.g., located in the passenger cabin) with the vehicle.

Assignment module 905 may electronically assign a ridesharing vehicle to one or more users. Assignment module 905 may also determine a route for the vehicle to pick up and drop off the user(s) and direct the vehicle according to the determined route. In some embodiments, assignment module 905 may determine a first driving route for a vehicle and direct the vehicle to a desired destination using the first driving route.

Route modification module 904 may predict a location of the vehicle where the driver of the vehicle can safely implement instructions associated with changing the first driving route at a second time that will occur after the first time. The vehicle management system may also determine a second driving route based on the predicted location of the vehicle at the second time. The route modification module 904 may further send instructions associated with the second driving route to the device (e.g., a wireless communication device) associated with the vehicle prior to the second time.

Database interface module 906 may include software instructions for interacting with database 907, to store and/or receive information. Database 907 may be configured to store any type of information associated with modules 901-906, depending on implementation-specific considerations.

Modules 901-906 may be implemented in software, hardware, firmware, or any combination of software, hardware or firmware. For example, if the modules are implemented in software, they may be stored in memory 250. However, in some embodiments, any one or more of modules 901-906 and data associated with database 907 may, for example, be stored in processor 204 and/or executed on a device associated with ridesharing management system 100 and/or a device associated with a vehicle. Modules 901-906 may be configured to interact with each other and/or other modules of memory 250 to perform functions consistent with disclosed embodiments.

Figure 10:
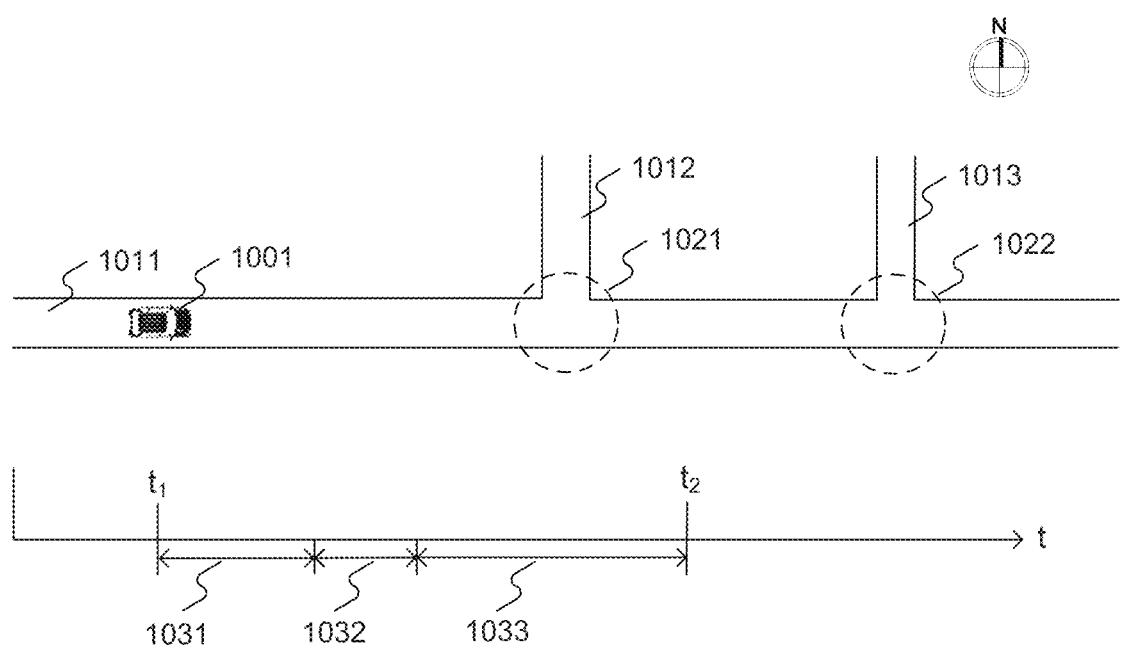
FIG. 10 is a schematic illustration of an exemplary process for providing navigational directions to a vehicle consistent with the present disclosure.

FIG. 10 is a schematic illustration of an exemplary process for providing navigational directions to (or directing) a vehicle. As illustrated in FIG. 10, vehicle 1001 is driving on first road 1011 according to a first driving route. The first driving route may be determined by ridesharing management server 150 (e.g., via assignment module 905). Alternatively, the first driving route may be determined by a user device associated with the vehicle. Alternatively, the vehicle may be a semi-autonomous or autonomous vehicle, and the first driving route may be determined by a processing unit of the vehicle.

At a first time (e.g., $t_1$ illustrated in FIG. 10), route modification module 904 may receive data indicating that a new route for the vehicle is requested. Instead of instructing vehicle 1001 to make a turn at point 1021 (e.g., the closest point to change its course) to second road 1012, route modification module 904 may predict a location of the vehicle where the driver of the vehicle can safely implement instructions associated with changing the first driving route at a second time that will occur after the first time (e.g., $t_2$ illustrated in FIG. 10). For example, route modification module 904 may determine that the vehicle (or the driver of the vehicle) can safely implement instructions associated with changing the first driving route after the second time, according to the time period for determining a new route (e.g., time period 1031), the time period for transmitting route information (e.g., time period 1032), and/or the time period for the driver's reaction time (e.g., time period 1033). Route modification module 904 may also predict the location of the vehicle at the second time. Route modification module 904 may further determine a second driving route based on the predicted location of the vehicle at the second time. For example, route modification module 904 may determine a new route for the vehicle, including making a turn at point 1022 to third road 1013. Communication module 901 may send instructions associated with the second driving route to the device associated with the vehicle prior to the second time. As such, vehicle 1001 (or the driver) may be able to safely make a turn at point 1022 according to the new route.

Figure 11:
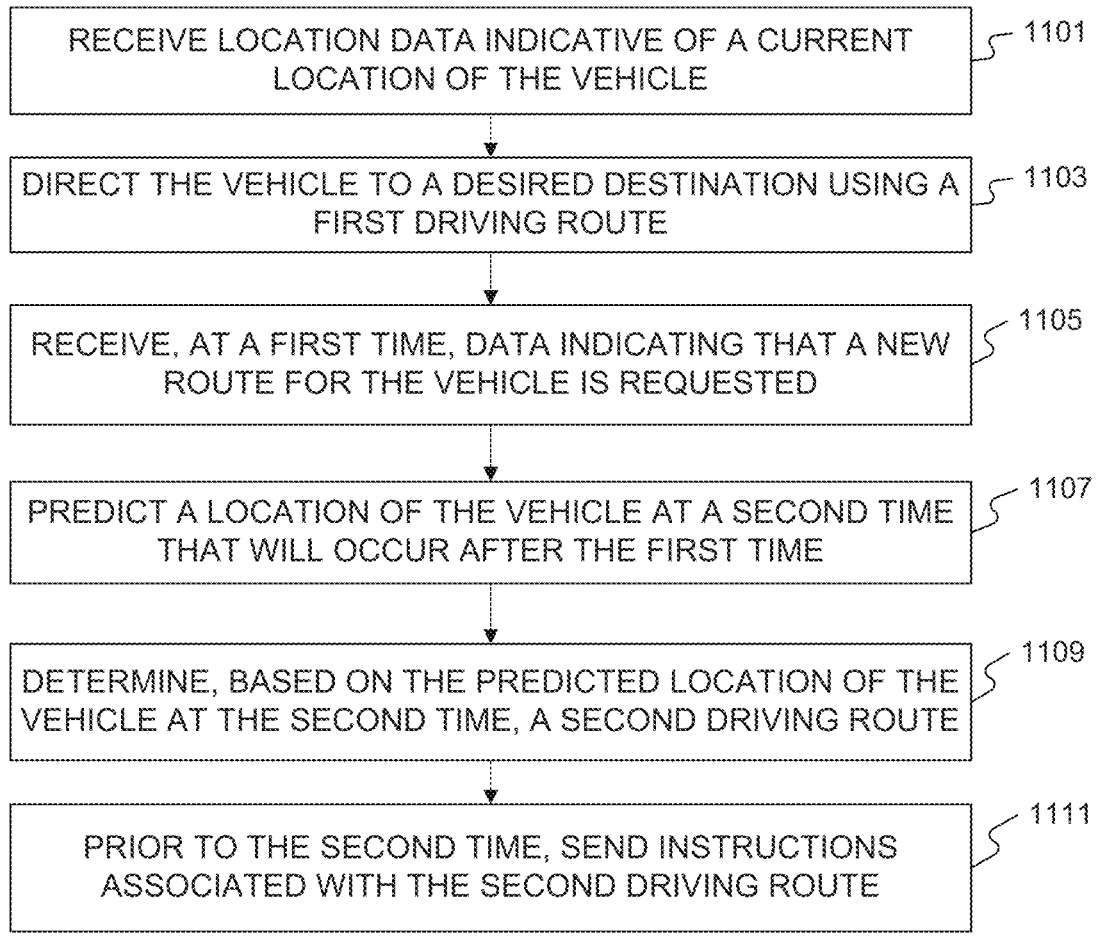
FIG. 11 is a flowchart showing an exemplary process for directing a vehicle in accordance with the present disclosure.

FIG. 11 is a flowchart showing an exemplary process 1100 for directing (or providing navigational directions to) a vehicle in accordance with some embodiments of the present disclosure. In some embodiments, the vehicle may be a ridesharing vehicle for hire.

In one embodiment, the steps of process 1100 may be performed by a vehicle management server, such as ridesharing management server 150 described above with reference to FIGS. 1 and 3. Alternatively, at least some of the steps of process 1100 may be performed by a mobile communications device associated with a vehicle, such as mobile communications devices 120 described above with reference to FIGS. 1 and 2. For example, at least some of the steps of process 1100 may be performed by a mobile communications device associated with the vehicle as a navigation application installed in the mobile communications device configured to provide navigational directions to a user associated with the vehicle. Alternatively, the vehicle may be a semi-autonomous or autonomous vehicle, and at least some of the steps of process 1100 may be performed by a processing device associated with the vehicle. In the following description, reference is made to certain components of FIGS. 1-3 for purposes of illustration. It will be appreciated, however, that other implementations are possible and that other component may be utilized to implement example methods disclosed herein.

At step 1101, location module 903 may receive location data indicative of a current location of a vehicle. For example, location module 903 may include software instructions for receiving current vehicle location data for a vehicle from a communication device associated with the vehicle (e.g., a user device 120).

In some embodiments, the current vehicle location data may include GPS data generated by at least one GPS component associated with the vehicle. Alternatively or additionally, the location data may include data of other types of global positioning technologies (e.g., Galileo or global navigation satellite system (GNSS)) generated by a corresponding positioning component. Additionally or alternatively, location module 903 may receive other location information, such as cell tower triangulation data, Wi-Fi or other signal strength data, or any other combination of location information. In one example, location module 903 may receive the location data, for example, from a mobile communication device (e.g., a smartphone, tablet, wearable device, etc.) associated (e.g., located in the passenger cabin) with the vehicle. In some embodiments, location module 903 may receive location data associated with the vehicle in real time or periodically.

At step 1103, assignment module 905 may determine a first driving route for the vehicle. Assignment module 905 may also direct the vehicle according to the first driving route. For example, assignment module 905 may electronically assign a ride request by a user to the vehicle and determine a first driving route based on the ride request. The first driving route may include a pick-up location and a drop-off location of the user. Assignment module 905 may also transmit instructions associated with the first driving route to the device associated with the vehicle via, for instance, communication module 901.

In some embodiments, a device associated with the vehicle may determine the first driving route based on input from a user associated with the vehicle. For example, the device associated with the vehicle may receive an input from the driver (or a passenger) indicating a desired destination through a user interface of the device. The device may determine the first driving route based on the current location of the vehicle and the desired destination. The device may also display navigation directions (e.g., turn-by-turn directions) in the user interface according to the first driving route. Alternatively, the device may direct the vehicle to move according to the first driving route.

At step 1105, communication module 901 may receive data indicating that a new route for the vehicle is requested. For example, communication module 901 may receive data indicating that a user currently assigned to the vehicle requests to change the destination from a device associated with the user. As another example, the vehicle may be a vehicle-for-hire. Communication module 901 may receive data indicating a new assignment to pick-up a passenger to the vehicle (e.g., a new ride request is assigned to the vehicle), and a new route for the vehicle is desired. As still another example, the vehicle may be a ridesharing vehicle, and the data indicating that a new route for the vehicle is requested may include a change of a drop-off location of a first passenger currently riding in the vehicle that resulted from a new assignment of the ridesharing vehicle to pick-up a second passenger.

In some embodiments, the data received indicating that a new route for the vehicle is requested may include an indication of an unanticipated ridesharing event described elsewhere in this disclosure (e.g., FIGS. 6-8 and the descriptions thereof). For example, three users may be assigned to vehicle 1001. After vehicle 1001 picks up the first user and is on its way to the pick-up location of the second user, at a first time (e.g., $t_1$ illustrated in FIG. 10), communication module 901 receives from the second user a request to modify the pick-up time because the second user will not arrive at the pick-up location by the scheduled pick-up time. An event detection module (e.g., event detection module 604) may determine the event as an unanticipated event. Assignment module 905 may determine a new route for vehicle 1001 to skip the second user and pick up the third user directly.

At step 1107, route modification module 904 may determine a location of the vehicle where the vehicle (or a driver thereof) can safely implement instructions associated with changing the first driving route at a second time that will occur after the first time. For example, route modification module 904 may predict a location of the vehicle where the vehicle (or a driver thereof) can safely implement instructions associated with changing the first driving route at a second time that will occur after the first time. For example, as illustrated in FIG. 10, route modification module 904 may predict point 1022 as a location of vehicle 1001 where vehicle 1001 (or a driver thereof) can safely implement instructions associated with changing the first driving route after the first time.

In some embodiments, route modification module 904 may predict the location based on a time period between the first time and the second time. For example, route modification module 904 may determine the time period between the first time and second time to be 10 seconds, and predict the location of the vehicle based on the 10-second period. By way of example, route modification module 904 may predict the location of the vehicle based on the distance of the vehicle is likely to travel within 10 seconds. Route modification module 904 may also consider other factors (e.g., the current speed of the vehicle, traffic conditions, or the like) in predicting the location of the vehicle. The time period may be in the range of 0.1 seconds to 10 minutes. In some embodiments, the time period may be restricted in a subrange of 0.1 to 0.5 seconds, 0.5 seconds to 1 second, 1 second to 5 seconds, 5 to 10 seconds, 10 seconds to 1 minute, 1 minute to 5 minutes, or 5 to 10 minutes.

In some embodiments, the time period may be determined based on an estimated route determination time, an estimated instructions transmission time, an estimated driver reaction time, or the like, or a combination thereof. Route determination time refers to the time for determining a new route, instructions transmission time refers to the time for transmitting instructions to a device associated with a vehicle (e.g., from communication module 901 to a wireless communication device associated with a vehicle), and driver reaction time refers to the time that a driver (e.g., a human driver or a device directing an autonomous vehicle) needs to change a direction after receiving instructions. For example, route modification module 904 may determine the estimated route determination time to be 1 second, estimated instructions transmission time to be 1 second, and the estimated driver reaction time to be 2 seconds. Route modification module 904 may then determine the time period between the first time and second time to be 4 seconds (i.e., the sum of the estimated route determination time, estimated instructions transmission time, and an estimated driver reaction time). In some embodiments, route modification module 904 may determine the time duration between the first time and the second time based on an estimated route determination time and an estimated driver reaction time, and predict the location of the vehicle at the second time based on the determined time duration.

In some embodiments, route modification module 904 may determine the estimated route determination time based on historical data relating to route determination time. For example, route modification module 904 (or another component of ridesharing management server 150) may receive statistics of previous route determination times, and use the statistics to determine the estimated route determination time.

In some embodiments, route modification module 904 may determine the estimated instructions transmission time based on historical data relating to instructions transmission time. For example, route modification module 904 (or another component of ridesharing management server 150) may receive data indicative of downlink data latency between the system and the wireless communication device, and to use the data to determine the estimated instructions transmission time.

In some embodiments, route modification module 904 may determine the estimated driver reaction time based on historical data relating to driver reaction time. For example, route modification module 904 (or another component of ridesharing management server 150) may receive data indicative of past driving performance of the driver, and to use the data to determine the estimated driver reaction time. Alternatively or additionally, route modification module 904 (or other component of ridesharing management server 150) may receive data relating to past driving performance of a plurality of drivers and determine the estimated driver reaction time based on the past driving performance of the drivers (e.g., using the average or maximum driver reaction time of the drivers). By way of example, route modification module 904 may receive a personal record of the driver, which may indicate that it took at most 2 seconds for this driver to change the direction after the driver received the instructions to change the direction in the past. Route modification module 904 may determine the estimated driver reaction time to be 2 seconds. In some embodiments, route modification module 904 may also determine the driver reaction time of this instance and update the personal record accordingly.

In some embodiments, route modification module 904 may predict the location at the second time based on a current state of the vehicle. For example, route modification module 904 may receive from the device associated with the vehicle relating to the operation of the vehicle (e.g., moving, remaining unmoved, etc.) via communication module 901, and determine a current state of the vehicle based on the data received. Route modification module 904 may also predict the location at the second time based on the determined current state of the vehicle. In some embodiments, a current state of the vehicle may include a current location of the vehicle, a current velocity of the vehicle, or the like, or a combination thereof. For example, route modification module 904 may receive GPS data generated by a GPS component associated with the wireless communication device related to the vehicle. Route modification module 904 may also determine the current location of the vehicle and/or a current velocity of the vehicle based on the GPS data received. Alternatively or additionally, the current state of the vehicle may include at least one operational condition of the vehicle. For example, route modification module 904 may receive from the device associated with the vehicle data measured by one or more sensors onboard the vehicle, and determine the at least one operational condition of the vehicle determined using the data received. Exemplary operational condition may include the acceleration and/or deceleration capabilities of the vehicle.

In some embodiments, route modification module 904 may determine at least one environmental condition that can affect implementing instructions associated with one or more changes to the first driving route, and predict the location of the vehicle at the second time based on the determined at least one environmental condition. For example, route modification module 904 may receive the data relating to environmental conditions (e.g., data relating to current traffic conditions near the vehicle), and determine that vehicles are not allowed to make a left turn (i.e., a change to the first driving route) along the road the vehicle is traveling until 14th Street. Exemplary environmental conditions may include a neighborhood where the vehicle is currently located, current traffic conditions near the vehicle, current weather conditions, characteristics of a road the vehicle is driving, a time of day, a lane condition (e.g., a number of lanes of a road being traveled by the vehicle and traffic regulatory data associated with a lane that the vehicle is traveling in) or the like, or a combination thereof.

In some embodiments, route modification module 904 may determine the type of the vehicle and predict the location of the vehicle at the second time based on the type of the vehicle. For example, route modification module 904 may determine whether the vehicle is a manually-driven, semi-autonomous, or autonomous vehicle (i.e., if the driver of the vehicle is a human driver with some or no autonomous driving assistance, or an autonomous driver). Route modification module 904 may determine a typical reaction time based on the determined vehicle type. For instance, route modification module 904 may determine a first typical reaction time associated with a human driver, a second typical reaction time associated with an autonomous driver, or a third typical reaction time associated with a semi-autonomous driver. Route modification module 904 may further predict the location of vehicle at the second time based on the determined typical reaction time.

At step 1109, route modification module 904 may determine a second driving route based on the predicted location of the vehicle at the second time. For example, as illustrated in FIG. 10, route modification module 904 may determine a second driving route that includes making a left turn at point 1022 from first road 1011 to third road 1013 based on the predicted location of the vehicle at the second time (e.g., a location corresponding to time $t_1$).

In some embodiments, route modification module 904 may determine the second driving route based on data directing the vehicle to turn to a specified direction. For example, route modification module 904 may receive the data directing the vehicle to turn to a specified direction (e.g., a direction to the pick-up location of a newly assigned user). Route modification module 904 may identify that a first turn to orient the vehicle to the specified direction is located between the current location of the vehicle and the predicted location of the vehicle. Route modification module 904 may also identify that a second turn to orient the vehicle to the specified direction is located after the predicted location of the vehicle. The first turn is closer to the vehicle's current location than the second turn is. Route modification module 904 may further send to the device associated with the vehicle (e.g., a wireless communication device) instructions directing the vehicle to navigate by turning at the second turn and not the first turn. In some embodiments, the instructions may be received by the wireless communications device before the vehicle passes the first turn. By way of example, as illustrated in FIG. 10, route modification module 904 may receive the data directing vehicle 1001 to turn to the north. Route modification module 904 may identify that a first turn to orient to the north (e.g., a left turn from first road 1011 to second road 1012 at point 1021) is located between the current location of vehicle and a predicted location of the vehicle (e.g., the location corresponding to time $t_2$). Route modification module 904 may also identify that a second turn (e.g., a left turn from first road 1011 to third road 1013 at point 1022) to orient the vehicle to the north is located after the predicted location of the vehicle (e.g., the location corresponding to time $t_2$). Route modification module 904 may further send to a wireless communication device associated with the vehicle instructions directing the vehicle to navigate by turning at point 1022 (i.e., the second turn) and not point 1021 (i.e., the first turn).

At step 1111, route modification module 904 may send instructions associated with the second driving route to the device associated with the vehicle prior to the second time. For example, route modification module 904 may send to the wireless communication device associated with the vehicle the instructions associated with the second driving route, including making a left turn at point 1022 from first road 1011 to third road 1013. In some embodiments, assignment module 905 may direct the vehicle according to the second route. For example, assignment module 905 may transmit instructions associated with the second driving route the device associated with the vehicle, directing the vehicle to travel according to the second driving route.

Avoiding Missed Rideshare Connections

Embodiments of the present disclosure may allow for a vehicle management system to manage a fleet of ridesharing vehicles. The vehicle management system may receive ride requests from a plurality of users via a communication interface (e.g., communication module 1201). In some embodiments, a ride request may be a shared-ride request for which the user sending the request agrees to ride in the same vehicle with one or more unrelated passengers. A ride request may also include information for a starting point and a desired destination of the user. For example, the vehicle management system may receive a first ride request from a first user and a second ride request from a second user. The first request may include a first desired starting point and a first desired destination, and the second request may include a second desired starting point and a second desired destination.

The vehicle management system may also receive current vehicle location data for a fleet of ridesharing vehicles. In some embodiments, the current vehicle location data associated with a vehicle may include global positioning system (GPS) data generated by at least one GPS component associated with the vehicle. The vehicle management system may further electronically assign a ridesharing vehicle to pick up the first user and determine a driving route for transporting the first user. The driving route may include a first pick-up location and a first drop-off location for the first user. The vehicle management system may also determine a target arrival time at the first drop-off location.

The vehicle management system may calculate an estimated delay that would be caused to the first user by picking up of the second user, and determine whether the delay would cause the first user to arrive at the first drop-off location after the target arrival time. The vehicle management system may further determine that picking up the second user will not cause the first user to arrive at the first drop-off location after the target arrival time, and electronically assign the ridesharing vehicle to pick up the second user. The vehicle management system may also direct the ridesharing vehicle according to an updated driving route that includes a second pick-up location and a second drop-off location for the second user.

Figure 12:
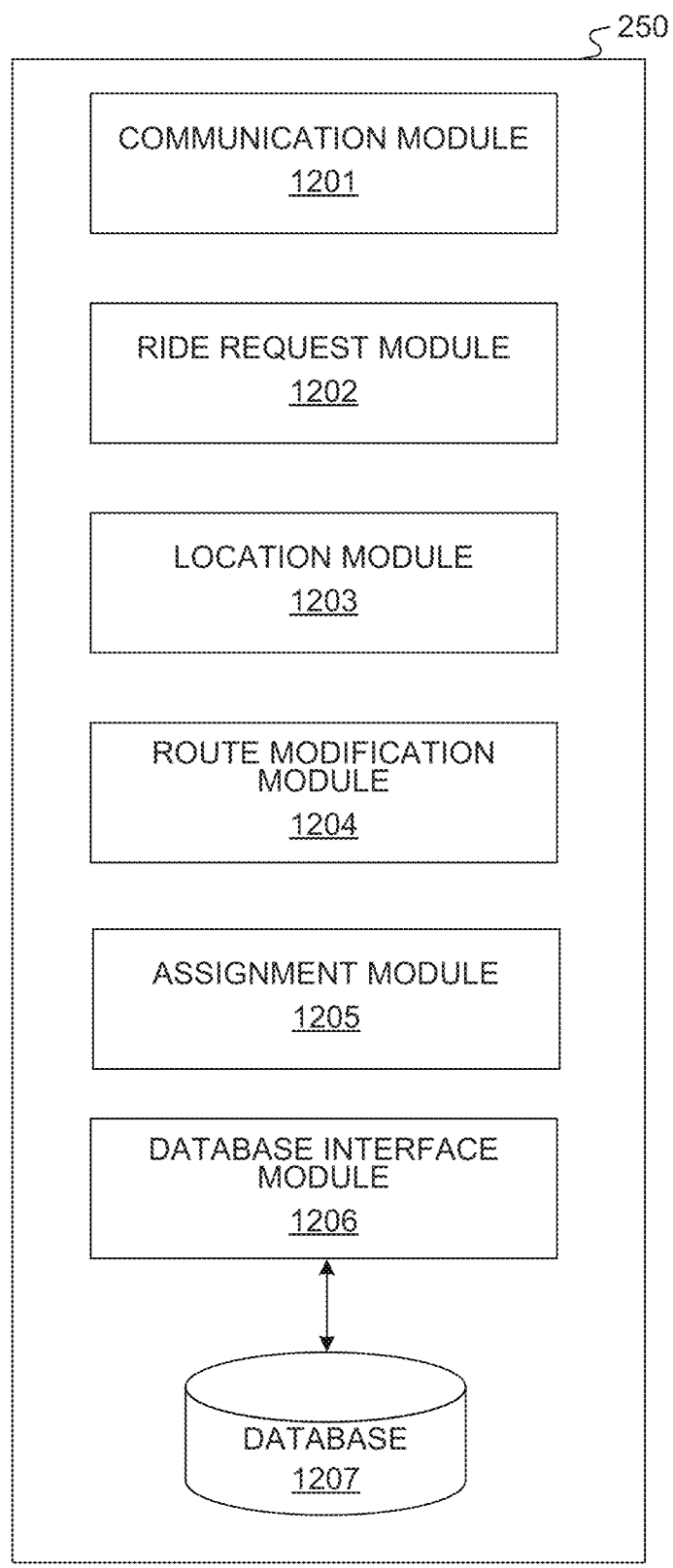
FIG. 12 depicts an embodiment of a memory module for providing instructions to a vehicle consistent with the present disclosure.

FIG. 12 depicts an embodiment of memory module 250 for providing instructions to a vehicle consistent with the present disclosure. Memory 250 may store a plurality of modules, and may be executable by at least one processor to perform various methods and processes disclosed herein. Further, it should be noted that memory 250 may store more or fewer modules than those shown in FIG. 12, depending on implementation-specific considerations.

As illustrated in FIG. 12, memory 250 may store software instructions to execute a communication module 1201, a ride request module 1202, a location module 1203, a route modification module 1204, an assignment module 1205, and a database interface module 1206. Memory 250 may further store a database 1207.

Communication module 1201 may include software instruction for communicating with other components of ridesharing management system 100 (e.g., one or more user devices 120A-120C, driver devices 120D and 120E, driving-control device 120F). Ride request module 1202 may include software instruction for receiving ride requests from one or more users. Location module 1203 may include software instruction for receiving the location of a vehicle from one or more sources. Route modification module 1204 may include software instruction for modifying a route for a vehicle. Assignment module 1205 may include software instruction for electronically assigning a ride request to a vehicle. Database interface module 1206 may include software instruction executable to interact with database 1207, to store and/or receive information (e.g., geographical maps associated with a geographical area in which one or more vehicles are operating, current traffic information of a geographical area, historical data for efficient routes, public transportation schedules for one or more public transportations).

Communication module 1201 may include software instructions for facilitating communications between the device on which it is implemented (e.g., ridesharing management server 150) and another component of ridesharing management system 100 (e.g., mobile communications devices 120A-120F, one or more vehicles, database 170). For example, ridesharing management server 150 may receive location receive location data indicative of a current location of the vehicle from a device (e.g., a wireless communication device) associated with the vehicle via communication module 1201. Ridesharing management server 150 may also receive ride requests from the devices associated with users. Ridesharing management server 150 may further receive updated information relating to one or more users and/or ridesharing vehicles via communication module 1201. For instance, via communication module 1201, ridesharing management server 150 may receive an updated schedule of a public transportation relating to a user's ride from a website of the operator of the public transportation (or other resources).

Ride request module 1202 may include software instructions for receiving a plurality of requests for a ride from a plurality of users. Each ride request may include a desired starting point and a desired destination. For example, a ride request from a user may include a desired starting point determined based on GPS data generated by a GPS component of a device associated with the user. The ride request may also include a desired destination generated based on an input by the user at the device associated with the user. In some embodiments, ride request module 1202 may determine a pick-up location and a drop-off location based on the ride request. The determined pick-up location may be a location other than but in proximity to the starting point, and the determined drop-off location may be a location other than but in proximity to the desired destination. Additionally or alternatively, ride request module 1202 may determine the drop-off location for a user based on the status of a vehicle to be assigned to this user, the desired destination of the ride request, and/or other factors. For example, in one embodiment, a ride request may include information that the desired destination is a building at the corner of an intersection of two cross streets. Ride request module 1202 may determine that dropping the user off at the intersection would result in the vehicle entering a one-way street, impeding a more efficient route to a charging station. Thus, ride request module 1202 may instead, for example, determine a drop-off location at a location proximal to the desired destination, and avoid entering the one-way street. In some embodiments, ride request module 1202 may determine a drop-off location that is associated with a public transportation based on the desired destination. For example, a user may currently be in New York City and transmit to the vehicle management system a ride request including a location in Boston as the desired destination via the device associated with the user. Ride request module 1202 may determine a central bus station in New York City as the drop-off location such that the user can take a bus at the bus station to Boston.

Location module 1203 may include software instructions for receiving current vehicle location data for a vehicle in real time or periodically. In some embodiments, the current vehicle location data may include global positioning system (GPS) data generated by at least one GPS component associated with the vehicle. Alternatively or additionally, the location data may include data of other types of global positioning technologies (e.g., Galileo or global navigation satellite system (GNSS)) generated by a corresponding positioning component. Additionally or alternatively, location module 1203 may receive other location information, such as cell tower triangulation data, Wi-Fi or other signal strength data, or any other combination of location information. In one example, location module 1203 may receive the location data from, for example, a mobile communication device (e.g., a smartphone, tablet, wearable device, etc.) associated (e.g., located in the passenger cabin) with the vehicle.

Assignment module 1205 may electronically assign a ridesharing vehicle to one or more users. Assignment module 1205 may also determine a route for the vehicle to pick up and drop off the user(s) and direct the vehicle according to the determined route. Assignment module 1205 may determine a first driving route for a vehicle and direct the vehicle to a desired destination using the first driving route. Assignment module 1205 may also reassign a user currently assigned to a ridesharing vehicle to another ridesharing vehicle based on updated information received via communication module 1201.

Route modification module 1204 may modify the driving route of a ridesharing vehicle based on a change to the schedule of one or more users currently assigned to the ridesharing vehicle. For example, route modification module 1204 may modify the driving route of a ridesharing vehicle based on a determination that continuing the current driving route will result in a delay to one of the users assigned to the ridesharing vehicle by skipping the pick-up of one of the users.

Database interface module 1206 may include software instructions for interacting with database 1207, to store and/or receive information. Database 1207 may be configured to store any type of information associated with modules 1201-1206, depending on implementation-specific considerations. For example, database 1207 may store the schedules of public transportations, and assignment module 1205 may access database 1207 for the schedule data via database interface module 1206.

Modules 1201-1206 may be implemented in software, hardware, firmware, or any combination of software, hardware or firmware. For example, if the modules are implemented in software, they may be stored in memory 250. However, in some embodiments, any one or more of modules 1201-1206 and data associated with database 1207 may, for example, be stored in processor 204 and/or executed on a device associated with ridesharing management system 100 and/or a device associated with a vehicle. Modules 1201-1206 may be configured to interact with each other and/or other modules of memory 250 to perform functions consistent with disclosed embodiments.

Figure 13:
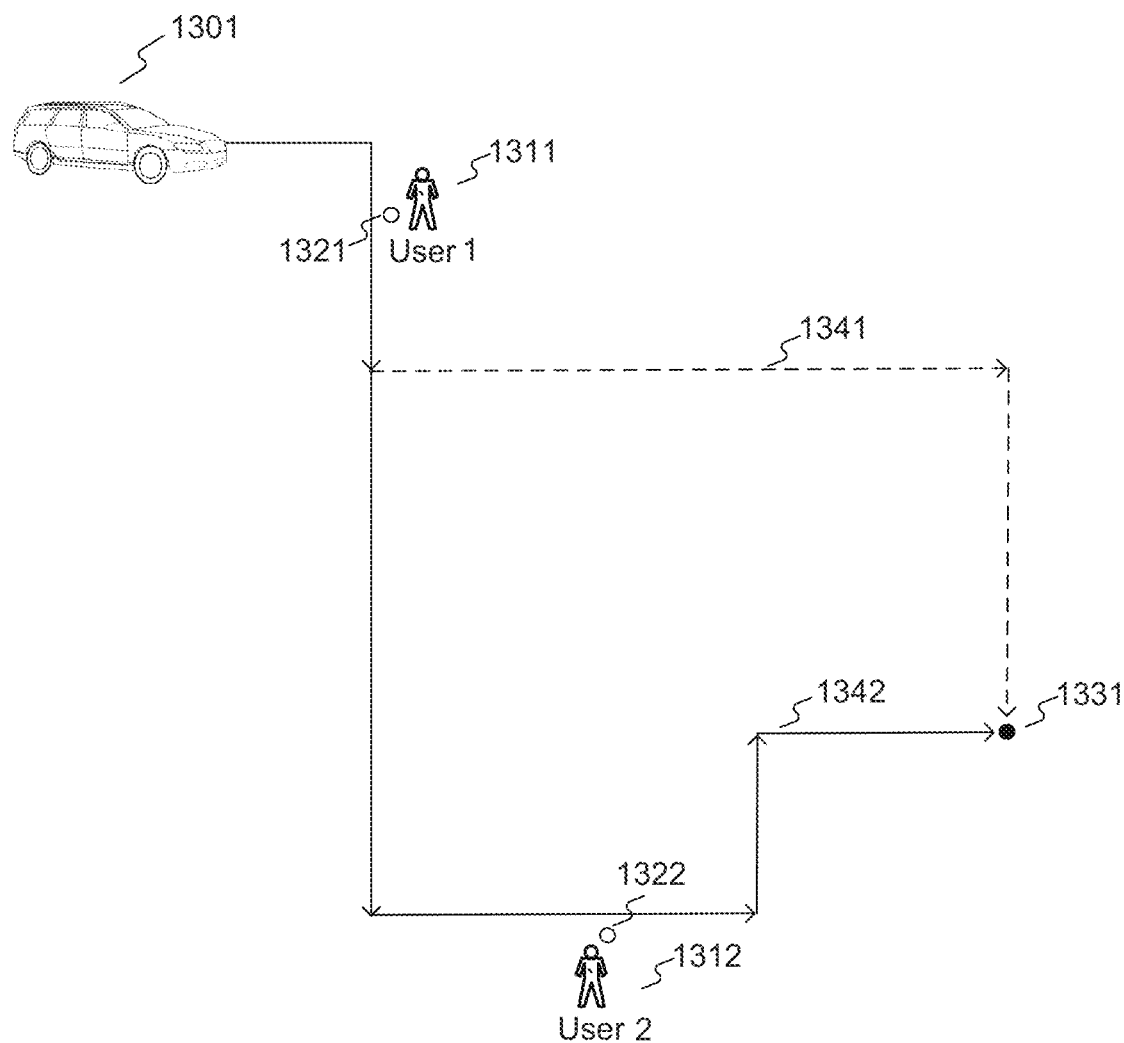
FIG. 13 is a schematic illustration of an exemplary process for directing a ridesharing vehicle consistent with the present disclosure.

FIG. 13 is a schematic illustration of an exemplary process for directing (or providing navigational directions to) a ridesharing vehicle. As illustrated in FIG. 13, ride request module 1202 may receive a first ride request from a first user 1311 via, for example, communication module 1201. The first ride request may include information specifying a desired starting point and a desired destination. The first ride request may be a shared-ride request for which the first user agrees to ride a vehicle with one or more unrelated passengers.

Assignment module 1205 may determine a first pick-up location (e.g., first pick-up location 1321) and a first drop-off location (e.g., first drop-off location 1331) for the first user 1311 based on the first ride request. Location module 1203 may receive current vehicle location data for a fleet of ridesharing vehicles. In some embodiments, the current vehicle location data associated with a vehicle may include global positioning system (GPS) data generated by at least one GPS component associated with the vehicle. Assignment module 1205 may electronically assign a ridesharing vehicle (e.g., first ridesharing vehicle 1301) to pick up the first user. Assignment module 1205 may also determine a driving route for transporting the first user (e.g., first route 1341), including first pick-up location 1321 and first drop-off location 1331. Assignment module 1205 may further determine a target arrival time for first user 1311 at first drop-off location 1331.

Ride request module 1202 may receive a second ride request from a second user (e.g., second user 1312) via communication module 1201. The second ride request may include information specifying a desired starting point and a desired destination. The second ride request may be a shared-ride request for which the second user agrees to ride a vehicle with one or more unrelated passengers. Assignment module 1205 may also determine a second pick-up location (e.g., second pick-up location 1322) and a second drop-off location (not shown) for second user 1312 based on the second ride request.

Route modification module 1204 may calculate an estimated delay that would be caused to first user 1311 by picking up of second user 1312. Route modification module 1204 may also determine whether the delay would cause first user 1311 to arrive at drop-off location after the target arrival time. If route modification module 1204 determines that picking up the second user will not cause first user 1311 to arrive at first drop-off location 1331 after the target arrival time, assignment module 1205 may electronically assign first ridesharing vehicle 1301 to pick up second user 1312. Route modification module 1204 may determine an updated (or a second) route (e.g., second route 1342) including second pick-up location 1322 and the second drop-off location of second user 1312. Assignment module 1205 may further direct first ridesharing vehicle 1301 according to second route 1342.

On the other hand, if route modification module 1204 determines that picking up second user 1312 will cause first user 1311 to arrive at the first drop-off location after the target arrival time, assignment module 1205 may electronically assign a different ridesharing vehicle (not shown) to second user 1312, and assignment module 1205 may direct first ridesharing vehicle 1301 according to first route 1341 as previously scheduled.

Figure 14A:
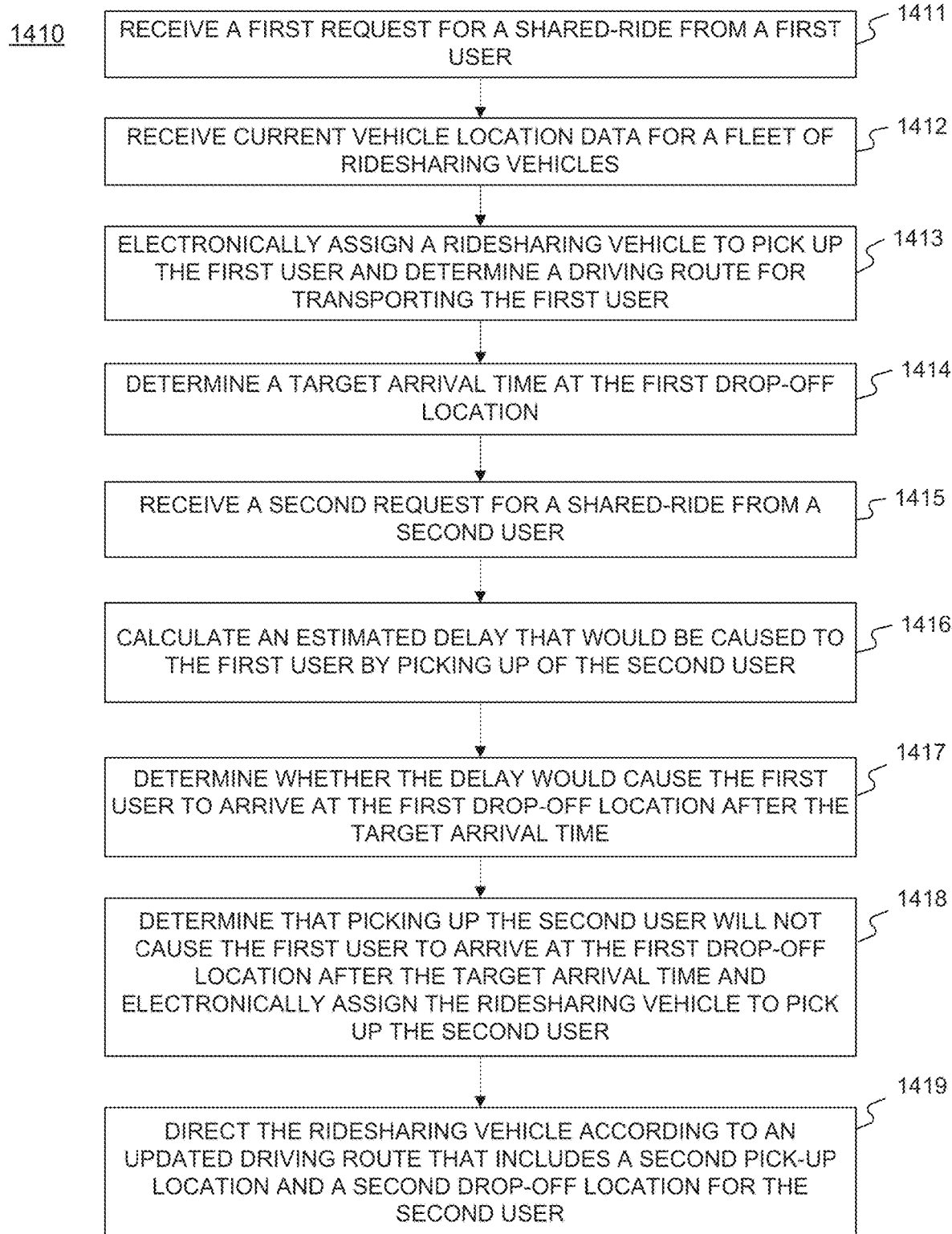
FIG. 14A is a flowchart showing an exemplary process for directing a vehicle in accordance with the present disclosure.

FIG. 14A is a flowchart showing an exemplary process 1410 for directing (or providing navigational directions to) a vehicle in accordance with some embodiments of the present disclosure. In one embodiment, the steps of process 1410 may be performed by a vehicle management server, such as ridesharing management server 150 described above with reference to FIGS. 1 and 3. Alternatively, at least some of the steps of process 1410 may be performed by a mobile communications device associated with a vehicle, such as mobile communications devices 120 described above with reference to FIGS. 1 and 2. For example, at least some of the steps of process 1410 may be performed by a mobile communications device associated with the vehicle as a navigation application installed in the mobile communications device configured to provide navigational directions to a user associated with the vehicle. Alternatively, the vehicle may be a semi-autonomous or autonomous vehicle, and at least some of the steps of process 1410 may be performed by a processing device associated with the vehicle. In the following description, reference is made to certain components of FIGS. 1-3 for purposes of illustration. It will be appreciated, however, that other implementations are possible and that other component may be utilized to implement example methods disclosed herein.

At step 1411, ride request module 1202 may receive a first ride request from a first user (e.g., first user 1311) via, for example, communication module 1201. The first ride request may include information specifying a desired starting point and a desired destination. The first ride request may be a shared-ride request for which the first user agrees to ride a vehicle with one or more unrelated passengers.

In some embodiments, a ride request received from a user may include an indication of a desire of the user to make a connection to and/or from public transportation. Exemplary public transportation includes a train, subway, bus, airplane, ferry, or the like, or a combination thereof. The connection to (or from) public transportation may relate to the desired starting point or desired destination. For example, the first ride request from first user 1311 may include an indication of a desire of first user 1311 to make a connection to a bus at first drop-off location 1331 (e.g., a bus station). In other words, first user 1311 may ride on a ridesharing vehicle from first pick-up location 1321 to first drop-off location 1331, and then ride a bus at first drop-off location 1331 (or a location close to first drop-off location 1331). As another example, the first ride request may include an indication of a desire of first user 1311 to be picked up from a bus station at the desired starting point (e.g., first pick-up location 1321). First user 1311 may arrive at the bus station and be picked up by first ridesharing vehicle 1301 at first pick-up location 1321, and first ridesharing vehicle 1301 may transport first user 1311 to first drop-off location 1331. As a further example, the first ride request may include an indication of a desire of first user 1311 to be picked up from a bus station at the desired starting point and make a connection to a train at a train station (i.e., the desired destination).

At step 1412, location module 1203 may receive current vehicle location data for a fleet of ridesharing vehicles. For example, location module 1203 may receive current vehicle location data for a vehicle from a communication device associated with the vehicle (e.g., a user device 120). In some embodiments, the current vehicle location data associated with a vehicle may include global positioning system (GPS) data generated by at least one GPS component associated with the vehicle. In some embodiments, the current vehicle location data may include GPS data generated by at least one GPS component associated with the vehicle. Alternatively or additionally, the location data may include data of other types of global positioning technologies (e.g., Galileo or global navigation satellite system (GNSS)) generated by a corresponding positioning component. Additionally or alternatively, location module 1203 may receive other location information, such as cell tower triangulation data, Wi-Fi or other signal strength data, or any other combination of location information. In one example, location module 1203 may receive the location data, for example, from a mobile communication device (e.g., a smartphone, tablet, wearable device, etc.) associated (e.g., located in the passenger cabin) with the vehicle. In some embodiments, location module 1203 may receive location data associated with the vehicle in real time or periodically.

At step 1413, assignment module 1205 may electronically assign a ridesharing vehicle (e.g., first ridesharing vehicle 1301) to pick up the first user. The assignment may be determined based on the location data associated with the ridesharing vehicles and/or the first ride request received. For example, assignment module 1205 may assign a ridesharing vehicle that is the closest to the first desired starting point (or the first pick-up location determined according to the first desired starting point) based on the current location data and the first desired starting point included in the first ride request. In some embodiments, the assignment may further be determined based on the record of a driver associated with a ridesharing vehicle. As another example, assignment module 1205 may assign a ridesharing vehicle that has a driver ranked above a ranking threshold and is the closest to the first desired starting point to the first user. In some embodiments, the record of a driver may be updated as described elsewhere in this disclosure (e.g., updating the record based on navigational mistake the driver made in the past).

Assignment module 1205 may also determine a first pick-up location and a first drop-off location for the first user based on the first ride request. Assignment module 1205 may further determine a driving route for transporting the first user, including the first pick-up location and first drop-off location. For example, assignment module 1205 may determine first pick-up location 1321 based on the first desired starting point and first drop-off location 1331 based on the first desired destination. Assignment module 1205 may further determine the first route 1341 for transporting first user 1311.

In some embodiments, assignment module 1205 may determine the first pick-up location and/or first drop-off location based on an indication included in the first ride request indicating a desire of the first user to make a connection to (and/or from) a public transportation. For example, the first ride request may include an indication of the first user to make a connection to a train at the first desired destination (e.g., a train station). Assignment module 1205 may determine the first drop-off location based on the indication. By way of example, there may be multiple pick-up (and/or drop-off) locations associated with the train station, and assignment module 1205 may determine one of the locations as the first pick-up location according to traffic data (e.g., real-time traffic conditions near the train station, road restrictions associated with the train station, etc.), information relating to the public transportation (e.g., the closest location to the train), or the like, or a combination thereof.

In some embodiments, assignment module 1205 may determine the first drop-off location (and/or first pick-up location) based on information relating to the specification public transportation (e.g., a schedule of a specific train). For example, assignment module 1205 may access the schedule data relating to a specific public transportation stored in database 1207 via database interface module 1206 (or from other resources such as the database or website associated with the operator of the public transportation).

At step 1414, assignment module 1205 may determine a target arrival time at the first drop-off location. For example, assignment module 1205 may determine a target arrival time at the first drop-off location based on the first route, traffic data along (or associated with) the first route, potential time for picking up the first user, potential detour time (e.g., picking up another user), or the like, or a combination thereof. In some embodiments, assignment module 1205 may transmit the information of the target arrival time to the first ridesharing vehicle and/or the first user via the device associated with the vehicle or user.

In some embodiments, assignment module 1205 may determine a target arrival time at the first drop-off location (and/or the first pick-up location) based on the first ride request. For example, as described above, the first ride request may include an indication of a desire of the first user to make a connection to (and/or from) a public transportation. Assignment module 1205 may determine a target arrival time at the first drop-off location based on the desired connection. By way of example, the first user may indicate in the first ride request that the user desires to make a connection to a train leaving a train station by 2:00 p.m. Assignment module 1205 may determine a drop-off location for the first user based on the first ride request. Assignment module 1205 may also determine a target arrival time at the drop-off location to be 1:30 p.m., which enables the desired connection of the first user. As such the first user can make the desired connection on time.

In some embodiments, assignment module 1205 may access a schedule for the specific public transportation, and determine a target arrival time based on a schedule of the public transportation that enables the first user to arrive on time for the public transportation. For example, the first ride request may include an indication of a desired connection of the first user to make a connection to a subway at a desired destination. Assignment module 1205 may determine a drop-off location for the first user based on the indication. Assignment module 1205 may also access a subway schedule from one or more resources (e.g., schedule data stored in database 1207, a website associated with the subway operator, etc.). Assignment module 1205 may further determine a target arrival time that enables the first user to arrive on time for the subway. The determination of the target arrival time may be based on the first pick-up location, first drop-off location, the schedule of the subway, traffic data, or the like, or a combination thereof. In some embodiments, assignment module 1205 may also determine a departure time of the public transportation based on the accessed schedule. Assignment module 1205 may further transmit to the first user information relating to the departure time of the public transportation via communication module 1201.

In some embodiments, when determining the target arrival time at the first drop-off location, assignment module 1205 may take an orientation time factor into account. The orientation time factor refers to the time for a user to find the specific public transportation (or the assigned ridesharing vehicle). For example, assignment module 1205 may obtain (or determine) stop information relating to the public transportation and determine an orientation time factor based on the stop information. By way of example, assignment module 1205 may determine that the public transportation is a bus that stops at a bus stop by the street. Assignment module 1205 may determine an orientation time factor of 2 minutes for the first user to find the bus. Assignment module 1205 may also determine the target arrival by adding the determined orientation time factor of 2 minutes to an estimated time of arrival determined based on traffic data (and/or other factors). As another example, assignment module 1205 may determine that the public transportation is a bus that stops in a central station with dozens of other buses. Assignment module 1205 may determine an orientation time factor of 10 minutes for the first user to find the bus. In some embodiments, stop information relating to public transportations and corresponding orientation time factors may be stored in database 1207, and assignment module 1205 may access stored orientation time factors in database 1207 via database interface module 1206.

In some embodiments, assignment module 1205 may determine an expected time of arrival at the first desired destination of the first user following using the public transportation. For example, the first user may currently be in New York City and transmit to the vehicle management system a first ride request including a location in Boston as the first desired destination via the device associated with the user. Assignment module 1205 may determine a bus station in New York City as the first drop-off location. Assignment module 1205 may also determine a schedule of a bus that can transport the first user to the desired destination. Assignment module 1205 may further determine a specific bus for the first user and determine a target arrival time based on the schedule of the bus (e.g., the departure time of the bus). In some embodiments, assignment module 1205 may take an orientation time factor into account when determining the target arrival time as described elsewhere in this disclosure. Assignment module 1205 may also transmit to the device associated with the first user the determined specific bus and target arrival time. In some embodiments, assignment module 1205 may further determine a pick-up time based on the target arrival time, bus schedule, pick-up location, traffic data, or the like, or a combination thereof. Assignment module 1205 may also determine an expected time of arrival at the first desired destination (i.e., a bus station in Boston or the desired location included in the first ride request) following use of the specific public transportation. Assignment module 1205 may further transmit an indication of the expected time of arrival to the device associated with the first user.

In some embodiments, assignment module 1205 may electronically assign a ridesharing vehicle to pick up the first user at the destination of the specific public transportation and transport the first user to the desired destination. For example, the first user, who is currently in New York City, may specify a desired destination in Boston. Assignment module 1205 may determine a specific bus as the public transportation and a central bus station as the first drop-off location. Assignment module 1205 may also determine a pick-up location (in Boston or a neighbor city) for a ridesharing vehicle to pick up the first user when the user arrives at the bus station in Boston following use of the bus. Assignment module 1205 may also determine a drop-off location for the first user based on the desired destination and electronically assign a ridesharing vehicle to transport the first user from that pick-up location to the determined drop-off location.

In some embodiments, assignment module 1205 may obtain updates of the public transportation schedule (in real time or periodically) and determine the target arrival time based on the updates of the schedule of the specific public transportation. Assignment module 1205 may also determine an updated target arrival time based on the updates of the schedule of the specific public transportation. Assignment module 1205 may further modify one or more assignments relating to the first ridesharing vehicle. For example, assignment module 1205 may determine that an updated target arrival time is earlier than the previously determined target arrival time based on the real-time updates. To enable the first user to make the connection on time, assignment module 1205 may cancel the assignment of a second user who has also been assigned to the first ridesharing vehicle. Assignment module 1205 may further assign a second ridesharing vehicle to pick up the second user at the determined pick-up location for the second user. As another example, according to the real-time updates, assignment module 1205 may determine that the updated target arrival time is later than the previously determined target arrival time. Assignment module 1205 may also determine an estimated delay that would be caused to the first user 1311 by picking up a new user (e.g., a second or a third user). Assignment module 1205 may assign the new user to the first ridesharing vehicle to pick up before arriving at the first drop-off location if the delay would not cause the first user to arrive at the first drop-off location after the updated target arrival time.

At step 1415, ride request module 1202 may receive a second ride request from a second user (e.g., second user 1312) via communication module 1201. The second ride request may include information specifying a desired starting point and a desired destination. The second ride request may be a shared-ride request for which the first user agrees to ride a vehicle with one or more unrelated passengers.

At step 1416, route modification module 1204 may calculate an estimated delay that would be caused to the first user by picking up of the second user. For example, route modification module 1204 may determine a detour for picking up the second user and calculate the estimated delay based on the detour. In some embodiments, route modification module 1204 may also calculate the estimated delay based on traffic data.

At step 1417, route modification module 1204 may determine whether the delay would cause the first user to arrive at drop-off location after the target arrival time. By way of example, route modification module 1204 may calculate an estimated delay of 10 minutes that would be caused to the first user by picking up of the second user at step 1416. Route modification module 1204 may obtain the target arrival time from assignment module 1205 and determine whether the delay of 10 minutes would cause the first user to arrive at drop-off location after the target arrival time.

At step 1418, if route modification module 1204 determines that picking up the second user will not cause the first user to arrive at the first drop-off location after the target arrival time, assignment module 1205 may electronically assign the first ridesharing vehicle to pick up the second user. Route modification module 1204 may determine an updated (or a second) route including the second pick-up location and the second drop-off location of the second user. Assignment module 1205 may at step 1419 further direct first ridesharing vehicle 1301 according to second route 1342.

On the other hand, if route modification module 1204 determines that picking up the second user will cause the first user to arrive at the first drop-off location after the target arrival time, assignment module 1205 may not assign the second user to the first ridesharing vehicle (or take no actions with respect to the assignment of the first ridesharing vehicle). In other words, assignment module 1205 may direct the first ridesharing vehicle according to the first route previously scheduled. In some embodiments, assignment module 1205 may electronically assign a different vehicle to transport the second user. In some embodiments, assignment module 1205 may repeat steps 1414-1419 for a third user. For example, assignment module 1205 may receive a third ride request from a device associated with a third user and determine an estimated delay that would be caused to the first user by picking up of the third user. After determining that picking up the third user will not cause the first user to arrive at the first drop-off location after the target arrival time, assignment module 1205 may electronically assign the first ridesharing vehicle to pick up the third user.

In some embodiments, route modification module 1204 may update the first driving route for the first ridesharing vehicle such that the second user is picked up at the second pick-up location before the first user arrives at the first drop-off location. For example, as illustrated in FIG. 13, first ridesharing vehicle 1301 may pick up second user 1312 at second pick-up location 1322 before first user 1311 arrives at first drop-off location 1331 according to the updated route (i.e., second route 1342). In some embodiments, route modification module 1204 may update the driving route for the first ridesharing vehicle such that the second user is dropped off at the second drop-off location before the first user arrives at the first drop-off location.

In some embodiments, assignment module 1205 may send to the first user an indication of a guaranteed arrival time associated with a transfer to a different ridesharing vehicle to complete a ride of the first user. For example, assignment module 1205 may assign a first ridesharing vehicle, which is for inter-city rides, to the first user for the first portion of the ride and assign a second ridesharing vehicle, which is for intra-city rides, to the first user for the second portion of the ride. The second ridesharing vehicle may pick up the first user at a transfer location and transport the first user to the first drop-off location. In some embodiments, assignment module 1205 may receive updates on a current location of the second ridesharing vehicle and to reassign a second user who has been assigned to the first or second ridesharing vehicle to a different ridesharing vehicle (e.g., a third ridesharing vehicle) based on predicted arrival times of the first and second ridesharing vehicles at a passenger transfer location. For example, assignment module 1205 may determine that the second ridesharing vehicle will arrive at the transfer location late (e.g., for 5 minutes) according to its current assignment and/or a current location of the second ridesharing vehicle. Assignment module 1205 may reassign the second user, who has been previously assigned to the second ridesharing vehicle, to a third ridesharing vehicle. Assignment module 1205 may update the route for the second ridesharing vehicle and direct the second ridesharing vehicle to skip picking up the second user and go to the transfer location of the first user directly. The third ridesharing vehicle may pick up the second user and transport the second user according to the new assignment.

In some embodiments, before reassigning the first (or second) user, assignment module 1205 may request an agreement from the user to be reassigned. For example, assignment module 1205 may transmit via communication module 1201 a request of reassignment to the device associated with the user. The request of reassignment may include information relating to potential delay to the user that would result from continuing the current assignment. For example, assignment module 1205 may transmit a request to the user indicating that he or she would arrive 15 minutes late at the desired destination (or the drop-off location). The request may also indicate that the user would arrive on time (or 5 minutes late) if he or she agrees to be reassigned to a different ridesharing vehicle. In some embodiments, assignment module 1205 may also provide an incentive to the user to agree to a reassignment. Exemplary incentive may include a discount for the ride (or a future ride), a coupon, or the like, or a combination thereof.

Figure 14B:
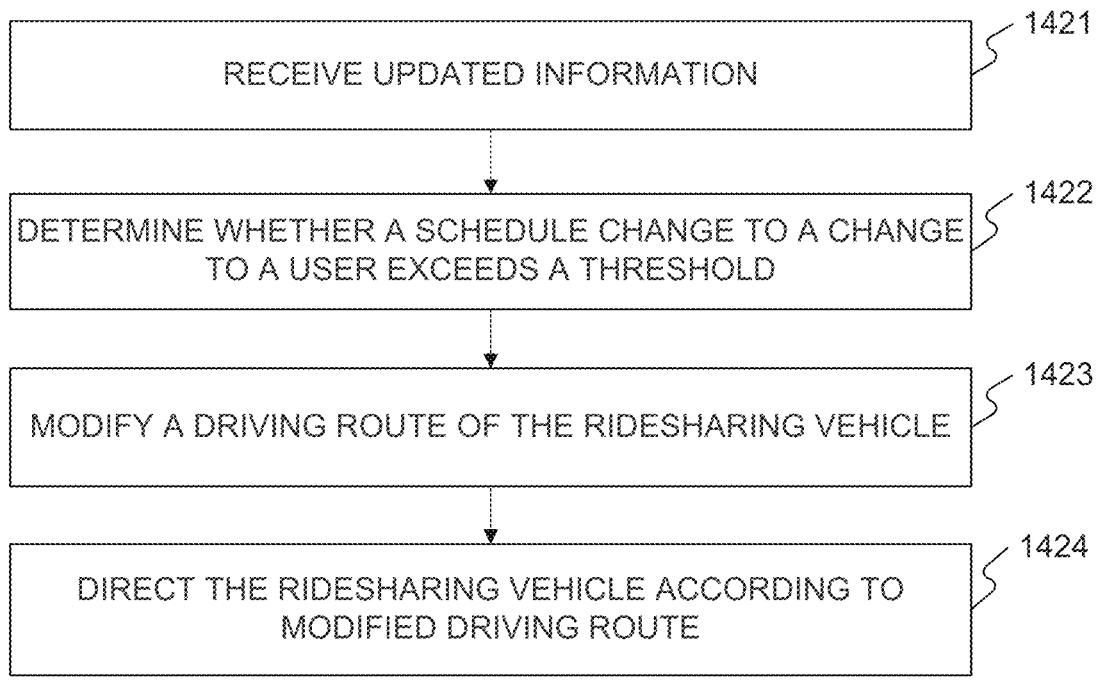
FIG. 14B is a flowchart showing an exemplary process for directing a vehicle according to updated information in accordance with the present disclosure.

In some embodiments, after assigning a second user to the first ridesharing vehicle, the vehicle management system may modify the route of the first ridesharing vehicle based on updated information. FIG. 14B is a flowchart showing an exemplary process 1420 for directing a vehicle according to updated information in accordance with some embodiments of the present disclosure.

At step 1421, communication module 1201 may receive updated information. Updated information received may include updated information relating to the first user, the second user, the first ridesharing vehicle, one or more other ridesharing vehicles, the public transportation, traffic data, environment conditions associated with the driving route, or the like, or a combination thereof. For example, the first ride request from the first user may include an indication that the first user will arrive at the first starting point or the first pick-up location using a public transportation, and communication module 1201 may receive updated information associated with the first user in real time or periodically. The updated information may include updated information relating to the public transportation arriving near the first starting point or the first pick-up location. By way of example, communication module 1201 may receive an updated arrival of time of a train (i.e., the public transportation) indicating that the bus will be late at the first starting point (or the first pick-up location) for 10 minutes.

In some embodiments, the first ridesharing vehicle may be assigned to three or more users. For example, the first ridesharing vehicle may be assigned to the first user, the second user, and a third user. Before picking up the first user, the first ridesharing vehicle may have already picked up the third user (also referred to an existing user). Communication module 1201 may receive updated information relating to the first user, second user, and/or existing user.

At step 1422, assignment module 1205 may determine whether a schedule change to the first user and/or the second user (and/or an existing user) that will result from continuing the current driving route (i.e., the updated driving route based on the first driving route) exceeds a threshold, based on the received updated information. The threshold may be in a range of 1 to 60 minutes. In some embodiments, the threshold may be restricted in a subrange of 1-5 minutes, 5-10 minutes, 10-30 minutes, or 30-60 minutes.

For example, communication module 1201 may receive updated information associated with the first user that includes an updated arrival of time of a train (i.e., the public transportation) indicating that the bus will arrive at the first starting point (or the first pick-up location) late (e.g., for 10 minutes). Assignment module 1205 may determine whether a schedule change to the first user and/or the second user that will result from continuing the current driving route exceeds a threshold because of the late arrival of the train. By way of example, assignment module 1205 may determine that the 10-minute delay of the train will cause a 10-minute delay to the target arrival time of the first user at the first drop-off location if the first ridesharing vehicle continues the current route, which includes picking up the second user at the second pick-up location. Assignment module 1205 may also determine that the delay to the first user exceeds a threshold (e.g., 5 minutes). As another example, assignment module 1205 may determine that the 10-minute delay of the train will cause a 10-minute delay to the second user to arrive at the second drop-off location if the first ridesharing vehicle continues the current driving route, and the delay to the second user exceeds a threshold. As a further example, communication module 1201 may receive an updated schedule of the train indicating that the train will arrive 10 minutes early at the first starting point (or the first pick-up location). Assignment module 1205 may determine that the early arrival of the train may cause an extra 10-minute waiting time of the first user to wait for the picking up the second user as previously scheduled if the first ridesharing vehicle continues the current driving route. Assignment module 1205 may also determine that this change to the first user's schedule exceeds a threshold (e.g., 5 minutes). As yet another example, assignment module 1205 may determine whether the sum of the changes to the first and second users exceeds a threshold.

In some embodiments, the first ridesharing vehicle may be assigned to three or more users. Assignment module 1205 may determine whether the change to one of the users (or any combination of the changes to two or more users) exceeds a threshold based on the updated information.

If assignment module 1205 determines that the change to the schedule of the first and/or second user (and/or an existing user) does not exceed the threshold, assignment module 1205 may direct the first ridesharing vehicle 1301 according to the current driving route (or take no further action). On the other hand, if assignment module 1205 determines that the change to the schedule of the first or second user (and/or an existing user) exceeds the threshold, process 1420 may proceed to step 1423.

At step 1423, assignment module 1205 may update the assignment of the first ridesharing vehicle and/or one or more other ridesharing vehicles. Route modification module 1204 may also modify the driving route of the first ridesharing vehicle based on the determined change to the schedule of the first and/or second user (and/or an existing user). For example, assignment module 1205, at step 1422, may determine that a 10-minute delay to the arrival time of the first user at the first drop-off location that will result from continuing the current driving route exceeds a threshold, and assignment module 1205 may reassign the second user (who has been previously assigned to the first ridesharing vehicle) to a different ridesharing vehicle (e.g., a second ridesharing vehicle). As such, the first ridesharing vehicle may drive to the first drop-off location without picking up the second user. As another example, instead of reassigning the second user as described in the example above, assignment module 1205 may reassign the first user to a second ridesharing vehicle, and the first ridesharing vehicle may skip picking up the first user. The second ridesharing vehicle may transport the first user to the first drop-off location, and the first ridesharing vehicle may transport the second user to the second drop-off location.

Route modification module 1204 may modify the current driving route for the first ridesharing vehicle. For example, route modification module 1204 may modify the driving route of the first ridesharing vehicle based on the current location of the vehicle and the first drop-off location (and/or other factors such as traffic conditions). Route modification module 1204 may also modify the driving route for the second ridesharing vehicle, and the modified driving route includes the second pick-up location and second drop-off location of the second user.

In some embodiments, communication module 1201 may transmit to the device(s) associated with the first user and/or the second user information relating to the modified assignment(s) and/or driving route(s). Communication module 1201 may also transmit information relating to the modified assignment(s) and/or modified driving route(s) to the device(s) associated with the first ridesharing vehicle and/or the second ridesharing vehicle.

At step 1424, assignment module 1205 may direct the first ridesharing vehicle (and/or the second ridesharing vehicle) according to the modified driving route. For example, assignment module 1205 may reassign the second user to the second ridesharing vehicle based on the change to the schedule of the first user (or the second user), and direct the first ridesharing vehicle to skip the second user and transport the first user to the first drop-off location directly according to the modified driving route of the first ridesharing vehicle. Assignment module 1205 may also direct the second ridesharing vehicle according to the modified driving route of the second ridesharing vehicle (e.g., changing the previous driving route to pick up the second user).

Assigning On-Demand Vehicles Based on ETA of Fixed-Line Vehicles

Public transportation may be characterized by fixed lines of buses or other vehicles that operate at a certain frequency or on a certain route, which may depend on time of day or day of week. Alternatively, there may be predefined departure times designating when buses exit a starting point. In many cases, especially during off-peak hours, this somewhat non-flexible mode of operation may be underutilized due to a low number of passengers. In some cases, riders who may need to switch between different bus lines, may wait for each ride segment and experience suboptimal quality of service given invested resources. In other cases, a flexible on-demand ridesharing service may suffer from being too flexible. For example, where the topology of a city is not arranged as a large grid (such as Manhattan), but rather a collection of neighborhoods connected by main roads, travelling within any such neighborhood may involve traveling around a loop that goes around the neighborhood. In such an example, if a vehicle that provides an on-demand service enters a certain neighborhood at a certain time, it may be suboptimal that another on-demand vehicle or a fixed-line vehicle enters the same neighborhood immediately after the first vehicle, especially if demand is sparse.

In some embodiment of the present disclosure, a ridesharing management system may be configured to manage one or more ride requests received from a user by determining whether to assign an on-demand ridesharing vehicle to a user. The ridesharing management system may also be configured to direct a user to a pick-up location at which the user will be picked-up by a fixed-line ridesharing vehicle. The fixed-line ridesharing vehicle may include vehicle that operate within modes of public transportation.

In some embodiments of the present disclosure, a system may integrate fixed-lines and on-demand services to enable an optimal utilization of vehicles, driver hours, and mileage. In some embodiments, the fleet management system of a combined on-demand and fixed-lines service may add restrictions to ride requests to enable greater optimization of the fleet as a whole. Such a fleet management system may switch a number of fixed-line vehicles to operate as on-demand vehicles and improve overall quality of service. Alternatively, or additionally, the fleet management system may dilute a number of fixed-line vehicles and switch part of them to on-demand vehicles such that overall number of vehicles may be lower, and still provide comparable quality of service with lower cost. In addition, the integration can be manifested through a multi-leg journey that includes a fixed-line service and an on-demand service, where the on-demand service takes into account the scheduling of the fixed-lines service. For example, an on-demand vehicle may be directed to reach a destination before the arrival of the next fixed-line vehicle assigned for the multi-leg journey as the second leg. In another example, an on-demand vehicle may be directed to reach a drop-off point of the fixed-line route after the arrival of the fixed-line vehicle assigned for the multi-leg journey as the first leg, but not too much after, i.e., within a predefined period of time. In another embodiment, an on-demand vehicle may not exit a departure point too soon after or before a fixed-line vehicle exit the departure point. These and other features of presently disclosed embodiments are discussed in more detail below.

Figure 15:
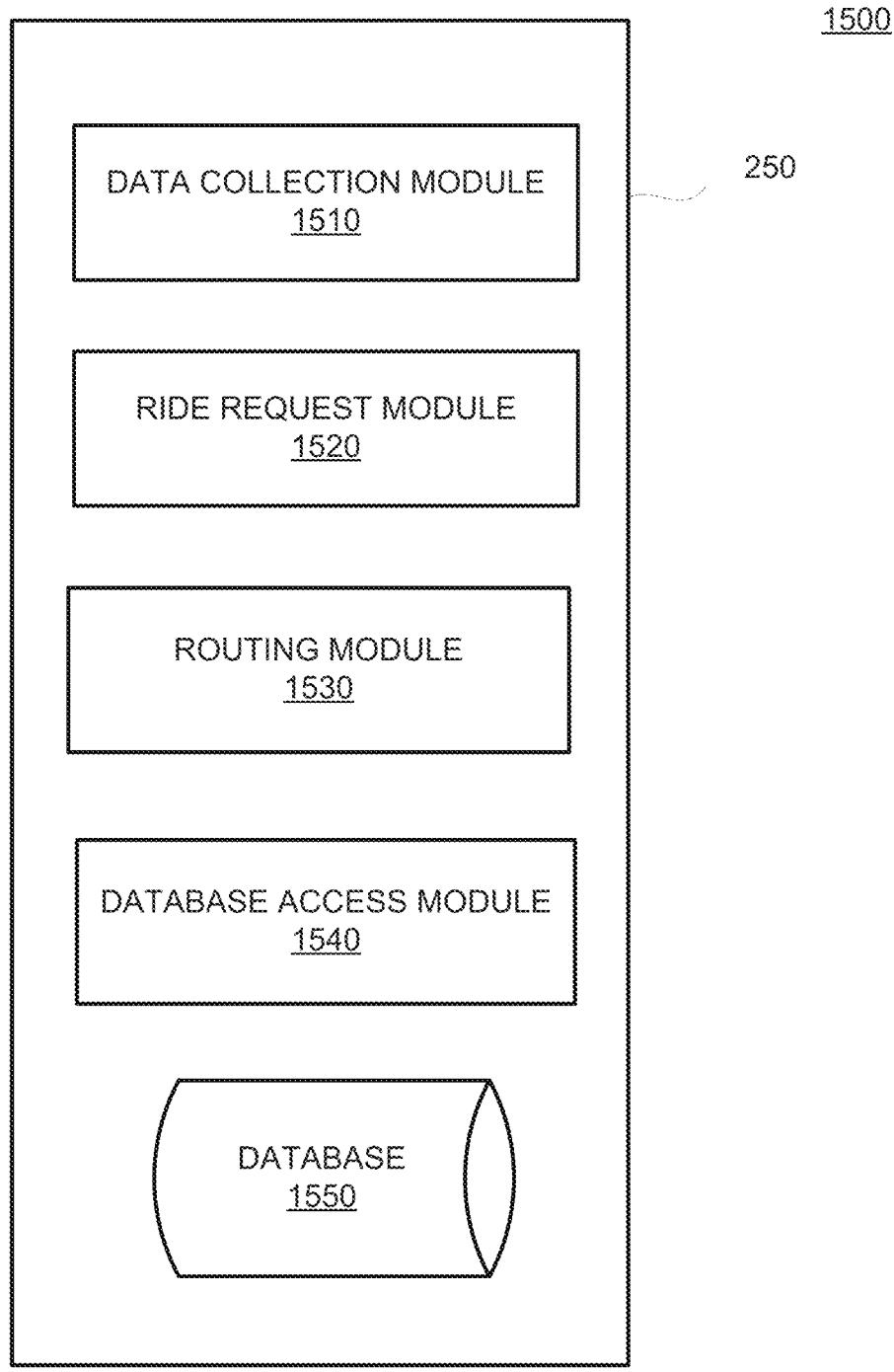
FIG. 15 is an exemplary embodiment of a memory containing modules consistent with the present disclosure.

FIG. 15 depicts an embodiment of memory module 250 for assigning on-demand vehicles based on an estimated time of arrival (ETA) of a fixed-line vehicle. Memory 250 may store a plurality of modules, and may be executable by at least one processor to perform various methods and processes disclosed herein. Further, it should be noted that memory 250 may store more or fewer modules than those shown in FIG. 15, depending on implementation-specific considerations.

As illustrated in FIG. 15, memory 250 may store software instructions to execute a data collection module 1510, a ride request module 1520, a routing module 1530, a database access module 1540, and may include a database 1550. Data collection module 1510 may include software instruction for receiving information related to one or more users, one or more on-demand vehicle, and/or one or more fixed-line vehicles from one or more sources. Ride request module 1520 may include software instruction for receiving a ride request from one or more users and analyzing data received from data collection module 1510 pertaining to the one or more ride requests. Routing module 1520 may include software instruction for assigning a on-demand vehicle to a ride request based on the analysis from ride request module 1520 and directing the on-demand vehicle. Database access module 1530 may include software instruction executable to interact with database 1540, to store and/or receive information collected by data collection module 1510.

Data collection module 1510 may include software instructions for collecting data associated with one or more of an on-demand ridesharing vehicle, a fixed-line ridesharing vehicle, and or a user. Data collection module 1510 may receive data via communications interface 360. For example, data collection module 1510 may include software instructions for receiving information of a first group of on-demand ridesharing vehicles and a second group of fixed-line ridesharing vehicles. The received information may include one or more pick-up locations from which one or more fixed-line vehicles are able to pick-up a user, and one or more pick-up locations from which one or more on-demand vehicles are able to pick-up the user. The received information may also include a current location of one or more users of a ridesharing system. The pick-up locations and/or the current location information may be received as a geographical coordinate information, street address, or a region prescribed by a geo-fence. In some embodiments, the first pick-up location and second pick-up location may be located within a certain proximity of each other, including on the same street. In some embodiments, the first pick-up location and second pick-up location may be located on different streets.

Data collection module 1510 may include software instructions for receiving current vehicle location data for one or more specific fixed-line vehicles and on-demand vehicles in a fleet of ridesharing vehicles. In some embodiments, the current vehicle location data may include global positioning system (GPS) data generated by at least one GPS component associated with the specific vehicle. Additionally, or alternatively, data collection module 1510 may receive other location information, such as cell tower triangulation data, Wi-Fi or other signal strength data, or any other combination of location information.

Data collection module 1510 may also be configured to receive data associated with the received pick-location information and current location information of the user. For example, data collection module 1510 may receive weather information and/or traffic information. The weather and traffic information may include real-time data or historical data associated with the geographical region and/or or more characteristics of the ride request including a time of day, day of week, season of the year. The one or more characteristics may also include information that are likely to affect one or more of the categories of received information. For example, data collection module 1510 may collect information regarding sports events that may be scheduled to occur in a particular geographical region associated with a current location of the user.

In some embodiments, data collection module 1510 may receive information associated with a schedule of a fixed-line vehicle. The fixed-line vehicle may operate on a pre-determined schedule, including a predetermined number of stops, predetermined drop-off locations, and dynamic schedule of the stops. The dynamic schedule of stops based on a time of day or day or week. Additionally, or alternatively, data collection module 1510 may also receive weather information, traffic information, and/or demand information associated with the first pick-up location, second pick-up location and/or current location of the user. The weather information, traffic information and/or demand information may be based on real-time data or historical data stored in database 1550.

Additionally, or alternatively, data collection module 1510 may also receive utilized capacity information associated with one or more fixed-line vehicle associated with a fleet of fixed-line ridesharing vehicles. The utilized capacity information may include data relating to a maximum capacity of passengers a fixed-line vehicle is able to transport and a number of passengers currently being transported by the fixed-line vehicle. The difference in between the maximum capacity and the number of passengers currently being transported may represent an available capacity. In some embodiments, the utilized capacity information may include data relating to a number of passengers assigned to the fixed-line vehicle, that has not been picked up yet but is expected to be picked up.

Additionally, or alternatively, data collection module 1510 may also receive data pertaining to a waiting threshold. A value for a waiting threshold may be determined based on one or more environmental conditions. For example, in some embodiments, data collection module 1510 may determine that a waiting threshold is a certain duration based on data received that it is raining and/or temperatures are low in a geographical region associated with a current location of a user of a first pick-up location. In come embodiments, data collection module 1510 may receive data associated with a waiting threshold set by a user.

Ride request module 1520 may include software instructions for receiving one or more ride requests from one or more users requesting services from a ridesharing management server. A ride request may be transmitted to ridesharing management server 150 and may include information such as a current location of a user, a desired destination of the user, an identity of the user, a rating of the user, a number of passengers to be picked-up, etc. Information associated with a ride request may be received, for example, from a mobile communication device (e.g. a smartphone, tablet, wearable device, etc.) associated with a user. Network 140 may be configured to transmit data to communications interface 340 for processing by processor 310.

Ride request module 1520 may also include instructions for receiving location information for a first group of on-demand ridesharing vehicles and a second group of fixed-line ridesharing vehicles. Ride request module 1520 may, based on the received location information, identify a fixed-line vehicle in the second group available to pick-up the user from a pick-up location other than a current location of the user. Ride request module 1520 may also, based on the received location information, identify an on-demand vehicle in the first group available to pick-up the user from a pick-up location other than a current location of the user.

Ride request module 1520 may also include instructions for analyzing information associated with the received location information and data collected by data collection module 1510. For example, in some embodiments, ride request module 1520 may determine one or more value indicative of a time duration of a ridesharing vehicle to arrive at a pick-up location, a waiting time for a user, a time duration for a ridesharing vehicle to reach a drop-off location, a walking distance for a user to reach a pick-up location from a current location of the user, and/or a walking distance for a user to reach a desired destination from a drop-off location.

In some embodiments, determining a time duration for a ridesharing vehicle to arrive at a pickup location may include determining a first value indicative of a time duration for a fixed-line ridesharing vehicle to arrive at a first pick-up location and determining a second value indicative of a time duration for an on-demand ridesharing vehicle to arrive at a second pick-up location. The first value and second value may be determined based on an analysis of traffic information within a geographical region, a distance between current location of each of the ridesharing vehicles and the respective pick up location, environmental conditions affecting a time duration, such as rain or limited visibility, and/or current vehicle assignment information, including a current route associated with each ridesharing vehicle. FIG. 16A may represent exemplary process 1610 for assigning one of a fixed-line vehicle or an on-demand ridesharing vehicle to pick-up a user based on an estimated time of arrival time, according to an embodiment consistent with the present disclosure.

In some embodiments, ride request module 1520 may include instructions for estimating a travel duration for a user to reach the desired destination when traveling in the on-demand ridesharing vehicle and a travel duration for a user to reach the desired destination when traveling in the fixed-line ridesharing vehicle. The estimated travel duration may be based on an analysis of traffic information within a geographical region, a distance between a pickup location for each of the ridesharing vehicles and the respective drop-off locations, environmental conditions affecting a travel duration and/or speed, such as rain or limited visibility, and/or vehicle assignment information, including route for one or more passengers previously associated with each ridesharing vehicle. FIG. 16C may represent exemplary process 1630 for assigning one of a fixed-line vehicle or an on-demand ridesharing vehicle to pick-up a user based on a comparison of a travel duration for a fixed-line vehicle with a travel duration for an on-demand vehicle, according to an embodiment consistent with the present disclosure.

In some embodiments, ride request module 1520 may include instructions for estimating a first walking distance associated with the fixed-line vehicle and a second distance associated with the on-demand ridesharing vehicle. The estimated walking distance may be compared to a walking distance threshold set by a user. The walking distance threshold may be representative of a maximum distance that a user is amenable to walking for a particular ride request. In some embodiments, the first and second walking distance may include a distance from a current location of the user to each of a first pick up location and a second pick up location. In some embodiments, where the drop-off location is different from a desired destination set by the user, the first and second walking distance may include a distance from each drop-off location to the desired destination indicated by the user. Still in other embodiments, the first and second walking distance may be a combination of a distance from a current location to a pick up location and a drop-off location to a desired destination for each of a fixed-line vehicle and an on-demand vehicle. FIG. 16D may represent exemplary process 1640 for assigning one of a fixed-line vehicle or an on-demand ridesharing vehicle to pick-up a user based on a comparison of a walking distance for a fixed-line vehicle with a walking distance for an on-demand vehicle, according to an embodiment consistent with the present disclosure.

Ride request module 1520 may also include software instructions for determining, using historical data, predicted demand for ridesharing requests in at least one area proximate to at least one of the pick-up locations or a current location of the user. In some embodiments, the predicted demand for ridesharing requests may be based on historical data associated with a past demand for ridesharing requests in the at least one area proximate to the at least one of first pick-up location or a second pick-up location. The predicted demand may be associated with a number of ride requests received by ridesharing management server within a predetermined period of time. In other embodiments, the predicted demand may be associated with a time of day, day of the week, month of the year, and/or an event being hosted in the at least one area proximate to at least one of the pick-up locations, drop-off locations, or desired destinations.

Additionally, or alternatively, ride request module 1520 may include instructions for determining an expected waiting time for each of the ride-share vehicle and a fixed-line vehicle. The expected waiting time may represent an estimated time expected to transpire in which the user is waiting as assigned ridesharing vehicle for arrive. For example, in some embodiments, the waiting time may include a time that a user is expected to wait at a pick-up location until an assigned ridesharing vehicle arrived. Ride request module may compare the expected waiting time to a waiting threshold received by data collection module 1510. The comparison may represent whether the expected waiting time is within the permissible amount of time prescribed by the waiting threshold.

Additionally, or alternatively, ride request module 1520 may include instruction for confirming that a first value indicative of a time duration for a fixed-line vehicle to reach a pick-up location and a second value indicative of a time duration for an on-demand vehicle to reach the second pick-up location is greater than the estimated time duration required for the user to reach a first and second respective pick up location. This confirmation may ensure that a user will have sufficient time to reach the pick-up location from a current location of the user, where the pick-up location is different from the current location.

Routing module 1530 may include software instructions for assigning a ridesharing vehicle to a ride request, informing a user that a particular ridesharing vehicle is enroute to a pick-up location, and/or directing the user to the pick-up location associated with the particular ridesharing vehicle. Routing module 1530 may also include instruction for executing a ride request based on an analysis of data collected by data collection module 1510 and processed by ride request module 1520. In some embodiments, routing module 1530 may inform a user that a fixed-line ridesharing vehicle is enroute and direct the user to the first pick-up location upon determining that a first value indicative of a time duration for a fixed-line ridesharing vehicle to arrive at a first pick-up location is less than a second value indicative of a time duration for the on-demand ridesharing vehicle to arrive at a second pick-up location.

In some embodiments, routing module 1530 may inform a user that the fixed-line ridesharing vehicle is enroute and direct the user to the first pick-up location when the first value is value is greater than the second value but below a waiting threshold. For example, routing module may inform a user that the fixed-line vehicle will be arriving at a pick-up location, where the time for arriving at the pick-up location for the fixed-line vehicle is greater than the time for arriving at the pick-up location for the ridesharing vehicle, but the time for arriving at the pick-up location for the fixed-line vehicle is less that a waiting threshold that the user has indicated is acceptable. Still in other embodiments, routing module 1530 may inform a user that the on-demand ridesharing vehicle is enroute and direct the user to second first pick-up location when the first value is value is greater than the second value, but the time for arriving at the pick-up location for the fixed-line vehicle is greater than a waiting threshold. In some embodiments, and assignment of an on-demand to pick up the user may include determining a drop off location at a location other than the desired destination for the user and is associated with a driving route in which the user shares at least a portion of a ride with at least two other users.

Additionally, or alternatively, routing module 1530 may be configured to obtain an indication of a current utilized capacity of the fixed-line ridesharing vehicle from data collection module 1510. In some embodiments, routing module 1530 may assign an on-demand ridesharing vehicle to pick up the user when the first value is less than the second value, but the current utilized capacity of the fixed-line vehicle is greater than a capacity threshold. For example, routing module 1530 may determine that the capacity of the fixed-line vehicle is full and therefore, though it may arrive at a first pick-up spot earlier than on-demand vehicle, there is insufficient capacity in the fixed-line vehicle. Accordingly, routing module 1530 may assign an on-demand vehicle to pick up the user from a second pick up location. FIG. 16B may represent exemplary process 1620 for assigning one of a fixed-line vehicle or an on-demand ridesharing vehicle to pick-up a user based on a capacity of a fixed-line vehicle compared with a capacity threshold, according to an embodiment consistent with the present disclosure.

Additionally, or alternatively, routing module 1530 may be configured to assign an on-demand ridesharing vehicle to pick up the user when the first value is less than the second value, but the travel duration for the user to reach the desired destination when the user travels in the fixed-line vehicle is greater than the travel duration when the user travels in the on-demand ridesharing vehicle For example, if it will take the fixed line vehicle two hours to reach the desired destination and the on-demand vehicle less than two hours, routing module 1530 may assign the routing module to pick up the user. Additionally, or alternatively, routing module may be configured to assign the on-demand ridesharing vehicle to pick up the user when a combination of the first value and the first walking distance is greater than a combination of the second value and the second walking distance.

Additionally, or alternatively, routing module 1530 may be configured to assign the on-demand ridesharing vehicle to pick up the user when the first value is less than the second value, but a first walking distance associated with the fixed-line vehicle is greater than a second walking distance associated with the on-demand vehicle. For example, routing module 1530 may determine that fixed-line vehicle may arrive earlier than an on-demand vehicle to their respective pick-up location; however, if the first pick up location is greater than a walking threshold set to a walking distance that is acceptable to the user, routing module 1530 may assign the on-demand vehicle to pick up the user. Additionally, or alternatively, routing module 1530 may be configured to obtain an indication of a current utilized capacity of the fixed-line ridesharing vehicle and inform the user that the fixed-line ridesharing vehicle is enroute and direct the user to the first pick-up location when the first value is more than the second value but the current utilized capacity of the fixed-line ridesharing vehicle is below a capacity threshold.

In some embodiments, routing module 1530 may determine that the on-demand vehicle can pick up the user at a first time. Using historical demand data to predict near-future demand for ridesharing requests in the geographical area associated with a current location of the user, routing module 1530 may direct the on-demand vehicle to pick up the user at a second pick-up tip later than the first pick up time. By doing so, routing module 1530 may optimize the fleet of ridesharing vehicles to account for historical demand of the ridesharing service. In some embodiments, the second pick-up time may be such that a waiting time of the user is less than the waiting threshold. Additionally, or alternatively, routing module 1530 may determine the second pick up time based on a departure time of a fixed-line ridesharing vehicle from the geographical area to create a time interval between a departure time of the on-demand vehicle and the departure time of the fixed-line ridesharing vehicle. By doing so, routing module 1530 may accomplish purposeful spacing of on-demand vehicle based on predicted demand. Routing module 1530 may also determine a second pick up time based on a departure time of another on-demand ridesharing vehicle from the geographical area to create spacing in departure times among different on-demand ridesharing vehicles. In some embodiments, the spacing in the departure times of on-demand ridesharing vehicle may be based on at least some of a volume of the near future demand, a number of on-demand ridesharing vehicles, a number of alternative routes, a time of day, a day of week, and/or an anticipated speed of the on-demand ridesharing vehicle.

For example, in a loop-like city topology environment, on-demand vehicles may not be permitted to exit the departure point too soon after other on-demand vehicles depart from the exit point. In addition, a system that integrates on-demand services and fixed-line services may impose on on-demand driver regulations similar to those in fixed-lines services. For example, on-demand driver may not drive more than a predetermined continuous duration of time and that once they reach the predetermined continuous duration, the on-demand driver may be required to take a break from driving. In some embodiments, the break may be required to be a minimum percentage duration of the predetermined continuous duration.

As illustrated in FIG. 15, database 1550 may be configured to store any type of information associated with modules 1510-1540, depending on implementation specific considerations. For example, in some embodiments, database access module 1540 may be configured to access one or more prior-stored maps of geographical areas for determining a route, database 1550 may store the geographical maps and transmit the stored data to routing module 1530. In other embodiments, where routing module 1530 may be configured to direct a user to a fixed-line ridesharing vehicle, database access module 1540 may be configured to access and retrieve data collected by data collection module 1510 and stored in database 1550 pertaining to drop-off locations, hours of operation, historical or current demand information and/or utilized capacity for the fixed-line vehicle. Any one of data collection module 1510, ride request module 1520, routing module 1530, may access database 1550 for stored data by way of database access module 1540.

Modules 1510-1540 may be implemented in software, hardware, firmware, or any combination of software, hardware or firmware. For example, if the modules are implemented in software, they may be stored in memory 250. However, in some embodiments, any one or more of modules 1510-1540 and data associated with database 1550 may, for example, be stored in processor 310 and/or executed on a device associated with ridesharing management system 100. Modules 1510-1540 may be configured to interact with each other and/or other modules of memory 250 to perform functions consistent with disclosed embodiments.

Figure 17:
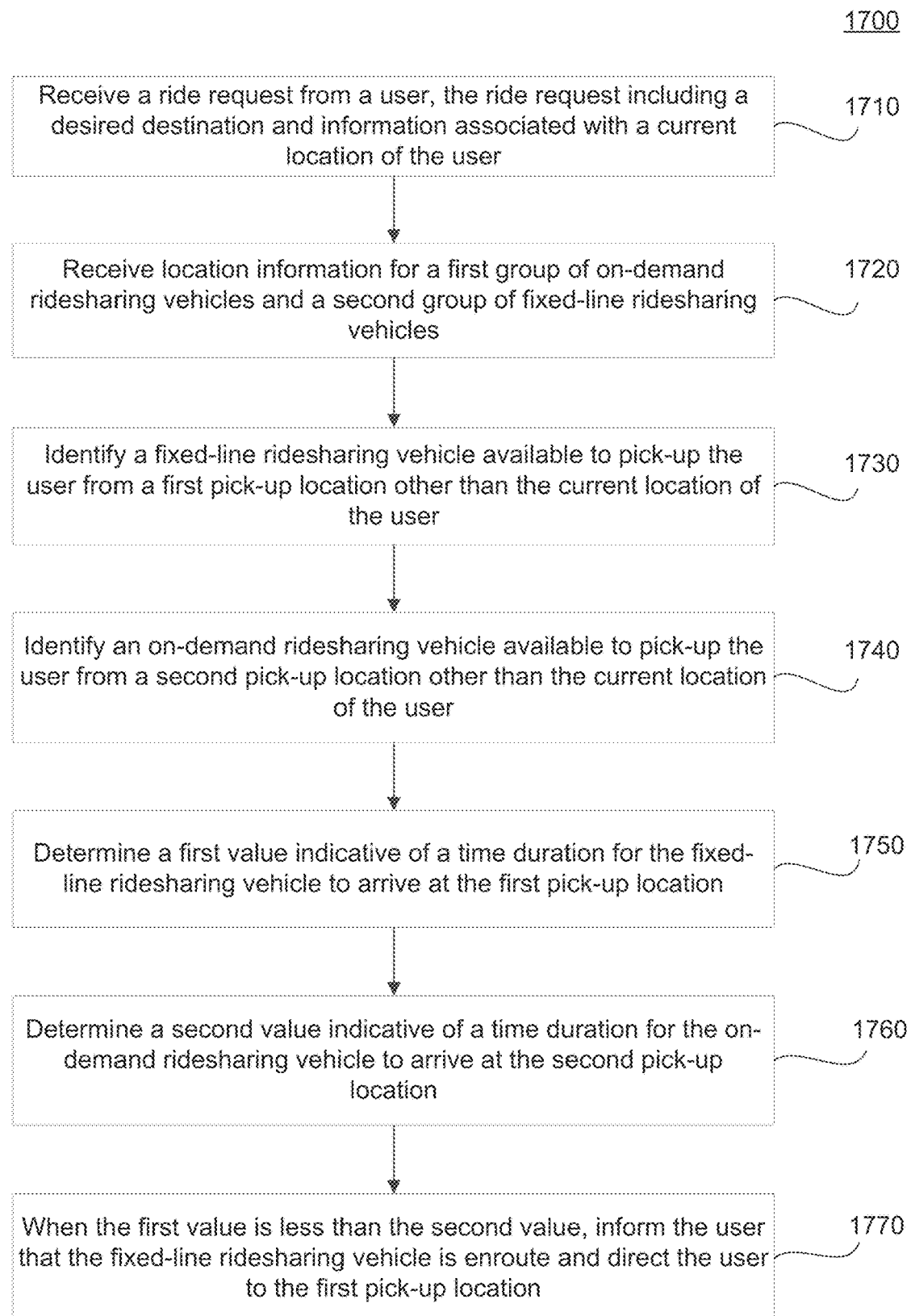
FIG. 17 is a flowchart showing an exemplary process for directing a ridesharing vehicle consistent with the present disclosure.

FIG. 17 is a flowchart showing an exemplary process 1700 for assigning on-demand vehicles based on estimated time of arrival of a fixed-line vehicle, consistent with disclosed embodiments. In one embodiment, the steps of process 1700 may be performed by a vehicle management server, such as ridesharing management server 150 described above with reference to FIGS. 1 and 3. Alternatively, at least some of the steps of process 1700 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be used to implement example methods disclosed herein.

At step 1710, processing unit 310 may receive a ride request from a user, the ride request including a desired destination and information associated with a current location of the user. At step 1720, processing unit 310 may receive location information for a first group of on-demand ridesharing vehicles and a second group of fixed-line ridesharing vehicles via data interface 128. For instance, the location information may be derived at least partially from a global positioning system (GPS) associated with the users' and/or drivers' communications devices.

At step 1730, processing unit 310 may identify a fixed-line ridesharing vehicle available to pick-up the user from a first pick-up location other than the current location of the user. For example, identifying a fixed line ridesharing vehicle may include a vehicle having a fixed route, similar to a public transportation schedule, operating in a same or proximal geographical are of a current location of the user. At step 1740, processing unit 310 may identify an on-demand ridesharing vehicle available to pick-up the user from a second pick-up location other than the current location of the user.

At step 1750, processing unit 310 may determine a first value indicative of a time duration for the fixed-line ridesharing vehicle to arrive at the first pick-up location. At step 1760, processing unit 310 may determine a second value indicative of a time duration for the on-demand ridesharing vehicle to arrive at the second pick-up location. Ride request module 1520 may compare the first value to the second value and may also analyze the values in view of one or more additional parameters including a waiting time, a walking distance, a travel duration, etc. Processing unit may also analyze additional parameters including historical demand information for purposeful spacing of on-demand vehicles based on predicted demand in a geographical area.

At step 1770, processing unit 310 the first value is less than the second value, inform the user that the fixed-line ridesharing vehicle is enroute and direct the user to the first pick-up location. Processing unit 310 may further transmit instruction for generating and/or routing the fixed-line ridesharing vehicle to the first pick-up location.

Temporarily Allocating Fixed Public Transport Vehicles as Dynamic Public Transport Vehicles In certain circumstances, fixed-line public transport vehicles may be temporarily allocated as dynamic public transport vehicles based on an event associated with an atypical demand for transportation. The fixed-line ridesharing vehicle may include buses or other vehicles that operate at a certain frequency or on a certain route, which may depend on time of day or day of week. For example, a driving accident, mass casualty incident, a disruption in a service line, or a planned event such as a sports game, may result in an unexpected, or atypical, demand for transportation. In such circumstances, ride management server 150 may allocate certain fixed-line ridesharing vehicles as dynamic ridesharing vehicles to account for this demand. The allocation may occur as a result of a determination that a prior fixed-line ridesharing allocation is insufficient for meeting in atypical demand.

Figure 18:
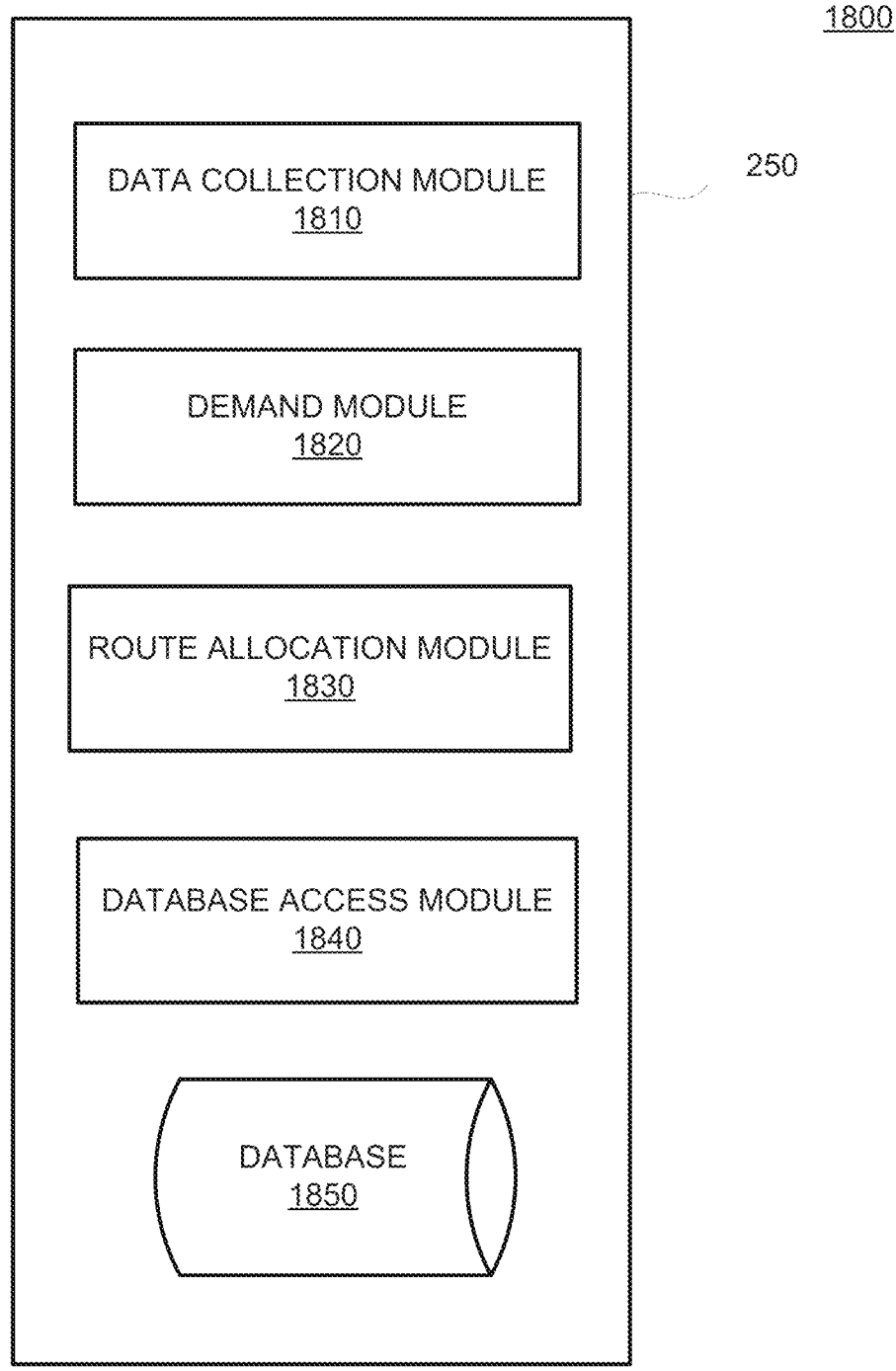
FIG. 18 is an exemplary embodiment of a memory containing modules consistent with the present disclosure.

FIG. 18 depicts an embodiment of memory module 250 for allocating a fixed-line ridesharing transport vehicle as a dynamic transport vehicle. Memory 250 may store a plurality of modules, and may be executable by at least one processor to perform various methods and processes disclosed herein. Further, it should be noted that memory 250 may store more or fewer modules than those shown in FIG. 18, depending on implementation-specific considerations.

As illustrated in FIG. 18, memory 250 may store software instructions to execute a data collection module 1810, a demand module 1820, a route allocation module 1830, a database access module 1840, and may include a database 1850. Data collection module 1810 may include software instruction for receiving information related to one or more events, one or more users, one or more on-demand vehicle, and/or one or more fixed-line vehicles from one or more sources. Demand module 1820 may include software instruction for analyzing information received by data collection module 1810 to identify an event indicative of atypical demand for transport service. Route allocation module 1830 may include software instruction for compensating for the inability of one or more ridesharing vehicles to address the atypical demand and routing a vehicle accordingly. Database access module 1840 may include software instruction executable to interact with database 1850, to store and/or receive information collected by data collection module 1810.

Data collection module 1810 may include software instructions for collecting data associated with one or more ridesharing vehicles, and/or an event. In some embodiments, data collection module 1810 may receive data via communications interface 360. For example, data collection module 1810 may include software instructions for receiving location information from a plurality of communication devices associated with a plurality of fixed-line ridesharing vehicles. The received location information may include global positioning system (GPS) data generated by GPS components associated with the plurality of communication devices. Additionally, or alternatively, data collection module 1810 may receive other location information, such as cell tower triangulation data, Wi-Fi or other signal strength data, or any other combination of location information.

Data collection module 1810 may also include software instructions for receiving information indicative of an event associated with atypical demand for transportation. For example, data collection module 1810 may collect data indicative of an event, wherein the event includes at least one of: a temporary disruption of a public transportation service, a terror attack, a severe weather event. In some embodiments, information indicative of the event may be received from the communication devices of a plurality of users in need for transportation. For example, ride management server 150 may detect a spike in the number of ride requests received in a particular geographical region. In some embodiments, the information indicative of the event may include information received from an entity associated with a municipal office. For example, ride management server 150 may receive information that a certain municipal region has issued an evacuation of a building or area. Ride management server 150 may determine that this information is expected to result in an atypical increase in demand for transportation. For example, the evacuation may occur during business hours when demand for transportation is typically low compared to rush hour. Alternatively, or additionally, the information indicative of the event associated with atypical demand for transportation is received from an emergency dispatch center. For example, the emergency dispatch center may transmit information to data collection module 1810 indicating that a mass casualty incident has occurred in a specific location causing certain modes of public transportation to become unavailable and/or requesting assistance to or from the specific location.

Data collection module 1810 may also include software instructions for obtain information indicative of current utilized capacity of the plurality of fixed-line ridesharing vehicles. For example, data collection module 1810 may receive data relating to a maximum capacity of passengers a fixed-line vehicle is able to transport and a number of passengers currently being transported by the fixed-line ridesharing vehicle. The number of passengers currently being transported by the fixed-line ridesharing vehicle may represent the current utilized capacity. The difference in between the maximum capacity and the utilized capacity may represent an available capacity. In some embodiments, the current utilized capacity information may include data relating to a number of passengers assigned to the fixed-line vehicle, that has not been picked up yet but is expected to be picked up.

Data collection module 1810 may also include software instructions for collecting data identifying predetermined driving routes of a plurality of fixed-line ridesharing vehicles. For example, the plurality of fixed-line ridesharing vehicles may operate on a predetermined schedule, including a predetermined number of stops, predetermined drop-off locations, and dynamic schedule of the stops. The predetermined driving routes may be based on a time of day or day of week. The predetermined driving routes may also be classified for a type of fixed-line ridesharing vehicle and/or a specific geographical region. For example, certain bus lines may include routes within a certain geographical region while other bus lines operate routes within an adjacent geographical region. There may be some or no overlap between the predetermined routed of the fixed-line vehicles operating in each geographical region.

Data collection module 1810 may also include software instructions for receiving one or more ride requests from one or more users requesting transportation services. A ride request may be transmitted to ridesharing management server 150 and may include information such as a current location of a user, a desired destination of the user, an identity of the user, a rating of the user, a number of passengers to be picked-up, etc. Information associated with a ride request may be received, for example, from a mobile communication device (e.g. a smartphone, tablet, wearable device, etc.) associated with a user. Network 140 may be configured to transmit data to communications interface 340 for processing by processor 310. In some embodiments, the ride requests may include one or more pick-up locations from which one or more fixed-line vehicles are able to pick-up a user. The received information may also include a current location of one or more users of a ridesharing system transmitting the request to ridesharing management server 150. The pick-up locations and/or the current location information may be received as geographical coordinate information, street address, or a region prescribed by a geo-fence.

Data collection module 1810 may also be configured to receive data associated with a specific location associated with the event. For example, data collection module 1810 may receive weather information and/or traffic information. The weather and traffic information may include real-time data or historical data associated with the specific location and/or or more characteristics of the event including a time of day, day of week, season of the year. The one or more characteristics of the event may be compared with historical characteristics for to determine if an event is atypical or likely to result in atypical demand for transportation.

Demand module 1820 may be configured to determine an inability of one or more fixed-line ridesharing vehicles in a plurality of ridesharing vehicles to address the atypical demand for transportation. For example, in some embodiments, demand module 1820 may analyze data collected by data collection module 1810 and determine whether or not certain fixed-line ridesharing vehicles are able to meet the atypical demand for transportation.

In some embodiments, an event associated with the atypical demand for transportation may be associated with a specific location and/or an inability of a plurality of fixed-line ridesharing vehicles to address the atypical demand for transportation. The inability to address the atypical demand may be caused at least partially by the event causing at least portions of the predetermined driving routes of the plurality of fixed-line ridesharing vehicles to become unavailable. For example, in some embodiments, a severe weather event may cause a train service to shut down. The train may represent a fixed-line ridesharing vehicle that is no longer available for transporting passengers. Data collection module 1810 may receive information related to the weather and/or information that train service in a particular geographical region in no longer operating. Demand module 1820 may thereafter determine, based on this information, that the fixed-line train service and/or other fixed-line modes of transportation are unable to address the atypical demand caused by the severe weather event causing train service to become unavailable.

In some embodiments, the event associated with the atypical demand for transportation is associated with a geographic area and/or the inability of a plurality of fixed-line ridesharing vehicles to address an atypical demand for transportation may be caused at least partially due to a low frequency of the plurality of fixed-line ridesharing vehicles passing through the geographic area. For example, in some embodiments, a geographical region typically experiencing five fixed-line ridesharing vehicles through a geographical region may begin to experience fewer, such as two, fixed-line ridesharing vehicles passing through the geographical regions during the same period of time. Demand module 1820 may determine that the decrease in frequency is not sufficient to meet a demand for transport requests.

Route allocation module 1830 may include software instructions for, based on accessed data identifying predetermined driving routes, selecting a fixed-line ridesharing vehicle to temporarily cease driving along its predetermined route. For example, in some embodiments, ride allocation module 1830 may select a bus on a predetermined route and transmit instructions to a device associated with the selected vehicle to cease driving along the predetermined route. The particular vehicle selected for cease driving may be selected based on information received by data collection module 1810 including for example, a geographical proximity to a location of the atypical demand and/or an indication that there is sufficient capacity in the selected vehicle to meet the atypical demand for transport.

In some embodiments, route allocation module 1830 may compensate for the inability of one of more fixed-line ridesharing vehicles in a plurality of fixed-line ridesharing vehicles to address the atypical demand for transportation by directing a selected fixed-line ridesharing vehicle along a new driving route that differs from the predetermined driving route associated with the one or more fixed-line ridesharing vehicles in the plurality. In some embodiments, route allocation module 1830 may direct a selected group of fixed-line ridesharing vehicles toward a specific location associated with the atypical demand. For example, route allocation module 1830 may direct a group of buses previously assigned to the specific location in order to pick up one or more passengers requesting transport. Additionally, or alternatively, route allocation module 1830 may select the group of fixed-line ridesharing vehicles further based on the information obtained regarding a current utilized capacity of the fixed-line ridesharing vehicles. For example, route allocation module 1830 may select a group of fixed-line ridesharing vehicles, such as buses, to the specific location based on an indicated that there is sufficient capacity to accommodate the atypical demand for transport. In some embodiments, the selected group of fixed-line ridesharing vehicles may include at least one fixed-line ridesharing vehicle without passengers and at least one fixed-line ridesharing vehicle with passengers traveling to differing locations associated with differing predetermined driving routes. Each of the selected vehicles may be directed along different new routes to the specific location associated with the atypical demand.

Additionally, or alternatively, route allocation module 1830 may direct a selected group of on-demand ridesharing vehicles toward the specific location. The one or more selected on-demand ridesharing vehicles may be directed on a new driving route towards a specific location associated with the atypical demand and/or towards a specific location with an atypical concentration of ride requests. The selected group of on-demand vehicles may be directed toward the specific location associated with the atypical demand. For example, in some embodiments, a first on-demand vehicle in the selected group of on-demand vehicles may be directed to a location where a train service is no longer operating provide one or more passengers previously being transported by the train service to their desired destination. Additionally, or alternatively, route allocation module 1830 may reassign users scheduled to be picked up by the selected group of on-demand ridesharing vehicles to different on-demand ridesharing vehicles. For example, in some embodiments, a user assigned to the selected on-demand ridesharing vehicle to be picked up from a location distal to the specific location may be reassigned to a different non-selected on-demand ridesharing vehicle, such that the selected on-demand ridesharing vehicle can be directed to the specific location to address the atypical demand, with minimal consequences to the previously assigned user. Additionally, or alternatively, routing module 1830 may change drop-off locations of users currently riding the selected group of on-demand to locations along new driving routes toward the specific location. For example, a user previously assigned to be dropped off at a first drop-off location may instead be dropped off at a second drop-off location along the new driving route. The second drop-off location may be close to the first drop-off location. Additionally, the second drop-off location may be a designated drop-off location for accessing alternative modes of transportation, including a different ridesharing vehicle assigned to pick-up the users at the second drop-off location and resume transportation to the first drop-off location.

Additionally, or alternatively, route allocation module 1830 may determine the new driving route for the selected fixed-line ridesharing vehicle based on the specific location and at least one current traffic condition. For example, in some embodiments, the new driving route may be determined based on information received by data collection module 1810 indicative traffic congestion in a certain region of the specific location. Route allocation module 1830 may analyze the data in order to determine a route that optimizes the new driving route according to one or more parameters. The one or more parameters may include one or more of a travel duration, a travel distance, and/or fuel consumption efficiency associated with various roads and routes of travel associated with the specific location.

Additionally, or alternatively, route allocation module 1830 may determine a new driving route based on a distribution of users in need for transportation within the geographic area and at least one current traffic condition. For example, a first ridesharing vehicle may be routed along a new driving route to a location within a geographical location proximal to the specific location associated with the atypical demand to account for a first group of users within a distribution of users located near an epicenter of the event. A second ridesharing may be directed along a new driving route to a location within a geographical location distal to the specific location associated with the atypical demand to account for a second group of users within the distribution of users located further away from the epicenter of the event to mitigate the atypical demand across a distribution of locations associated with the specific location. Route allocation module may analyze data received by data collection module 1810 to account for one or more traffic conditions associated with the geographical area and each vehicle in the group of selected vehicles accordingly.

Additionally, or alternatively, route allocation module 1830 may include software instructions for after abatement of the inability, terminating travel of the selected fixed-line ridesharing vehicle along the new driving route and direct the selected fixed-line ridesharing vehicle to return to traveling according to its predetermined driving route. For example, route allocation module 1830 may determine that the atypical demand has subsided and/or has been sufficiently accounted for and thereafter terminate travel of the selected ridesharing vehicle along the new driving route to the specific location and redirect the selected vehicle to its predetermined driving route. The predetermined driving route may be one that that the ridesharing vehicle was travelling on prior to being routed to the specific location to compensate for the atypical demand.

As illustrated in FIG. 18, database 1850 may be configured to store any type of information associated with modules 1810-1840, depending on implementation specific considerations. For example, in some embodiments, database 1850 may store the predetermined driving routes, database access module 1840 may be configured to access data identifying a predetermined driving route of a predetermined fixed-line ridesharing vehicles and may subsequently transmit the stored data to route allocation module 1830. Any one of data collection module 1810, demand module 1820, route allocation module 1830, may access database 1850 for stored data by way of database access module 1840.

Modules 1810-1840 may be implemented in software, hardware, firmware, or any combination of software, hardware or firmware. For example, if the modules are implemented in software, they may be stored in memory 250. However, in some embodiments, any one or more of modules 1810-1840 and data associated with database 1850 may, for example, be stored in processor 310 and/or executed on a device associated with ridesharing management system 100. Modules 1810-1840 may be configured to interact with each other and/or other modules of memory 250 to perform functions consistent with disclosed embodiments.

Figure 19:
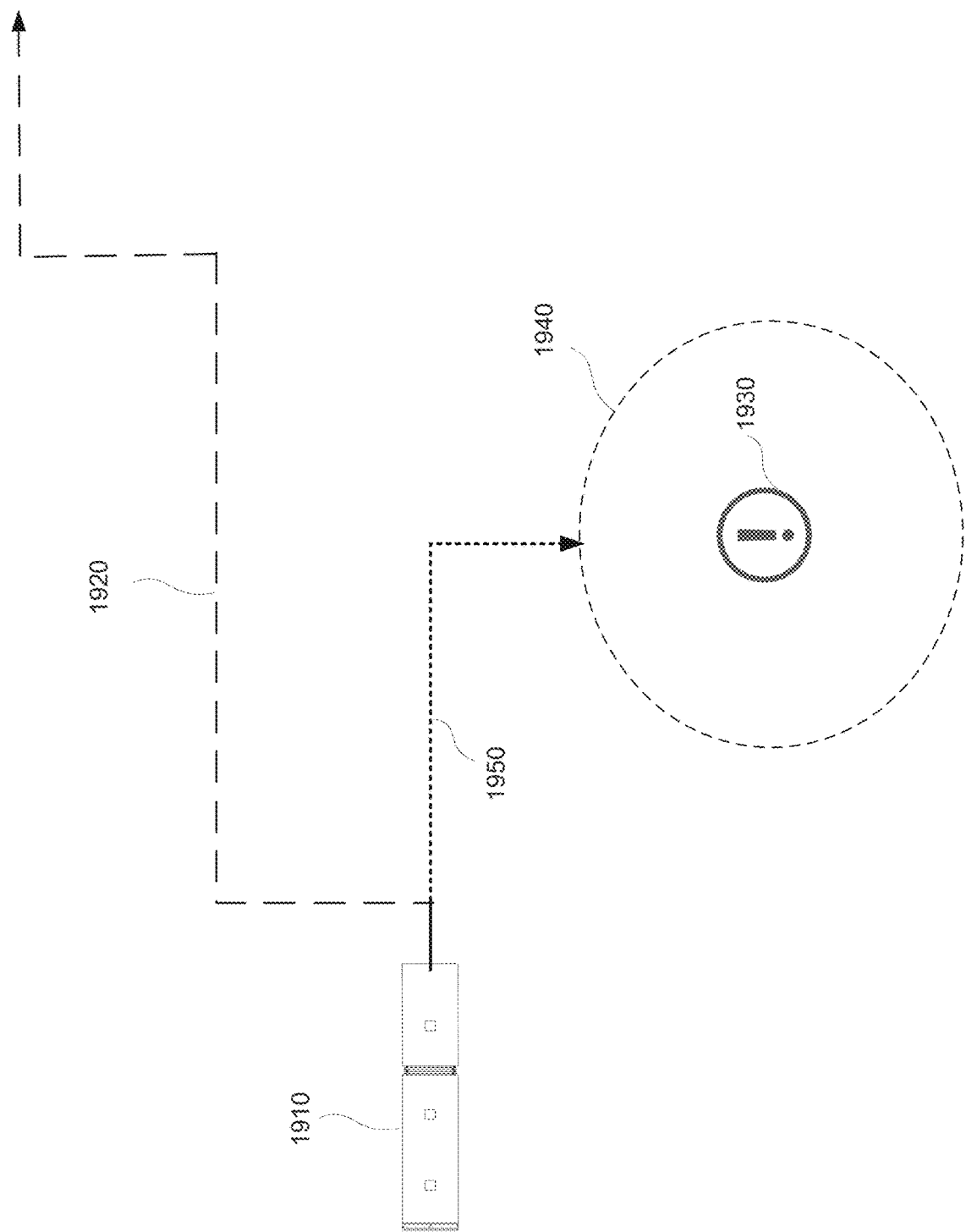
FIG. 19 is an exemplary schematic of ridesharing vehicle selected for addressing an atypical demand for transportation consistent with the present disclosure.

FIG. 19 is an exemplary schematic of ridesharing vehicle 1910 selected for addressing an atypical demand for transportation. In one embodiment, ridesharing vehicle may represent a fixed line vehicle associated with predetermined driving route 1920. Upon receiving information indication of event 1930, ridesharing vehicle 1910 may be directed along new driving route 1950. Event 1920 may be identified based on information received and may indicate a temporary disruption of a public transportation service, a terror attack, or severe weather event. New driving route 1950 may be determined based on an identification of a specific location associated with event 1930 and may represent a geographical region 1920 in which event 1930 has transpired, is transpiring, and/or an area surrounding event 1930 likely to be affected by and/or experience the atypical demand for transportation. New driving route 1950 may direct ridesharing vehicle 1910 to geographical region 1940 to address the atypical demand for transportation.

FIG. 20 is a flowchart showing an exemplary process 2000 for assigning on-demand vehicles based on estimated time of arrival of a fixed-line vehicle, consistent with disclosed embodiments. In one embodiment, the steps of process 2000 may be performed by a vehicle management server, such as ridesharing management server 150 described above with reference to FIGS. 1 and 3. Alternatively, at least some of the steps of process 2000 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be used to implement example methods disclosed herein.

At step 2010, processing unit 310 may receive information indicative of an event associated with atypical demand for transportation. The information indicative of the event may include information suggesting a disruption of existing fixed-line service to an area and/or an occurrence of an event that increases a need to transportation beyond a typical volume of need.

At step 2020, processing unit 310 may receive location information from a plurality of communication devices associated with a plurality of fixed-line ridesharing vehicles. The location information may be derived at least partially from a global positioning system associated with the users' and/or drivers' communications devices. The location information may include one or more of a current location of the plurality of fixed-line ridesharing vehicles and/or location information associated with a predetermined route along which the fixed-line ridesharing vehicles are traveling.

At step 2030, processing unit 310 may determine an inability of one or more fixed-line ridesharing vehicles in the plurality of fixed-line ridesharing vehicles to address the atypical demand for transportation. For example, identifying a fixed line ridesharing vehicle may include a fixed-line vehicle operating in a geographical region associated with the atypical demand, but with insufficient capacity to satisfy the demand for transportation within a predetermined period of time.

At step 2040, processing unit 310 may access data identifying predetermined driving routes of the plurality of fixed-line ridesharing vehicles. The predetermine driving routes may include one or more routes along which the plurality of fixed-lien driving vehicles were scheduled to travel along prior to processing unit 310 receiving information indicative of an event associated with atypical demand for transportation.

At step 2050, processing unit 310 may select a fixed-line ridesharing vehicle to temporarily cease driving along its predetermined driving route. The fixed-line ridesharing vehicle may be selected based on the data accessed at step 2040. For example, the fixed-line ridesharing vehicle may be selected based on information that the predetermined driving route included stops proximal to a location associated with the event.

At step 2060, processing unit 310 may compensate for the inability of the one or more fixed-line ridesharing vehicles in the plurality of fixed-line ridesharing vehicles to address the atypical demand for transportation by directing the selected fixed-line ridesharing vehicle along a new driving route that differs from the predetermined driving route. For example, processing unit 310 may direct the selected vehicle along a route towards the specific location in order to pick up one or more users demanding transportation from the location associated with the atypical demand.

At step 2070, processing unit 310 may terminate travel of the selected fixed-line ridesharing vehicle along the new driving route and direct the selected fixed-line ridesharing vehicle to return to traveling according to its predetermined driving route, after abatement of the inability. For example, upon determining that the demand for transportation in the specific location has returned to or is close to a typical level of demand, the selected fixed-line ridesharing vehicle may be directed to return to the predetermined route. Processor 310 may determine that the selected ridesharing vehicle is no longer required to address the atypical demand because the atypical demand has subsided.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for directing ridesharing vehicles, the system comprising:
    a communications interface configured to:
        receive a ride request from a user, wherein the ride request includes a desired destination and information associated with a current location of the user; and
        receive location information of a first group of on-demand ridesharing vehicles and a second group of fixed-line ridesharing vehicles;
    at least one processor configured to:
        based on the received location information, identify a fixed-line ridesharing vehicle available to pick-up the user from a first pick-up location other than the current location of the user;
        based on the received location information, identify an on-demand ridesharing vehicle available to pick-up the user from a second pick-up location other than the current location of the user;
        determine a first value indicative of a time duration for the fixed-line ridesharing vehicle to arrive at the first pick-up location;
        determine a second value indicative of a time duration for the on-demand ridesharing vehicle to arrive at the second pick-up location; and
        when the first value is less than the second value, inform the user that the fixed-line ridesharing vehicle is enroute and direct the user to the first pick-up location.

2. The system of claim 1, wherein: when the first value is greater than the second value but below a waiting threshold, the at least one processor is further configured to inform the user that the fixed-line ridesharing vehicle is enroute and direct the user to the first pick-up location.

3. The system of claim 2, wherein when the first value is greater than the second value and greater than the waiting threshold, the at least one processor is further configured to inform the user that the on-demand ridesharing vehicle is enroute and direct the user to the second pick-up location.

4. The system of claim 3, wherein the at least one processor is further configured to determine a value for the waiting threshold based on one or more environment conditions.

5. The system of claim 3, wherein the at least one processor is further configured to electronically assign the on-demand ridesharing vehicle to pick up the user, and wherein the assignment includes determining a drop-off location at a location other than the desired destination for the user and is associated with a driving route in which the user shares at least a portion of a ride with at least two other users.

6. The system of claim 3, wherein the at least one processor is further configured to: access historical demand data for ridesharing vehicles in a geographical area associated with the current location of the user; determine that the on-demand ridesharing vehicle can pick the user at a first pick-up time; use the historical demand data to predict near-future demand for ridesharing requests in the geographical area; and direct the on-demand ridesharing vehicle to pick up the user at a second pick-up time later than the first pick-up time.

7. The system of claim 6, wherein the at least one processor is further configured to determine the second pick-up time such that a waiting time of the user is less than the waiting threshold.

8. The system of claim 6, wherein the at least one processor is further configured to determine the second pick-up time based on a departure time of a fixed-line ridesharing vehicle from the geographical area to create a time interval between a departure time of the on-demand ridesharing vehicle and the departure time of the fixed-line ridesharing vehicle.

9. The system of claim 6, wherein the at least one processor is further configured to determine the second pick-up time based on a departure time of another on-demand ridesharing vehicle from the geographical area to create spacing in departure times of on-demand ridesharing vehicles.

10. The system of claim 9, wherein the spacing in the departure times of on-demand ridesharing vehicles is based on at least some of: volume of the near-future demand, number of on-demand ridesharing vehicles, number of alternative routes, time of day, day of week, and anticipated speeds of the on-demand ridesharing vehicles.

11. The system of claim 1, wherein the at least one processor is further configured to confirm that the first value is greater than a time duration for the user to walk to the first pick-up location and that the second value is greater than a time duration it would take the user to walk to the second pick-up location.

12. The system of claim 1, wherein the at least one processor is further configured to: obtain an indication of a current utilized capacity of the fixed-line ridesharing vehicle; and assign the on-demand ridesharing vehicle to pick up the user when the first value is less than the second value but the current utilized capacity of the fixed-line ridesharing vehicle is greater than a capacity threshold.

13. The system of claim 1, wherein the at least one processor is further configured to: obtain an indication of a current utilized capacity of the fixed-line ridesharing vehicle; and inform the user that the fixed-line ridesharing vehicle is enroute and direct the user to the first pick-up location when the first value is more than the second value but the current utilized capacity of the fixed-line ridesharing vehicle is below a capacity threshold.

14. The system of claim 1, wherein the at least one processor is further configured to: estimate a travel duration for the user to reach the desired destination when traveling in the on-demand ridesharing vehicle and a travel duration for the user to reach the desired destination when traveling in the fixed-line ridesharing vehicle; and assign the on-demand ridesharing vehicle to pick up the user when the first value is less than the second value but the travel duration when the user travels in the fixed-line ridesharing vehicle is greater than the travel duration when the user travels in the on-demand ridesharing vehicle.

15. The system of claim 1, wherein the first pick-up location and the second pick-up location are located on a same street.

16. The system of claim 1, wherein the first pick-up location and the second pick-up location are located on different streets.

17. A method for directing ridesharing vehicles, the method comprising:
receiving a ride request from a user, wherein the ride request includes a desired destination and information associated with a current location of the user;
receiving location information of a first group of on-demand ridesharing vehicles and a second group of fixed-lines ridesharing vehicles;
based on the received location information, identifying a fixed-line ridesharing vehicle available to pick-up the user from a first pick-up location other than the current location of the user;
based on the received location information, identifying an on-demand ridesharing vehicle available to pick-up the user from a second pick-up location other than the current location of the user;
determining a first value indicative of a time duration for the fixed-line ridesharing vehicle to arrive at the first pick-up location;
determining a second value indicative of a time duration for the on-demand ridesharing vehicle to arrive at the second pick-up location; and
when the first value is less than the second value, informing the user that the fixed-line ridesharing vehicle is enroute and directing the user to the first pick-up location.

18. The method of claim 17, further comprising: when the first value is greater than the second value but below a waiting threshold, informing the user that the fixed-line ridesharing vehicle is enroute and directing the user to the first pick-up location; and when the first value is greater than the second value and greater than the waiting threshold, informing the user that the on-demand ridesharing vehicle is enroute and directing the user to the second pick-up location.

19. The method of claim 18, further comprising: assigning the on-demand ridesharing vehicle to pick up the user, wherein the assignment includes determining a drop-off location at a location other than the desired destination for the user and is associated with a driving route in which the user shares at least a portion of a ride with at least two other users.

20. The method of claim 17, further comprising: obtaining an indication of a current utilized capacity at the fixed-line ridesharing vehicle; and assigning the on-demand ridesharing vehicle to pick up the user when the first value is less than the second value but the current utilized capacity of the fixed-line ridesharing vehicle is greater than a capacity threshold.

21. A non-transitory computer-readable storage medium storing instructions that, when executed by at least one processor, cause the at least one processor to perform a method for directing ridesharing vehicles, the method comprising:
receiving a ride request from a user, wherein the ride request includes a desired destination and information associated with a current location of the user;
receiving location information of a first group of on-demand ridesharing vehicles and a second group of fixed-lines ridesharing vehicles;
based on the received location information, identifying a fixed-line ridesharing vehicle available to pick-up the user from a first pick-up location other than the current location of the user;
based on the received location information, identifying an on-demand ridesharing vehicle available to pick-up the user from a second pick-up location other than the current location of the user;
determining a first value indicative of a time duration for the fixed-line ridesharing vehicle to arrive at the first pick-up location;
determining a second value indicative of a time duration for the on-demand ridesharing vehicle to arrive at the second pick-up location; and
when the first value is less than the second value, informing the user that the fixed-line ridesharing vehicle is enroute and directing the user to the first pick-up location.

22. The non-transitory computer-readable storage medium of claim 21, to the method further comprising:
estimating a first walking distance for the user when traveling in the fixed-line ridesharing vehicle and a second walking distance for the user to reach the desired destination when traveling in the on-demand ridesharing vehicle; and
assigning the on-demand ridesharing vehicle to pick up the user when the first value is less than the second value but the first walking distance is greater than the second walking distance or when a combination of the first value and the first walking distance is higher than a combination of the second value and the second walking distance.

23. The non-transitory computer-readable storage medium of claim 22, wherein the first walking distance comprises a distance for the user to reach the first pick-up location associated with the fixed-line ridesharing vehicle and the second walking distance comprises a distance for the user to reach the second pick-up location associated with the on-demand ridesharing vehicle.

24. The non-transitory computer-readable storage medium of claim 22, wherein the first walking distance comprises a distance for the user to reach the desired destination from a drop-off location associated with the fixed-line ridesharing vehicle and the second walking distance comprises a distance for the user to reach the desired destination from a drop-off location associated with the on-demand ridesharing vehicle.

25. The non-transitory computer-readable storage medium of claim 22, wherein the first walking distance comprises a combined distance for the user to reach the first pick-up location associated with the fixed-line ridesharing vehicle and a distance for the user to reach the desired destination from a drop-off location associated with the fixed-line ridesharing vehicle and the second walking distance comprises a combined distance for the user to reach the second pick-up location associated with the on-demand ridesharing vehicle and a distance for the user to reach the desired destination from a drop-off location associated with the on-demand ridesharing vehicle.

\* \* \* \* \*